(12) United States Patent
Abedini et al.

(10) Patent No.: US 12,273,862 B2
(45) Date of Patent: Apr. 8, 2025

(54) TECHNIQUES FOR TIME AND/OR FREQUENCY DOMAIN RECONFIGURATION OF A FORWARDED SIGNAL USING A REPEATER NODE

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/305,988

(22) Filed: Jul. 19, 2021

(65) Prior Publication Data
US 2022/0046618 A1 Feb. 10, 2022

Related U.S. Application Data

(60) Provisional application No. 62/706,189, filed on Aug. 4, 2020, provisional application No. 62/706,188, filed on Aug. 4, 2020.

(51) Int. Cl.
*H04W 72/044* (2023.01)
*H04B 7/155* (2006.01)
*H04L 5/00* (2006.01)

(52) U.S. Cl.
CPC .......... *H04W 72/044* (2013.01); *H04B 7/155* (2013.01); *H04L 5/0055* (2013.01)

(58) Field of Classification Search
CPC .. H04W 72/044; H04W 28/065; H04B 7/155; H04B 7/15528; H04L 5/0055; H04L 5/0023; H04L 5/0053; H04L 5/0091
See application file for complete search history.

(56) References Cited

U.S. PATENT DOCUMENTS

| | | | |
|---|---|---|---|
| 2005/0232223 A1 | 10/2005 | Muller | |
| 2009/0097468 A1* | 4/2009 | Yi | G08C 17/02 370/347 |
| 2010/0296432 A1* | 11/2010 | Mehta | H04B 7/2606 370/392 |

(Continued)

FOREIGN PATENT DOCUMENTS

| | | |
|---|---|---|
| WO | WO-2011018722 A1 | 2/2011 |
| WO | WO-2019122285 A1 | 6/2019 |

OTHER PUBLICATIONS

International Search Report and Written Opinion—PCT/US2021/070910—ISA/EPO—Oct. 29, 2021.

*Primary Examiner* — Edan Orgad
*Assistant Examiner* — Malick A Sohrab
(74) *Attorney, Agent, or Firm* — Dalei Dong; Harrity & Harrity, LLP

(57) ABSTRACT

Various aspects of the present disclosure generally relate to wireless communication. In some aspects, a repeater node may receive, from a control node, a configuration that indicates at least one of a time domain reconfiguration or a frequency domain reconfiguration. The repeater node may receive a first signal. The repeater node may process the first signal based at least in part on the configuration. The repeater node may generate at least one second signal based at least in part on the processed first signal. The repeater node may transmit the at least one second signal. Numerous other aspects are provided.

30 Claims, 19 Drawing Sheets

(56) References Cited

U.S. PATENT DOCUMENTS

| | | | |
|---|---|---|---|
| 2011/0053495 A1* | 3/2011 | Hara | H04L 5/0023 |
| | | | 455/507 |
| 2012/0002591 A1* | 1/2012 | Noh | H04W 72/27 |
| | | | 370/315 |
| 2012/0170481 A1* | 7/2012 | Kimura | H04B 7/15542 |
| | | | 370/252 |
| 2012/0213148 A1* | 8/2012 | Saito | H04L 5/0023 |
| | | | 370/315 |
| 2017/0208574 A1* | 7/2017 | Ramakrishna | H04L 5/0032 |
| 2018/0317156 A1* | 11/2018 | Bergström | H04W 40/04 |
| 2019/0020402 A1* | 1/2019 | Gharavi | H04B 7/15528 |
| 2019/0044607 A1* | 2/2019 | Kalhan | H04L 1/1861 |

\* cited by examiner

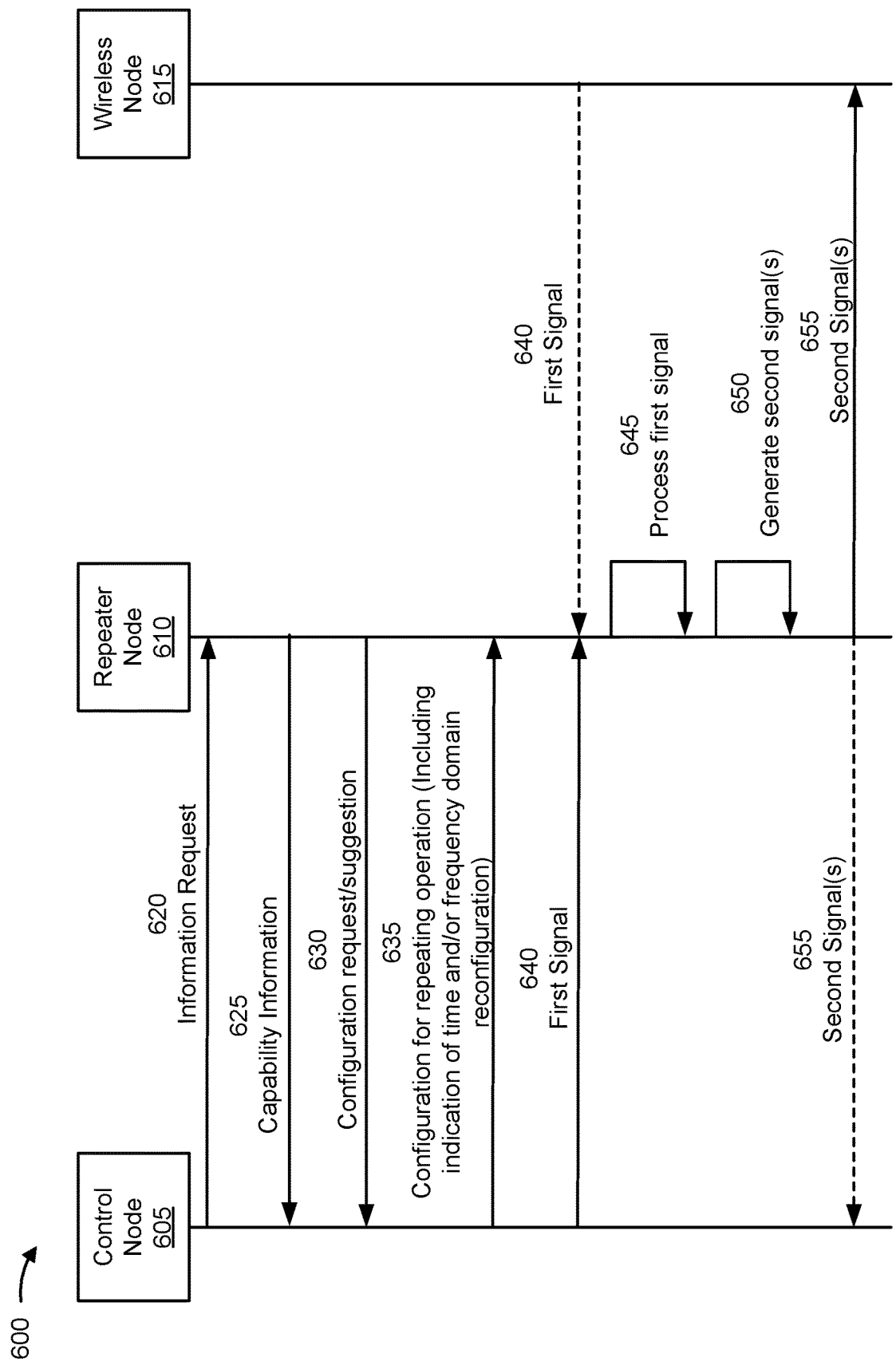

TECHNIQUES FOR TIME AND/OR FREQUENCY DOMAIN RECONFIGURATION OF A FORWARDED SIGNAL USING A REPEATER NODE

CROSS-REFERENCE TO RELATED APPLICATION

This Patent Applications claims priority to U.S. Provisional Patent Application No. 62/706,188, filed on Aug. 4, 2020, entitled "TECHNIQUES FOR TIME DOMAIN RECONFIGURATION OF A FORWARDED SIGNAL USING A REPEATER NODE," and to U.S. Provisional Patent Application No. 62/706,189, filed on Aug. 4, 2020, entitled "TECHNIQUES FOR FREQUENCY DOMAIN RECONFIGURATION OF FORWARDED SIGNAL USING A REPEATER NODE," each of which is assigned to the assignee hereof. The disclosures of the prior Applications are considered part of and are incorporated by reference into this Patent Applications.

FIELD OF THE DISCLOSURE

Aspects of the present disclosure generally relate to wireless communication and to techniques and apparatuses for time and/or frequency domain reconfiguration of a forwarded signal using a repeater node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Aspects generally include a method of wireless communication performed by a repeater node includes: receiving, from a control node, a configuration that indicates at least one of a time domain reconfiguration or a frequency domain reconfiguration; receiving a first signal; processing the first signal based at least in part on the configuration; generating at least one second signal based at least in part on the processed first signal; and transmitting the at least one second signal.

In some aspects, receiving the first signal comprises receiving a millimeter wave wireless signal.

In some aspects, the first signal comprises at least one of: a physical downlink control channel communication, a physical downlink shared channel communication, a physical uplink control channel communication, a physical uplink shared channel communication, a physical random access channel communication, a physical sidelink channel communication, a reference signal communication, or an acknowledgement or negative acknowledgement feedback message.

In some aspects, the configuration indicates a digital processing operation that includes the at least one of the time domain reconfiguration or the frequency domain reconfiguration, and processing the first signal based at least in part on the at least one of the time domain reconfiguration or the frequency domain reconfiguration comprises performing the digital processing operation.

In some aspects, receiving the first signal comprises receiving the first signal using a first frequency domain resource having a first center frequency, and transmitting the at least one second signal comprises transmitting the at least one second signal using a second frequency domain resource having a second center frequency, wherein the second center frequency is different than the first center frequency.

In some aspects, the first frequency domain resource comprises at least one of: a resource element, a bandwidth, or a bandwidth part.

In some aspects, the first frequency domain resource is the bandwidth part and is associated with at least one of: a front haul link between the control node and the repeater node, an access link between the control node and the repeater node, or a wireless node.

In some aspects, the configuration comprises a frequency shift configuration that indicates the second frequency domain resource.

In some aspects, the method includes obtaining channel information associated with the second frequency domain resource; and transmitting, to the control node, a control message that indicates the channel information, wherein the frequency shift configuration indicates the second frequency domain resource based at least in part on the channel information.

In some aspects, the frequency shift configuration indicates a difference between the first center frequency and the second center frequency.

In some aspects, the difference comprises a number of resource elements.

In some aspects, the difference comprises a frequency offset value.

In some aspects, the method includes transmitting, to the control node, a control message that comprises at least one of: a request for the frequency shift configuration or a suggestion associated with the frequency shift configuration.

In some aspects, the suggestion indicates at least one of a suggested frequency domain resource or a suggested frequency offset.

In some aspects, the frequency shift configuration is carried by a control message.

In some aspects, the frequency shift configuration is carried by the first signal.

In some aspects, transmitting the at least one second signal comprises refraining from transmitting the frequency shift configuration.

In some aspects, the first signal comprises at least one header that carries the frequency shift configuration.

In some aspects, transmitting the at least one second signal comprises refraining from transmitting the at least one header.

In some aspects, the first signal carries an aggregated communication comprising a plurality of communications, the plurality of communications are frequency division multiplexed, and processing the first signal based at least in part on the frequency domain reconfiguration comprises: segmenting the aggregated communication into the plurality of communications, wherein generating the at least one second signal comprises generating a plurality of signals, and wherein the plurality of signals carry the plurality of communications.

In some aspects, the configuration comprises a segmentation configuration that indicates segmentation information associated with the aggregated communication, and wherein segmenting the aggregated communication comprises segmenting the aggregated communication based at least in part on the segmentation information.

In some aspects, the segmentation information identifies the plurality of communications.

In some aspects, the method includes transmitting, to the control node, a control message that comprises at least one of: a request for the segmentation configuration or a suggestion associated with the segmentation configuration.

In some aspects, the segmentation information is carried by a control message.

In some aspects, the segmentation information is carried by the first signal.

In some aspects, transmitting the at least one second signal comprises refraining from transmitting the segmentation information.

In some aspects, the first signal comprises at least one header that carries the segmentation information.

In some aspects, transmitting the at least one second signal comprises refraining from transmitting the at least one header.

In some aspects, transmitting the at least one second signal comprises transmitting a plurality of signals using a plurality of frequency domain resources.

In some aspects, transmitting the plurality of signals further comprises transmitting the plurality of signals using a plurality of time domain resources.

In some aspects, the configuration indicates the plurality of frequency domain resources.

In some aspects, a first signal of the plurality of signals carries a first communication of the plurality of communications and a second signal of the plurality of signals carries a second communication of the plurality of communications.

In some aspects, transmitting the plurality of signals comprises: transmitting the first signal of the plurality of signals using a first frequency domain resource; and transmitting the second signal of the plurality of signals using a second frequency domain resource that is different than the first frequency domain resource.

In some aspects, the first frequency domain resource is associated with a front haul link between the control node and the repeater node and the second frequency domain resource is associated with an access link between the control node and the repeater node.

In some aspects, transmitting the plurality of signals comprises: transmitting the first signal of the plurality of signals using a first beam; and transmitting the second signal of the plurality of signals using a second beam that is different than the first beam.

In some aspects, the first beam corresponds to a first wireless node, and the second beam corresponds to a second wireless node.

In some aspects, the method includes receiving a third signal; and processing the third signal based at least in part on the frequency domain reconfiguration by aggregating, using frequency division multiplexing, the first signal and the third signal to form an aggregated signal, wherein the at least one second signal comprises the aggregated signal.

In some aspects, the configuration comprises an aggregation configuration that indicates aggregation information associated with the aggregated signal and aggregating the first signal and the third signal comprises generating the aggregated signal based at least in part on the aggregation information.

In some aspects, the aggregation configuration indicates at least one resource to be used to transmit the aggregated signal.

In some aspects, the method includes transmitting, to the control node, a control message that comprises at least one of: a request for the aggregation configuration, or a suggestion associated with the aggregation configuration.

In some aspects, the aggregation information is carried by a control message.

In some aspects, the aggregation information is carried by the first signal.

In some aspects, transmitting the at least one second signal comprises refraining from transmitting the aggregation information.

In some aspects, the first signal comprises at least one header that carries the aggregation information.

In some aspects, transmitting the at least one second signal comprises refraining from transmitting the at least one header.

In some aspects, receiving the first signal comprises receiving the first signal from a first wireless node and receiving the third signal comprises receiving the third signal from at least one of the first wireless node or a second wireless node.

In some aspects, receiving the first signal comprises receiving the first signal using a first beam, and receiving the third signal comprises receiving the third signal using at least one of the first beam or a second beam.

In some aspects, the configuration indicates a mapping from a first set of resources associated with the first signal to a second set of resources corresponding to the at least one second signal.

In some aspects, the first set of resources comprises a first set of resource elements, and the second set of resources comprises a second set of resource elements.

In some aspects, the first set of resources comprises a first set of symbols and the second set of resources comprises a second set of symbols.

In some aspects, the method includes transmitting, to the control node, a control message that comprises at least one of: a request for the mapping or a suggestion associated with the mapping.

In some aspects, the mapping is carried by a control message.

In some aspects, the mapping is carried by the first signal.

In some aspects, transmitting the at least one second signal comprises refraining from transmitting the mapping.

In some aspects, the first signal comprises at least one header that carries the mapping.

In some aspects, transmitting the at least one second signal comprises refraining from transmitting the at least one header.

In some aspects, the first signal carries a communication, and processing the first signal based at least in part on the time domain reconfiguration comprises: segmenting the communication into a plurality of communication segments, wherein generating the at least one second signal comprises generating a plurality of signals, wherein the plurality of signals carry the plurality of communication segments.

In some aspects, the configuration comprises a segmentation configuration that indicates segmentation information associated with the communication, and segmenting the communication comprises segmenting the communication based at least in part on the segmentation information.

In some aspects, the segmentation information identifies the plurality of communication segments.

In some aspects, the method includes transmitting, to the control node, a control message that comprises at least one of: a request for the segmentation configuration, or a suggestion associated with the segmentation configuration.

In some aspects, the suggestion indicates a suggested number of communication segments.

In some aspects, the segmentation information is carried by a control message.

In some aspects, the segmentation information is carried by the first signal.

In some aspects, transmitting the at least one second signal comprises refraining from transmitting the segmentation information.

In some aspects, the first signal comprises at least one header that carries the segmentation information.

In some aspects, transmitting the at least one second signal comprises refraining from transmitting the at least one header.

In some aspects, transmitting the at least one second signal comprises transmitting the plurality of signals using a plurality of time domain resources.

In some aspects, the configuration indicates the plurality of time domain resources.

In some aspects, the configuration indicates a mapping from a set of resources associated with the first signal to a set of segment indices corresponding to the plurality of communication segments.

In some aspects, the configuration indicates: a first mapping from a first resource of the set of resources to a first segment index of the set of segment indices; and a second mapping from a second resource of the set of resources to a second segment index of the set of segment indices.

In some aspects, the set of resources comprise at least one of a time domain resource or a frequency domain resource.

In some aspects, a first signal of the plurality of signals carries a first communication segment of the plurality of communication segments, and a second signal of the plurality of signals carries a second communication segment of the plurality of communication segments.

In some aspects, transmitting the at least one second signal comprises: transmitting the first signal of the plurality of signals using a first time domain resource; and transmitting the second signal of the plurality of signals using a second time domain resource that is different than the first time domain resource.

In some aspects, transmitting the at least one second signal comprises: transmitting the first signal of the plurality of signals using a first beam; and transmitting the second signal of the plurality of signals using a second beam that is different than the first beam.

In some aspects, transmitting the at least one second signal comprises: transmitting the first signal of the plurality of signals to a first wireless node; and transmitting the second signal of the plurality of signals to a second wireless node that is different than the first wireless node.

In some aspects, the first signal carries a communication and processing the first signal based at least in part on the time domain reconfiguration comprises storing the communication in a memory, the at least one second signal comprises a plurality of signals, and wherein transmitting the at least one second signal comprises: transmitting a first signal of the plurality of signals at a first time, wherein the first signal of the plurality of signals comprises a first re-generated version of the first signal; and transmitting a second signal of the plurality of signals at a second time that is different than the first time, wherein the second signal of the plurality of signals comprises a second re-generated version of the first signal.

In some aspects, the method includes determining that the second signal of the plurality of signals was received by a wireless node; and removing the stored communication from the memory based at least in part on the determination that the second signal of the plurality of signals was received by the wireless node.

In some aspects, the method includes receiving an acknowledgement feedback message corresponding to the second signal of the plurality of signals, wherein the determination that the second signal of the plurality of signals was received by the wireless node is based at least in part on the acknowledgement feedback message.

In some aspects, the method includes determining that a feedback timer has expired, wherein the feedback timer is associated with a time period for receiving an acknowledgement feedback message corresponding to the second signal of the plurality of signals, wherein the determination that the second signal of the plurality of signals was received by the wireless node is based at least in part on the expiration of the feedback timer.

In some aspects, the configuration comprises a retransmission configuration that indicates retransmission information associated with the first signal, and transmitting the second signal of the plurality of signals comprises transmitting the second signal of the plurality of signals based at least in part on the retransmission information.

In some aspects, the retransmission configuration indicates at least one resource to be used to transmit the second signal of the plurality of signals.

In some aspects, the method includes transmitting, to the control node, a control message that comprises at least one of: a request for the retransmission configuration, or a suggestion associated with the retransmission configuration.

In some aspects, the retransmission information is carried by a control message.

In some aspects, the retransmission information is carried by the first signal.

In some aspects, transmitting the at least one second signal comprises refraining from transmitting the retransmission information.

In some aspects, the first signal comprises at least one header that carries the retransmission information.

In some aspects, transmitting the at least one second signal comprises refraining from transmitting the at least one header.

In some aspects, the retransmission information indicates a number of retransmissions associated with the first signal.

In some aspects, a method of wireless communication performed by a control node includes: determining a configuration that indicates at least one of a time domain reconfiguration or a frequency domain reconfiguration to be used by a repeater node to process a first signal and generate at least one second signal based at least in part on the processed first signal; and transmitting the configuration to the repeater node.

In some aspects, the method includes transmitting the first signal to the repeater node.

In some aspects, transmitting the first signal comprises transmitting a millimeter wave wireless signal.

In some aspects, the first signal comprises at least one of: a physical downlink control channel communication, a physical downlink shared channel communication, a physical uplink control channel communication, a physical uplink shared channel communication, a physical random access channel communication, a physical sidelink channel communication, a reference signal communication, or an acknowledgement or negative acknowledgement feedback message.

In some aspects, the configuration indicates a digital processing operation that includes the at least one of the time domain reconfiguration or the frequency domain reconfiguration, and the configuration comprises an indication to process the first signal based at least in part on configuration by performing the digital processing operation.

In some aspects, the first signal is associated with a first frequency domain resource having a first center frequency, and the configuration comprises an indication to transmit the at least one second signal using a second frequency domain resource having a second center frequency, wherein the second center frequency is different than the first center frequency.

In some aspects, the first frequency domain resource comprises at least one of: a resource element, a bandwidth, or a bandwidth part.

In some aspects, the first frequency domain resource is the bandwidth part and is associated with at least one of: a front haul link between the control node and the repeater node, an access link between the control node and the repeater node, or a wireless node.

In some aspects, the configuration comprises a frequency shift configuration that indicates the second frequency domain resource.

In some aspects, the configuration comprises: an indication to obtain channel information associated with the second frequency domain resource; and an indication to transmit, to the control node, a control message that indicates the channel information, wherein the frequency shift configuration indicates the second frequency domain resource based at least in part on the channel information.

In some aspects, the frequency shift configuration indicates a difference between the first center frequency and the second center frequency.

In some aspects, the difference comprises a number of resource elements.

In some aspects, the difference comprises a frequency offset value.

In some aspects, the method includes receiving, from the repeater node, a control message that comprises at least one of: a request for the frequency shift configuration or a suggestion associated with the frequency shift configuration.

In some aspects, the suggestion indicates at least one of a suggested frequency domain resource or a suggested frequency offset.

In some aspects, the frequency shift configuration is carried by a control message.

In some aspects, the frequency shift configuration is carried by the first signal.

In some aspects, the first signal comprises at least one header that carries the frequency shift configuration.

In some aspects, the first signal carries an aggregated communication comprising a plurality of communications, wherein the plurality of communications are frequency division multiplexed, and the configuration comprises an indication to process the first signal based at least in part on the frequency domain reconfiguration by: segmenting the aggregated communication into the plurality of communications, wherein generating the at least one second signal comprises generating a plurality of signals, wherein the plurality of signals carry the plurality of communications.

In some aspects, the configuration comprises a segmentation configuration that indicates segmentation information associated with the aggregated communication, and the configuration comprises an indication to segment the aggregated communication based at least in part on the segmentation information.

In some aspects, the segmentation information identifies the plurality of communications.

In some aspects, the method includes receiving, from the repeater node, a control message that comprises at least one of: a request for the segmentation configuration, or a suggestion associated with the segmentation configuration.

In some aspects, the segmentation information is carried by a control message.

In some aspects, the segmentation information is carried by the first signal.

In some aspects, the first signal comprises at least one header that carries the segmentation information.

In some aspects, the configuration comprises an indication to transmit the at least one second signal by transmitting a plurality of signals using a plurality of frequency domain resources.

In some aspects, the configuration comprises an indication to transmit the plurality of signals by transmitting the plurality of signals using a plurality of time domain resources.

In some aspects, the configuration indicates the plurality of frequency domain resources.

In some aspects, the configuration comprises: an indication to transmit a first communication of the plurality of communications using a first signal of the plurality of signals; and an indication to transmit a second communication of the plurality of communications using a second signal of the plurality of signals.

In some aspects, the configuration comprises an indication to transmit the plurality of signals by: transmitting the first signal of the plurality of signals using a first frequency domain resource and transmitting the second signal of the plurality of signals using a second frequency domain resource that is different than the first frequency domain resource.

In some aspects, the first frequency domain resource is associated with a front haul link between the control node and the repeater node, and the second frequency domain resource is associated with an access link between the control node and the repeater node.

In some aspects, the configuration comprises an indication to transmit the plurality of signals by: transmitting the first signal of the plurality of signals using a first beam; and transmitting the second signal of the plurality of signals using a second beam that is different than the first beam.

In some aspects, the first beam corresponds to a first wireless node, and the second beam corresponds to a second wireless node.

In some aspects, the configuration comprises an indication to process a third signal received by the repeater node based at least in part on the frequency domain reconfiguration by aggregating, using frequency division multiplexing, the first signal and the third signal to form an aggregated signal, the at least one second signal comprises the aggregated signal.

In some aspects, the configuration comprises an aggregation configuration that indicates aggregation information associated with the aggregated signal, and the configuration comprises an indication to aggregate the first signal and the third signal based at least in part on the aggregation information.

In some aspects, the aggregation configuration indicates at least one resource to be used to transmit the aggregated signal.

In some aspects, the method includes receiving, from the repeater node, a control message that comprises at least one of: a request for the aggregation configuration, or a suggestion associated with the aggregation configuration.

In some aspects, the aggregation information is carried by a control message.

In some aspects, the aggregation information is carried by the first signal.

In some aspects, the first signal comprises at least one header that carries the aggregation information.

In some aspects, the first signal is associated with a first beam, and the third signal is associated with at least one of the first beam or a second beam.

In some aspects, the configuration indicates a mapping from a first set of resources associated with the first signal to a second set of resources corresponding to the at least one second signal.

In some aspects, the first set of resources comprises a first set of resource elements, and the second set of resources comprises a second set of resource elements.

In some aspects, the first set of resources comprises a first set of symbols, and the second set of resources comprises a second set of symbols.

In some aspects, the method includes receiving, from the repeater node, a control message that comprises at least one of: a request for the mapping, or a suggestion associated with the mapping.

In some aspects, the mapping is carried by a control message.

In some aspects, the mapping is carried by the first signal.

In some aspects, the first signal comprises at least one header that carries the mapping.

In some aspects, the first signal carries a communication, and the time domain reconfiguration comprises: an indication to segment the communication into a plurality of communication segments; and an indication to generate the at least one second signal by generating a plurality of signals that carry the plurality of communication segments.

In some aspects, the configuration comprises a segmentation configuration that indicates segmentation information associated with the communication, and the configuration comprises an indication to segment the communication based at least in part on the segmentation information.

In some aspects, the segmentation information identifies the plurality of communication segments.

In some aspects, the method includes receiving, from the repeater node, a control message that comprises at least one of: a request for the segmentation configuration, or a suggestion associated with the segmentation configuration.

In some aspects, the suggestion indicates a suggested number of communication segments.

In some aspects, the segmentation information is carried by a control message.

In some aspects, the segmentation information is carried by the first signal.

In some aspects, the first signal comprises at least one header that carries the segmentation information.

In some aspects, the configuration indicates a plurality of time domain resources to be used by the repeater node for transmitting the at least one second signal.

In some aspects, the configuration indicates a mapping from a set of resources associated with the first signal to a set of segment indices corresponding to the plurality of communication segments.

In some aspects, the configuration indicates: a first mapping from a first resource of the set of resources to a first segment index of the set of segment indices; and a second mapping from a second resource of the set of resources to a second segment index of the set of segment indices.

In some aspects, the set of resources comprise at least one of a time domain resource or a frequency domain resource.

In some aspects, the segmentation configuration comprises: an indication to transmit a first communication segment of the plurality of communication segments using a first signal of the plurality of signals, and an indication to transmit a second communication segment of the plurality of communication segments using a second signal of the plurality of signals.

In some aspects, the configuration comprises an indication to transmit the at least one second signal by: transmitting the first signal of the plurality of signals using a first time domain resource; and the method includes wherein the configuration comprises an indication to transmit the at least one second signal by: transmitting the first signal of the plurality of signals using a first time domain resource; and transmitting the second signal of the plurality of signals using a second time domain resource that is different than the first time domain resource.

In some aspects, the configuration comprises an indication to transmit the at least one second signal by: transmitting the first signal of the plurality of signals using a first beam; and the method includes wherein the configuration comprises an indication to transmit the at least one second signal by: transmitting the first signal of the plurality of signals using a first beam; and transmitting the second signal of the plurality of signals using a second beam that is different than the first beam.

In some aspects, the configuration comprises an indication to transmit the at least one second signal by: transmitting the first signal of the plurality of signals to a first wireless node; and the method includes wherein the configuration comprises an indication to transmit the at least one second signal by: transmitting the first signal of the plurality of signals to a first wireless node; and transmitting the second signal of the plurality of signals to a second wireless node that is different than the first wireless node.

In some aspects, wherein the first signal carries a communication and wherein the configuration comprises an indication to process the first signal based at least in part on the time domain reconfiguration by storing the communication in a memory, wherein the at least one second signal comprises a plurality of signals, and wherein the configuration comprises an indication to transmit the at least one second signal by: transmitting a first signal of the plurality of signals at a first time, wherein the first signal of the plurality of signals comprises a first re-generated version of the first signal; and transmitting a second signal of the plurality of signals at a second time that is different than the first time, wherein the second signal of the plurality of signals comprises a second re-generated version of the first signal.

In some aspects, the configuration comprises an indication to remove the stored communication from the memory based at least in part on a determination that the second signal of the plurality of signals was received by a wireless node.

In some aspects, the configuration comprises a retransmission configuration that indicates retransmission information associated with the first signal, and the configuration comprises an indication to transmit the second signal of the plurality of signals based at least in part on the retransmission information.

In some aspects, the retransmission configuration indicates at least one resource to be used to transmit the second signal of the plurality of signals.

In some aspects, the method includes receiving, from the repeater node, a control message that comprises at least one of: a request for the retransmission configuration or a suggestion associated with the retransmission configuration.

In some aspects, the retransmission information is carried by a control message.

In some aspects, the retransmission information is carried by the first signal.

In some aspects, the first signal comprises at least one header that carries the retransmission information.

In some aspects, the retransmission information indicates a number of retransmissions associated with the first signal.

In some aspects, a repeater node for wireless communication includes: a memory; and one or more processors coupled to the memory, the one or more processors configured to: receive, from a control node, a configuration that indicates at least one of a time domain reconfiguration or a frequency domain reconfiguration; receive a first signal; process the first signal based at least in part on the configuration; generate at least one second signal based at least in part on the processed first signal; and transmit the at least one second signal.

In some aspects, a control node for wireless communication includes: a memory; and one or more processors coupled to the memory, the one or more processors configured to: determine a configuration that indicates at least one of a time domain reconfiguration or a frequency domain reconfiguration to be used by a repeater node to process a first signal and generate at least one second signal based at least in part on the processed first signal; and transmit the configuration to the repeater node.

In some aspects, a non-transitory computer-readable medium storing a set of instructions for wireless communication includes: one or more instructions that, when executed by one or more processors of a repeater node, cause the repeater node to: receive, from a control node, a configuration that indicates at least one of a time domain reconfiguration or a frequency domain reconfiguration; receive a first signal; process the first signal based at least in part on the configuration; generate at least one second signal based at least in part on the processed first signal; and transmit the at least one second signal.

In some aspects, a non-transitory computer-readable medium storing a set of instructions for wireless communication includes: one or more instructions that, when executed by one or more processors of a control node, cause the control node to: determine a configuration that indicates at least one of a time domain reconfiguration or a frequency domain reconfiguration to be used by a repeater node to process a first signal and generate at least one second signal based at least in part on the processed first signal; and transmit the configuration to the repeater node.

In some aspects, an, apparatus for wireless communication includes: means for receiving, from a control node, a configuration that indicates at least one of a time domain reconfiguration or a frequency domain reconfiguration; means for receiving a first signal; means for processing the first signal based at least in part on the configuration; means for generating at least one second signal based at least in part on the processed first signal; and means for transmitting the at least one second signal.

In some aspects, an apparatus for wireless communication includes: means for determining a configuration that indicates at least one of a time domain reconfiguration or a frequency domain reconfiguration to be used by a repeater node to process a first signal and generate at least one second signal based at least in part on the processed first signal; and means for transmitting the configuration to the repeater node.

In some aspects, a method, device, apparatus, system, computer program product, non-transitory computer-readable medium, user equipment, base station, node, wireless node, repeater node, control node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-6 are diagrams illustrating examples associated with time and/or frequency domain reconfiguration of a forwarded signal using a repeater node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
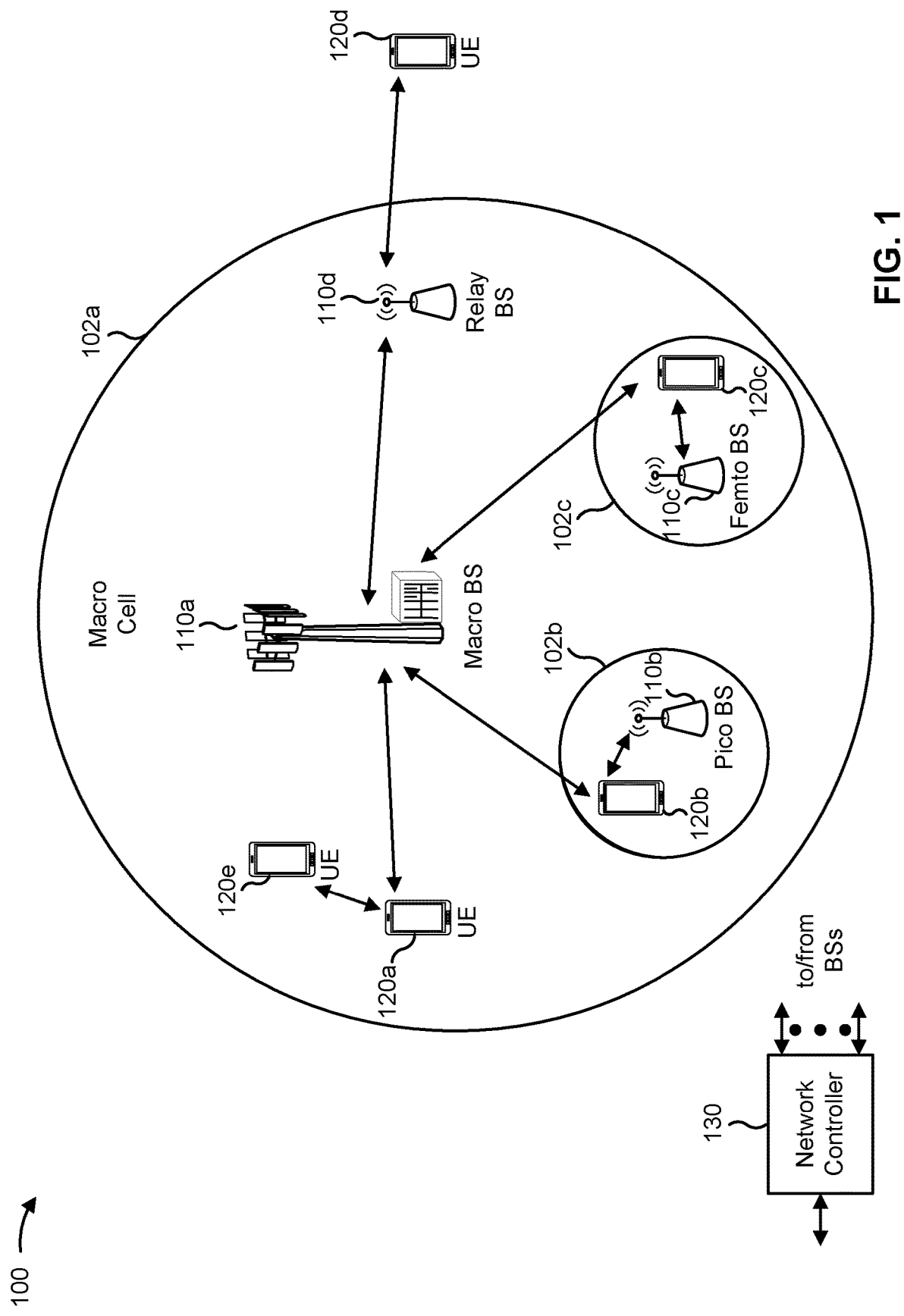
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
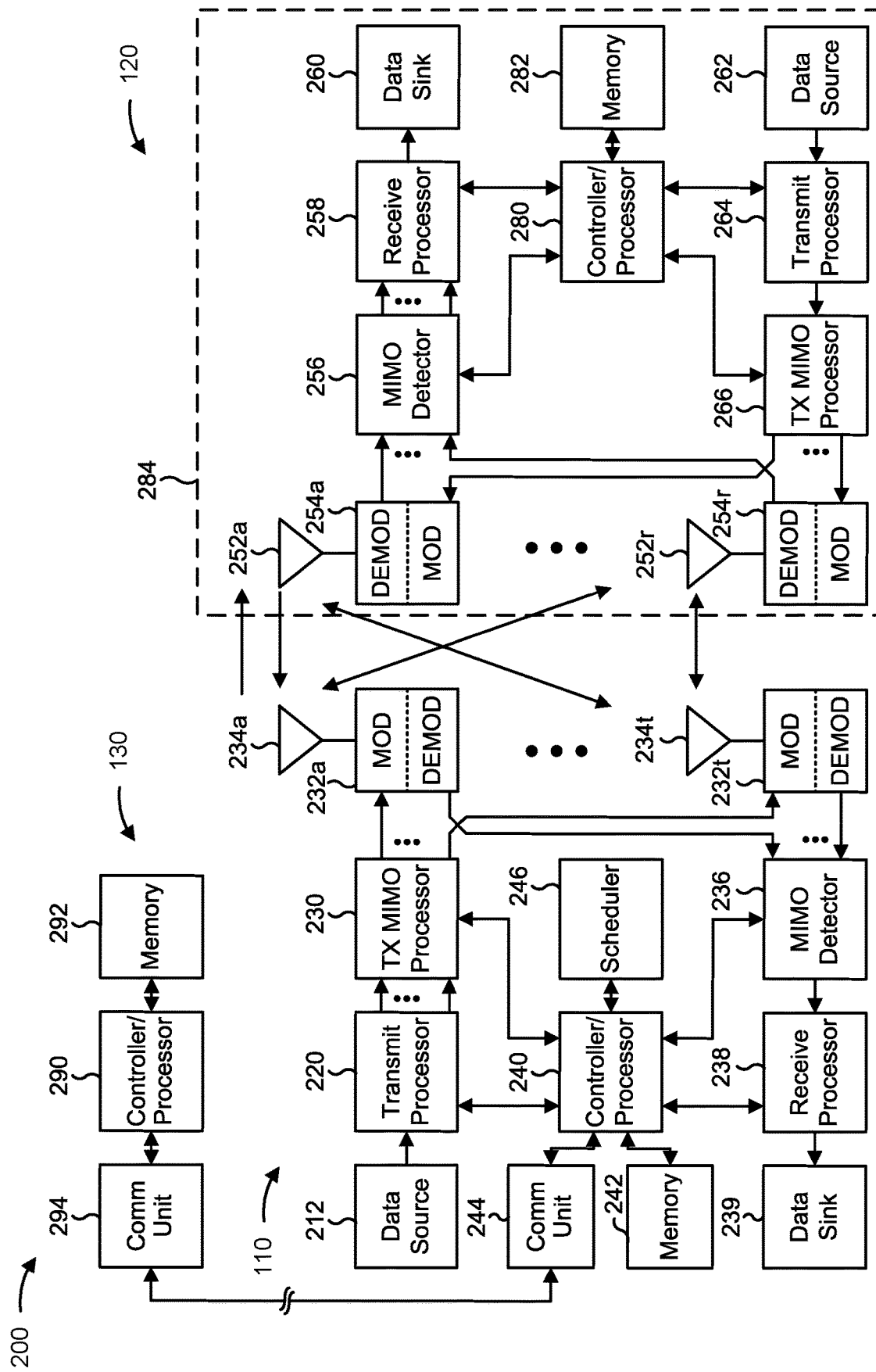
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-14).

Controller/processor 240 of base station 110, controller/processor 280 of UE 120, and/or any other component(s) of FIG. 2 may perform one or more techniques associated with time and/or frequency domain reconfiguration of a forwarded signal using a repeater node, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, a repeater node (e.g., a base station 110, a UE 120, a reduced capacity UE, and/or the like) may include means for receiving, from a control node, a configuration that indicates at least one of a time domain reconfiguration or a frequency domain reconfiguration, means for receiving a first signal, means for processing the first signal based at least in part on the configuration, means for generating at least one second signal based at least in part on the processed first signal, means for transmitting the at least one second signal, and/or the like. In some aspects, such means may include one or more components of base station 110 and/or UE 120 described in connection with FIG. 2, such as controller/processor 240 or 280, transmit processor 220 or 264, TX MIMO processor 230 or 266, MOD 232 or 254, antenna 234 or 252, DEMOD 232 or 254, MIMO detector 236 or 256, receive processor 238 or 258, and/or the like.

In some aspects, a control node (e.g., a base station 110, an integrated access and backhaul (IAB) donor, an IAB node, a UE 120, and/or the like) may include means for determining a configuration that indicates at least one of a time domain reconfiguration or a frequency domain reconfiguration to be used by a repeater node to process a first signal and generate at least one second signal based at least in part on the processed first signal, means for transmitting the configuration to a repeater node, and/or the like. In some aspects, such means may include one or more components of base station 110 and/or UE 120 described in connection with FIG. 2, such as controller/processor 240 or 280, transmit processor 220 or 264, TX MIMO processor 230 or 266, MOD 232 or 254, antenna 234 or 252, DEMOD 232 or 254, MIMO detector 236 or 256, receive processor 238 or 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
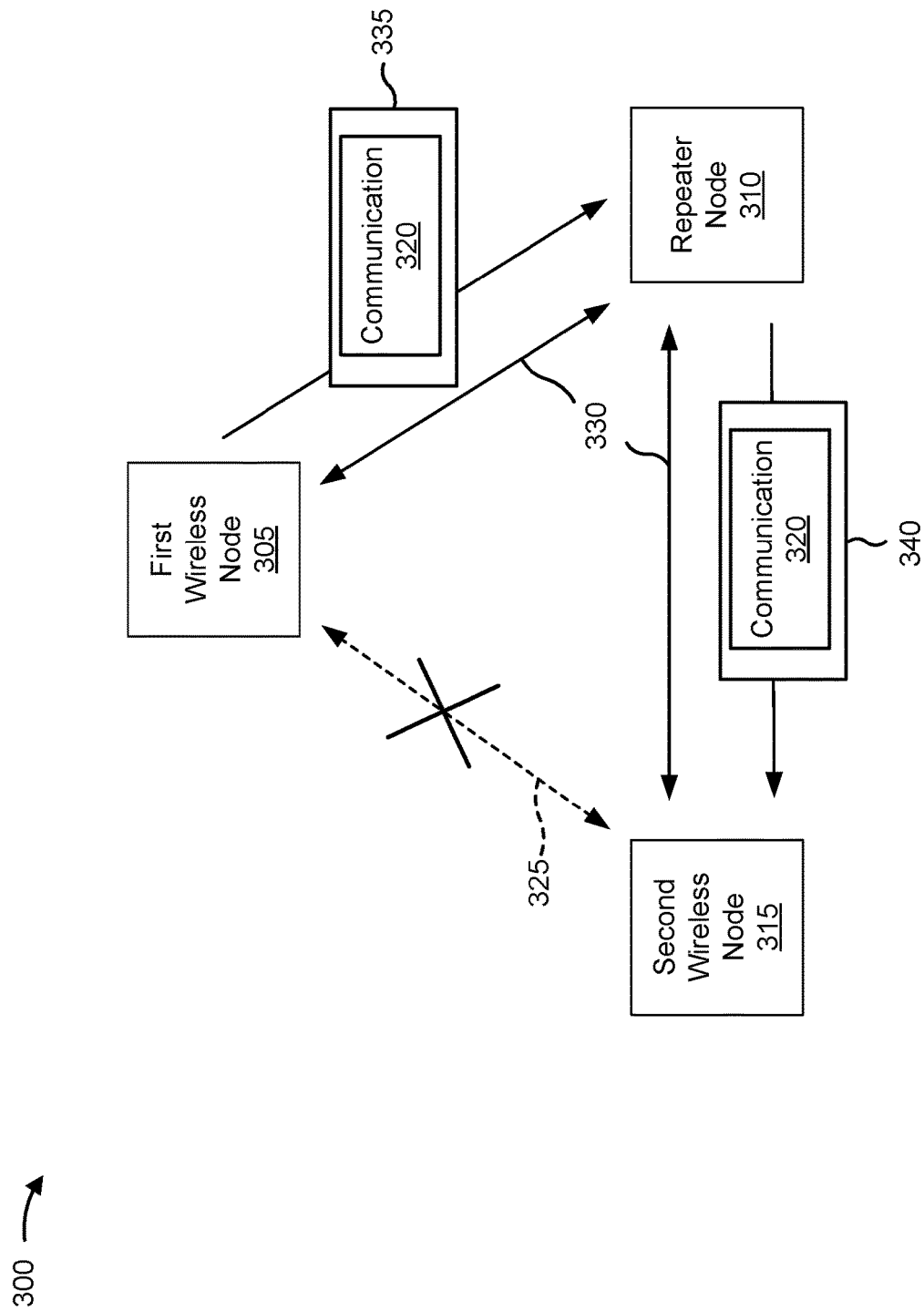
FIG. 3 is a diagram illustrating an example of a repeater node that forwards communications between a first wireless node and a second wireless node, in accordance with the present disclosure.

FIG. 3 is a diagram illustrating an example 300 of a repeater node 310 that forwards communications between a first wireless node 305 and a second wireless node 315, in accordance with the present disclosure. In some aspects, the first wireless node 305 may be an IAB node, an IAB donor, a base station 110, a UE 120, and/or the like. In some aspects, the repeater node 310 may be a repeater device, a base station 110, a UE 120, a millimeter wave repeater, a digital repeater, an analog repeater, and/or the like. In some aspects, the second wireless node 315 may be an IAB node, an IAB donor, a base station 110, and UE 120, another repeater node 310, and/or the like. In some aspects, the first wireless node 305 and/or the second wireless node 315 may be aware of the repeater node 310. In some aspects, the first wireless node 305 and/or the second wireless node 315 may be unaware of the repeater node 310.

The first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like. Therefore, the first wireless node 305 may communicate with the second wireless node 315 using an indirect link 330.

As shown, the first wireless node 305 may transmit a first signal 335 carrying the communication 320 to the repeater node 310. In some aspects, the first wireless node 305 may address the communication 320 to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305, which addresses the communication 320 to the second wireless node 315 (e.g., when the first wireless node 305 is unaware of the repeater node 310).

As shown in FIG. 3, the communication 320 may be forwarded by the repeater node 310. For example, the repeater node 310 may receive the first signal 335 carrying the communication 320 and may generate a second wireless signal 340 (e.g., by re-generating the first signal 335). The repeater node 310 may transmit the second wireless signal 340, carrying the communication 320, to the second wireless node 315.

In some cases, an indirect link 330 may be an access link, a side link, or a fronthaul link. For example, the indirect link 330 between the first wireless node 305 and the repeater node 310 may be a fronthaul link and the indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

In a typical scenario, a repeater node may receive a first signal, generate a second signal that is a re-generated version of the first signal, and transmit the second signal using the same time and/or frequency domain configuration that was used to transmit the first signal. A time domain configuration of a signal refers to the relationship between the signal and the communication or communications that the signal carries in the context of time domain resources. For example, if a communication is carried in a first signal that carries only that communication, then a second signal having the same time domain configuration may include a single transmission of the second signal carrying only that communication. If a number of communications are carried in a transmission of a first signal, then a second signal having the same time domain configuration may include a transmission of the second signal, where the second signal carries the communications.

In some aspects, for example, an analog repeater node may forward a signal from a first wireless node to a second wireless node without storing the signal. Rather, an analog repeater node simply receives the signal and re-transmits the signal without performing any digital processing on the signal. As a result, an analog repeater node may not provide control over the timing of a re-transmission of a signal. Instead, the re-transmitted signal has the same time domain configuration as the original signal and is re-transmitted immediately after receipt by the repeater node. Some repeater nodes may facilitate digitizing a signal and storing the digitized signal so that a re-generated version of the signal can be transmitted at a later time. However, these repeater nodes also typically re-generate and transmit a signal that has the same time domain configuration as the original signal. As a result, typical repeater nodes may not provide a flexible solution that can be controlled to adapt to various scenarios, channel conditions, traffic variances, repeater node load changes, and/or the like.

A frequency domain configuration of a signal refers to the relationship between the signal and the communication or communications that the signal carries in the context of frequency domain resources. For example, if a communication is carried in a first signal that uses a first set of frequency resources having a first center frequency (or bandwidth, bandwidth part (BWP), and/or the like), then a second signal carrying the communication using a second set of frequency resources having the first center frequency (or bandwidth, BWP, and/or the like) may have the same frequency domain configuration. If a number of communications are frequency division multiplexed in a transmission of a first signal, then a second signal having the same frequency domain configuration may include a transmission of the second signal, where the second signal carries the communications frequency division multiplexed in the same manner. As a result, typical repeater nodes may not provide a flexible solution that can be controlled to adapt to various scenarios, channel conditions, traffic variances, repeater node load changes, and/or the like.

Aspects of techniques and apparatuses described herein provide a repeater node that may be at least partially controlled by a control node to facilitate providing a time and/or frequency domain reconfiguration of a forwarded wireless signal. In some aspects, a control node may transmit a configuration to the repeater node. The configuration may indicate at least one of a time domain reconfiguration or a frequency domain reconfiguration. The repeater node may receive a first signal, process the first signal based at least in part on the configuration, and generate at least one second signal based at least in part on the processed first signal. The repeater node may transmit the at least one second signal.

In this way, aspects facilitate providing a repeater node that may be adapted by a control node to perform a time and/or frequency domain reconfiguration of a forwarded signal. For example, in some aspects, a signal carrying a communication may be forwarded as a plurality of signals, each carrying segments of the communication. In some aspects, multiple signals may be reconfigured in the time domain and forwarded as a single, aggregated signal. In some aspects, time domain reconfiguration may include retransmitting the forwarded signal to improve likelihood of receipt by a receiving wireless node. In some aspects, a signal that is received using a first frequency resource having a first center frequency may be forwarded using a second frequency resource having a second center frequency that is different than the first center frequency. In some aspects, a signal carrying a plurality of communications may be forwarded as a plurality of signals, each carrying one or more of the communications. In some aspects, multiple signals may be reconfigured in the frequency and/or time domain and forwarded as a single, aggregated signal. In some aspects, frequency domain reconfiguration may include mapping a first set of resources to a second set of resources. As a result of time and/or frequency domain reconfiguration, aspects of techniques and apparatuses described herein may facilitate providing indirect communication links that are more adaptable to channel quality differences, timing issues, frequency usage issues, traffic conditions, load changes, and/or the like, thereby providing more reliable indirect communication links.

As indicated above, FIG. 3 is provided as an example. Other examples may differ from what is described with respect to FIG. 3.

Figure 4:
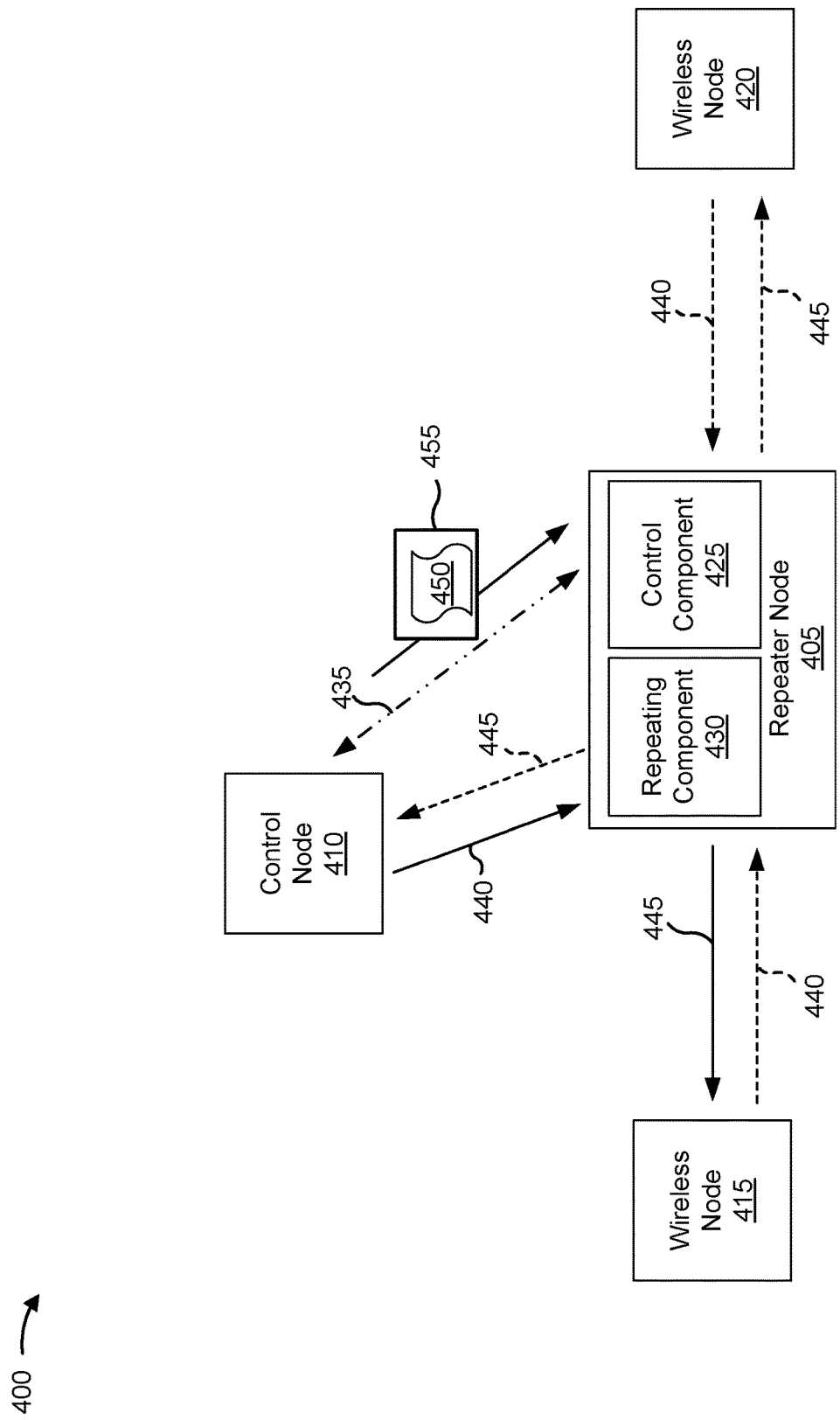

FIG. 4 is a diagram illustrating an example 400 associated with time and/or frequency domain reconfiguration of a forwarded signal, in accordance with the present disclosure. As shown, the example 400 includes a repeater node 405 that may communicate with a control node 410, a wireless node 415, and a wireless node 420. In some aspects, the repeater node 405 may include the repeater node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the repeater node 405 may include a millimeter wave repeater that is configured to receive a millimeter wave signal and to transmit a re-generated version of the millimeter wave signal. As shown in FIG. 4, the repeater node 405 may include a control component 425 and a repeating component 430. In some aspects, the control component 425 may facilitate establishing a wireless control interface 435 between the repeater node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, for example, the control component 425 may be based at least in part on an LTE narrow band IoT UE, an NR sub-6 reduced capability UE, and/or the like. In some aspects, the control component 425 may be based on a UE specification that specifies a plurality of functions supported by a UE, but where the control component 425 does not support all of the plurality of functions.

In some aspects, the repeating component 430 may perform one or more repeating operations. A repeating operation may be a process that includes the repeater node 405 receiving a first signal 440, performing one or more processing operations on the first signal 440 to generate a second signal 445, and transmitting the second signal 445.

As shown by the solid arrow indicated by reference number 440, the repeater node 405 may receive the first signal 440 from the control node 410. As shown by the dashed arrows indicated by reference number 440, the repeater node 405 may receive the first signal 440 from the wireless node 415 or the wireless node 420. In some aspects, the first signal 440 may be one of a plurality of signals that may be received by the repeater node 405 from one or more devices (e.g., the control node 410, the wireless node 415, the wireless node 420, and/or the like).

As shown by the solid arrow indicated by reference number 445, the repeater node 405 may transmit the second signal 445 to the wireless node 415. As shown by the dashed arrows indicated by reference number 445, the repeater node 405 may transmit the second signal 445 to the control node 410 or the wireless node 420. In some aspects, the second signal 445 may be one of a plurality of signals that may be generated and transmitted to one or more receiving devices (e.g., the control node 410, the wireless node 415, the wireless node 420, and/or the like).

In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 420. In some aspects, as shown, the first signal 440 may be transmitted from the wireless node 415 or 420 and addressed to the control node 410. In some aspects, the first signal 440 may be transmitted from the wireless node 415 or 420 and addressed to the control node 410, the other wireless node 415 or 420, and/or the like. In some aspects, the first signal 440 may be addressed to a plurality of wireless nodes (e.g., wireless nodes 415 and 420, control node 410, and/or the like). In some aspects, the first signal 440 may include a physical downlink control channel (PDCCH) transmission, a physical downlink shared channel (PDSCH) transmission, a physical uplink control channel (PUCCH) transmission, a physical uplink shared channel (PUSCH) transmission, a physical random access channel (PRACH) communication, a physical sidelink channel communication, a reference signal (RS) communication, an acknowledgement or negative acknowledgement (ACK/NACK) feedback message, and/or the like.

In some aspects, the repeating component 430 may perform the one or more repeating operations based at least in part on a configuration established using the control component 425. For example, in some aspects, the control node 410 may transmit a configuration 450 using a control message 455, and the repeater node 405 may receive the control message 455 using the control component 425. In some aspects, the configuration 450 may indicate a time and/or frequency domain reconfiguration.

The control node 410 may transmit the configuration 450 in the control message 455 via the control interface 435. In some aspects, control messages may be specified for communication between the repeater node 405 and the control node 410 in accordance with a specification of the control interface 435. In some aspects, the configuration 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, the control message 455 may be carried using a radio resource control (RRC) message, downlink control information (DCI), a MAC control element (MAC-CE), and/or the like.

In some aspects, the control interface 435 may be an in-band control interface. For example, in some aspects, the first signal 440 may be transmitted by the control node 410 (and/or the wireless node 415, the wireless node 420, and/or the like) and received by the repeater node 405 using the same frequency that is used for transmitting and receiving control messages 455. In some aspects, a control message 455 may be included within the first signal 440. In some aspects, the configuration 450 may be included within the first signal 440. In some aspects, the configuration 450 may be carried in a front haul physical downlink control channel (FH-PDCCH) control message (which may be the control message 455). In some aspects, the FH-PDCCH control message may include DCI scrambled by a front haul radio network temporary identifier (FH-RNTI). The FH-RNTI may be associated with the control component. In some aspects, as indicated above, the configuration 450 may be carried in a MAC-CE of a PDSCH transmission that is received using the repeating component 430, which may extract the configuration 450 (and/or other control messages, configuration information, and/or the like) and provide the extracted configuration 450 (and/or other control messages, configuration information, and/or the like) to the control component 425.

In some aspects, the control interface 435 may be an out-of-band control interface. For example, in some aspects, the repeating component 430 may receive and/or transmit signals using a first frequency (or range of frequencies), and the control component 425 may receive and/or transmit control messages using a second frequency (or range of frequencies). In some aspects, the second frequency may be lower than the first frequency. That is, for example, in some aspects, the repeating component 430 may communicate using millimeter waves, while the control component 425 may communicate using frequencies that are lower than millimeter wave frequencies. For example, in some aspects, the control component 425 may communicate using sub-6 (sub-6 GHz) frequencies. In some aspects, the control node 410 may transmit, and the repeater node 405 may receive, a configuration of the control interface 435 or one or more aspects thereof. In some aspects, for example, the control node 410 may transmit a configuration of a frequency, a bandwidth, a BWP, and/or the like. In some aspects, the repeating component 430 may communicate using a first RAT (e.g., NR) and the control component 425 may communicate using a second RAT (e.g., Bluetooth, WiFi, and/or the like). In some aspects, the control interface 435 may include an access link between the control component 425 and the control node 410.

In some aspects, the configuration 450 may configure any number of different types of settings, configurations, digital processing operations, reception operations, buffering operations, forwarding (transmission) operations, time domain reconfigurations, frequency domain reconfigurations, and/or the like. In some aspects, the repeater node 405 may transmit, and the control node 410 may receive, one or more control messages. For example, in some aspects, the repeater node 405 may, using the control component 425, transmit a control message via the control interface 435 to the control node. The control message transmitted by the repeater node 405 may indicate a configuration of the repeater node 405, a capability of the repeater node 405, a status of the repeater node 405, and/or the like.

As indicated above, in some aspects, the control node 410 may configure the repeater node 405 for a particular repeating operation by transmitting the configuration 450 to the repeater node 405. In some aspects, the configuration 450 may indicate a processing operation. The processing operation may include a processing option selected from a plurality of processing options (e.g., the processing options 525-550 shown in, and described below in connection with, FIG. 5).

In some aspects, the configuration 450 may include one or more information elements (IEs) that indicate a reception configuration, a buffering configuration, a forwarding configuration, an information request, and/or the like.

In some aspects, the reception configuration may be used to configure aspects of a reception operation of the repeating component 430 with respect to receiving the first signal 440. The reception configuration may indicate, for example, a reception analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, aspects of a time domain reconfiguration associated with the first signal 440, aspects of a frequency domain reconfiguration associated with the first signal 440, and/or the like.

In some aspects, the buffering configuration may be used to configure aspects of a buffering operation of the repeating component 430 with respect to buffering a digitized form of the first signal 440. In some aspects, the buffering configuration may indicate an analog-to-digital converter (ADC) setting, a digital-to-analog converter (DAC) setting, an in-phase and quadrature (IQ) sample compression setting, an IQ sample decompression setting, and/or the like.

In some aspects, the forwarding configuration may be used to configure aspects of a forwarding operation of the repeating component 430 with respect to transmitting the second signal 445, which may be a re-generated form of the first signal 440. In some aspects, the forwarding configuration may include a transmission beamforming configuration, a time domain resource associated with transmitting the second signal 445, a transmission power setting, a transmission amplification setting, a transmission center frequency, a numerology associated with transmitting the second signal 445, a digital transmitter beamforming configuration, RE mapping information associated with transmitting the second signal 445, a layer mapping configuration, a precoding configuration, a scrambling identifier associated with transmitting the second signal 445, a coding configuration associated with transmitting the second signal 445, aspects of a time domain reconfiguration associated with the second signal 445, aspects of a frequency domain reconfiguration associated with the second signal 445, and/or the like.

In some aspects, the information request may be used to configure aspects of a reporting operation of the repeating component 430 with respect to providing information to the control node 410. The information may include information about the operation of the repeater node 405, information about the configuration of the repeater node 405, information about settings of the repeater node 405, information about a channel, information about a communication, and/or the like. In some aspects, the information request may include a request for a buffer status, a power status, a measurement report, a capability of the repeater node 405, a configuration of the repeater node 405, and/or the like.

As indicated above, FIG. 4 is provided as an example. Other examples may differ from what is described with respect to FIG. 4.

Figure 5:
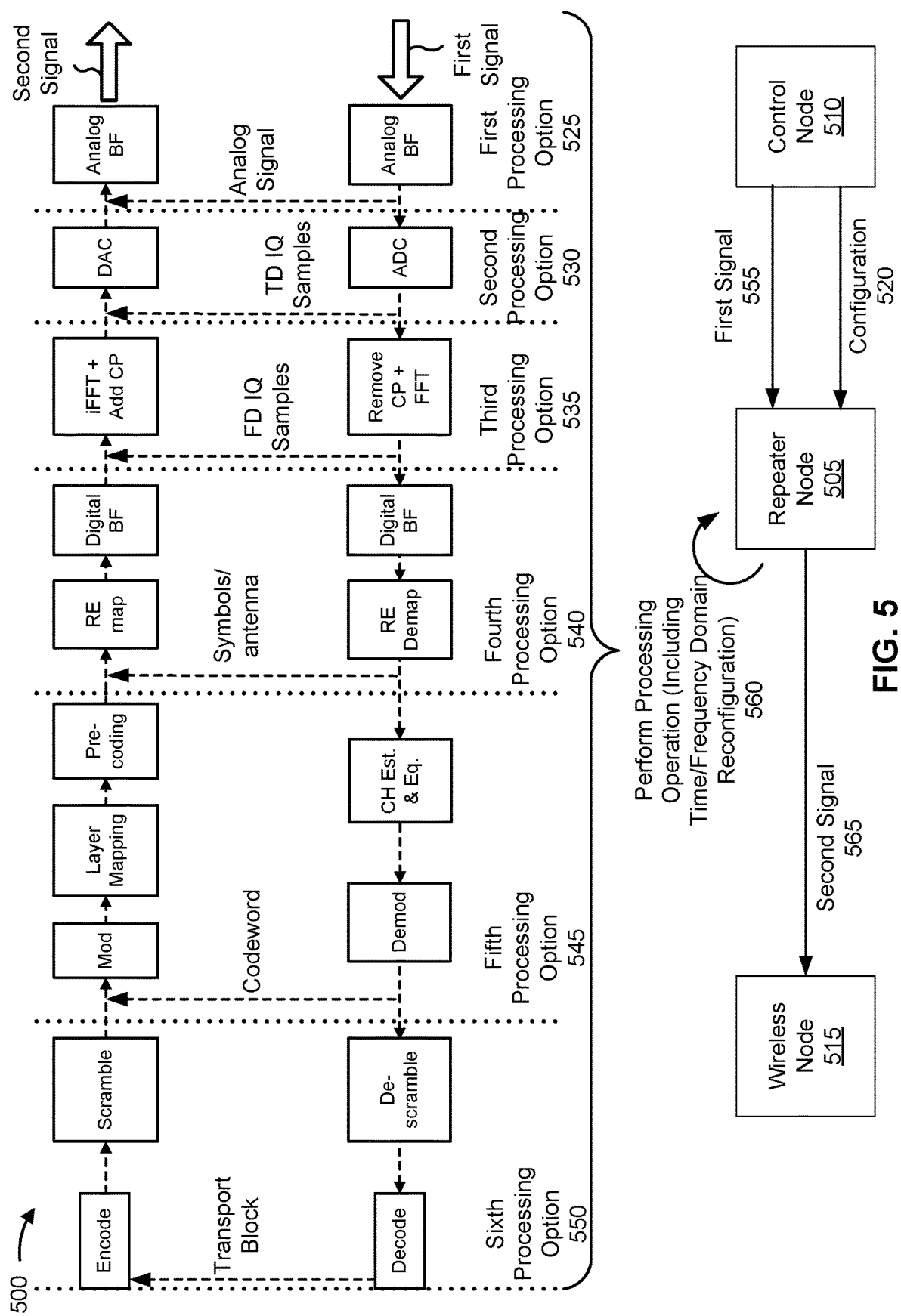

FIG. 5 is a diagram illustrating an example 500 associated with frequency domain reconfiguration of a forwarded signal, in accordance with the present disclosure. As shown, the example 500 includes a repeater node 505 that may communicate with a control node 510 and a wireless node 515. In some aspects, the repeater node 505 may communicate with one or more additional wireless nodes (not shown).

In some aspects, the repeater node 505 may include the repeater node 405 shown in FIG. 4, the repeater node 310 shown in FIG. 3, and/or the like. In some aspects, the control node 510 may include the control node 410 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like. In some aspects, the wireless node 515 may include the wireless node 415 shown in FIG. 4, the wireless node 420 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

As shown by reference number 520, the control node 510 may transmit, and the repeater node 505 may receive, a configuration. In some aspects, the configuration may be, be similar to, include, or be included in the configuration 450 shown in FIG. 4. In some aspects, the configuration may be received using a control component (e.g., the control component 425 shown in FIG. 4) of the repeater node 505 via a control interface (e.g., the control interface 435 shown in FIG. 4). The configuration may indicate a repeating operation that may include a processing operation. The processing operation may include, for example, a time domain reconfiguration, a frequency domain reconfiguration, a processing operation, and/or the like.

A repeating operation may include the repeater node 505 receiving a first signal from a first wireless node, processing the signal to generate a second signal, and transmitting the second signal to a second wireless node. In some aspects, processing the first signal may include re-generating the first signal (by generating a re-generated version of the first signal, which may be referred to herein, interchangeably, as a "re-generated signal") based at least in part on the processing of the first signal. In this way, the repeater node may repeat the signal received from the first wireless node to the second wireless node. Transmitting the re-generated signal may be referred to as forwarding the re-generated signal and/or performing a forwarding operation.

As shown in FIG. 5, the processing operation indicated by the configuration may include a processing option selected from a plurality of processing options. The plurality of processing options may include a first processing option 525 (shown as processing blocks and associated intermediate output, "analog signal," to the right of the first dotted vertical line from the right) that may be based at least in part on an analog processing of the received signal. The plurality of processing options may include a second processing option 530 (shown as processing blocks and associated intermediate outputs, "analog signal" and "TD IQ samples," to the right of the second dotted vertical line from the right) that may be based at least in part on determining and buffering time domain (TD) IQ samples.

The plurality of processing options may include a third processing option 535 (shown as processing blocks and associated intermediate outputs, "analog signal," "TD IQ samples," and "FD IQ samples," to the right of the third dotted vertical line from the right) that may be based at least in part on tone extraction. The tone extraction may include determining frequency domain (FD) IQ samples. The plurality of processing options may include a fourth processing option 540 (shown as processing blocks and associated intermediate outputs, "analog signal," "TD IQ samples," "FD IQ samples," and "symbols/antenna," to the right of the fourth dotted vertical line from the right) that may be based at least in part on RE extraction. Extraction of REs may include determining symbols and antenna elements, antenna configurations, and/or the like.

The plurality of processing options may include a fifth processing option 545 (shown as processing blocks and associated intermediate outputs, "analog signal," "TD IQ samples," "FD IQ samples," "symbols/antenna," and "codeword," to the right of the fifth dotted vertical line from the right) that may be based at least in part on channel estimation and equalization. Equalization of channels associated with extracted REs may be used to determine codewords. The plurality of processing options may include a sixth processing option 550 (shown as processing blocks and associated intermediate outputs, "analog signal," "TD IQ samples," "FD IQ samples," "symbols/antenna," "codeword," and "transport block," to the right of the sixth dotted vertical line from the right) that may be based at least in part on decoding the received signal to determine a transport block.

According to various aspects, the second, third, fourth, fifth, and sixth processing options 530-550 may be referred to as digital processing options since they include processing of digital information. A repeater node that is capable of performing, and/or configured to perform, only the first processing option may be referred to as an analog repeater. A repeater node that is capable of performing, and/or configured to perform, any one or more of the second, third, fourth, fifth, or sixth processing options 530-550 may be referred to as a digital repeater. The configuration may indicate a time domain reconfiguration and/or a frequency domain reconfiguration by indicating one or more aspects of a selected one of the processing options 525-550. In some aspects, the configuration may include information that may be used by the repeater node 505 to facilitate performing the processing option, as discussed below in connection with the various processing options.

As shown by reference number 555, the control node 510 may transmit, and the repeater node 505 may receive, a first signal. In some aspects, the first signal may be, be similar to, include, or be included in, the first signal 440 shown in FIG. 4. In some aspects, the first signal may be one of a plurality of signals that may be received and processed by the repeater node 505. The first signal may be transmitted by the control node 510, the wireless node 515, or another wireless node not shown in FIG. 5. In some aspects, the repeater node 505 may receive one or more additional signals from the control node 510, the wireless node 515, and/or another wireless node not shown in FIG. 5. As shown by reference number 560, the repeater node 505 may perform a processing operation on the first signal to generate a second signal. As shown, the processing operation may include a time domain reconfiguration and/or a frequency domain reconfiguration (shown as "time/frequency domain reconfiguration").

In some aspects, the repeater node 505 may perform the processing operation indicated by the configuration. In the first processing option 525, the repeater node 505 may receive the first signal and may perform an analog beamforming procedure to obtain a second analog signal associated with the first signal. The repeater node 505 may extract the analog signal and may re-generate the analog signal in a transmit (Tx) chain of the repeater node 505. For example, the repeater node 505 may perform an analog beamforming procedure on the analog signal to form the outgoing signal (e.g., the repeater node 505 may boost the analog signal, apply an analog beamforming gain, and/or the like).

According to some aspects, to support the first processing option 525, the repeater node 505 may receive, from the control node 510, one or more control messages (e.g., in the configuration shown by reference number 520) that indicate a reception beamforming configuration associated with the first signal, a transmission beamforming configuration associated with transmitting the second signal, and/or the like. In some aspects, the reception beamforming configuration may indicate an index associated with a beamforming codebook. In some aspects, the repeater node 505 may transmit a control message to the control node 510 that indicates a beamforming codebook characteristic. The beamforming codebook characteristic may indicate, for example, a number of transmitter beams available, a number of receiver beams available, a spatial quasi co-location characteristic associated with a beam, a number of antenna arrays, a number of antenna panels, an association between a beam and an antenna array, an association between a beam and an antenna panel, and/or the like.

In some aspects, the reception beamforming configuration may indicate a phase setting of an antenna element of the repeater node 505, an amplitude setting of the antenna element of the repeater node 505, and/or the like. In some aspects, the repeater node 505 may transmit a control message to the control node 510 that indicates a beamforming capability of the repeater node, and the reception beamforming configuration may be based at least in part on the beamforming capability.

In some aspects, the repeater node 505 may transmit a control message to the control node 510 that indicates a transmitter power configuration, and the configuration received from the control node 510 may indicate one or more transmitter power and/or amplification settings based at least in part on the transmitter power configuration. In some aspects, the transmitter power configuration may indicate a power headroom, a maximum transmitter power, a maximum gain level, a current gain setting, a current transmitter power, and/or the like.

In the second processing option 530, in some aspects, the repeater node 505 may perform digital signal processing (which also includes the first processing option). As shown, after receiving the incoming signal and performing an analog beamforming procedure associated with the incoming signal, the repeater node 505 may convert the incoming signal from the analog domain to the digital domain using an ADC. After converting the incoming signal from the analog domain to the digital domain, the repeater node 505 may determine one or more time domain IQ samples (shown as "TD IQ samples") associated with the incoming signal. The repeater node 505 may extract the time domain IQ samples and may store the time domain IQ samples in a buffer of the repeater node. The repeater node 505 may use the time domain IQ samples to re-generate the incoming signal in the Tx chain of the repeater node 505 (e.g., immediately after extracting the time domain IQ samples or at a later time). For example, the repeater node 505 may convert the time domain IQ samples from the digital domain to the analog domain using a DAC. The repeater node 505 may perform an analog beamforming procedure on the analog signal to form the second signal, in accordance with the first processing option 525, before transmitting the second signal to the wireless node 515.

In some aspects, to facilitate performance of the second processing option by the repeater node 505, the configuration may indicate a reception configuration, a buffering configuration, a forwarding configuration, an information request, and/or the like. In some aspects, for example, the configuration may indicate a time domain reconfiguration and/or a frequency domain reconfiguration. The domain reconfiguration and/or the frequency domain reconfiguration may include aspects of the reception configuration, the buffering configuration, the forwarding configuration, and/or the like.

In some aspects, for example, the reception configuration may indicate a reception analog beamforming configuration, a time domain resource associated with the first signal, a frequency domain resource associated with the first signal, and/or the like. In some aspects, the frequency domain resource associated with the first signal may include a center frequency, a bandwidth, a BWP, and/or the like.

In some aspects, the buffering configuration may indicate an ADC setting (e.g., an ADC resolution, sample rate, and/or the like), a DAC setting, an IQ sample compression setting, an IQ sample decompression setting, a buffer status (e.g., an available memory, a maximum buffer size, a buffer overflow, and/or the like), an ADC configuration, a DAC configuration, an IQ capability, an IQ setting, and/or the like.

In some aspects, the forwarding configuration may indicate a transmission beamforming configuration, a time domain resource associated with transmitting the second signal, a transmission power setting, a transmission amplification setting, a transmission center frequency, and/or the like. In some aspects, the transmission time domain resource may be indicated relative to the reception time domain resource. The transmission time domain resource may be based at least in part on a synchronization characteristic corresponding to a synchronization mode between the repeater node and the control node. For example, the synchronization characteristic may indicate a synchronous mode between the repeater node and the control node, and the transmission time domain resource may be based at least in part on an indication (e.g., a symbol identifier, a slot identifier, a frame identifier, and/or the like) of the reception time domain resource.

In some aspects, the synchronization characteristic may indicate an asynchronous mode between the repeater node and the control node, and the transmission time domain resource may be based at least in part on an indication (e.g., a symbol identifier, a slot identifier, a frame identifier, and/or the like) of a reference time domain resource. In some aspects, the repeater node may transmit, using the control component, an additional control message to the control node, and the reference time domain resource may correspond to the additional control message. In some aspects, the synchronization characteristic may indicate an out-of-sync synchronization mode between the repeater node and the control node, and the transmission time domain resource may be based at least in part on a reference time domain resource that corresponds to the configuration (e.g., a time associated with transmission or receipt of a control message containing at least a portion of the configuration).

In some aspects, the information request may include a request for a buffer status, a power status, a measurement report, a capability of the repeater node, a configuration of the repeater node, and/or the like. In some aspects, the request for the power status may include, for example, a request for a power headroom of the repeater node 505. In some aspects, the request for the measurement report may include a request for a signal quality measurement. In some aspects, the repeater node 505 may transmit a periodic report to the control node 510 that indicates a capability of the repeater node 505, a configuration of the repeater node 505, signal quality measurements, and/or the like.

In the third processing option 535, in some aspects, the repeater node 505 may perform further digital processing (which also may include the second processing option and the first processing option). As shown, for example, after converting the incoming signal from the analog domain to the digital domain, the repeater node 505 may remove a cyclic prefix (CP) associated with the incoming signal and may perform a fast-Fourier transform (FFT) on the incoming signal. Based at least in part on removing the CP and performing the FFT, the repeater node 505 may determine one or more frequency domain IQ samples (shown as "FD IQ samples") associated with the incoming signal. Frequency domain IQ samples may correspond to tones (e.g., OFDM tones). The repeater node 505 may extract the frequency domain IQ samples and may store the frequency domain IQ samples in a buffer of the repeater node 505. The repeater node 505 may use the frequency domain IQ samples to re-generate the incoming signal in the Tx chain of the repeater node 505 (e.g., immediately after extracting the frequency domain IQ samples or at a later time). For example, the repeater node 505 may perform an inverse FFT (iFFT) operation on the frequency domain IQ samples to generate re-generated time domain IQ samples. The repeater node 505 may add a CP to the re-generated time domain IQ samples. The repeater node 505 may convert the digital signal (e.g., the re-generated digital samples) from the digital domain to the analog domain using the DAC. The repeater node 505 may perform an analog beamforming procedure on the analog signal to form the second signal.

In some aspects, to facilitate performance of the third processing option 535 by the repeater node 505, the configuration may indicate further IEs associated with the reception configuration and/or the transmission configuration. These further IEs may be in addition to IEs described above in connection with the second processing option 530, the first processing option 525, and/or the like.

In some aspects, for example, the reception configuration may indicate a numerology associated with the first signal, and the forwarding configuration may indicate a numerology associated with transmitting the second signal. In some aspects, the numerology associated with the first signal may be the same as the numerology associated with transmitting the second signal. In some aspects, the numerology associated with the first signal may be different than the numerology associated with transmitting the second signal. In some aspects, the numerology associated with the first signal and/or the numerology associated with transmitting the second signal may include at least one of a CP size, a subcarrier spacing (SCS), an FFT size, and/or the like.

In the fourth processing option 540, in some aspects, the repeater node 505 may perform further digital processing (which also may include the third processing option, the second processing option, and the first processing option). In some aspects, in the fourth processing option 540, after removing the CP and performing the FFT associated with the incoming signal, the repeater node 505 may perform a digital beamforming procedure associated with the incoming signal. The repeater node 505 may perform an RE de-mapping operation associated with the incoming signal to extract REs based at least in part on the determined tones. After performing the digital beamforming procedure and the RE de-mapping procedure, the repeater node 505 may determine one or more IQ samples of occupied tones (e.g., a number of symbols per antenna element) associated with the incoming signal. The repeater node 505 may extract the IQ samples of occupied tones and may store the IQ samples of occupied tones in a buffer of the repeater node 505. The repeater node 505 may use the IQ samples of occupied tones to re-generate the incoming signal in the Tx chain of the repeater node 505 (e.g., immediately after extracting the IQ samples of occupied tones or at a later time). For example, the repeater node 505 may perform an RE mapping procedure (e.g., the inverse of the RE de-mapping procedure) associated with the IQ samples of occupied tones. The repeater node 505 may perform a digital beamforming procedure associated with the IQ samples of occupied tones. After performing the digital beamforming procedure, the repeater node 505 may perform an iFFT procedure and add a CP to the signal. As indicated above, the repeater node 505 may convert the digital signal from the digital domain to the analog domain using the DAC.

In some aspects, to facilitate performance of the fourth processing option 540 by the repeater node 505, the configuration may indicate further IEs associated with the reception configuration and/or the transmission configuration. These further IEs may be in addition to IEs described above in connection with the third processing option 535, the second processing option 530, the first processing option 525, and/or the like.

In some aspects, for example, the reception configuration may indicate a digital receiver beamforming configuration, and the forwarding configuration may indicate a digital transmitter beamforming configuration. In some aspects, the reception configuration may indicate RE mapping information associated with the first signal, and the forwarding configuration may indicate RE mapping information associated with transmitting the second signal. In some aspects, the RE mapping information associated with the first signal may include a plurality of indices corresponding to a plurality of occupied tones associated with the first signal. In some aspects, the RE mapping information associated with forwarding the first signal may include a plurality of indices corresponding to a plurality of occupied tones associated with transmitting the second signal. In some aspects, for example, RE mapping information may indicate a mapping from a first set of resources associated with the first signal to a second set of resources corresponding to the at least one second signal. In some aspects, the RE mapping information may include a mapping from a set of resources associated with the first signal to a set of segment indices corresponding to a plurality of communication segments that are generated from segmenting a communication associated with the first signal.

In the fifth processing option 545, in some aspects, the repeater node 505 may perform further digital processing (which also may include the fourth processing option, the third processing option, the second processing option, and the first processing option). In some aspects, in the fifth processing option 545, after performing the digital beamforming procedure and the RE de-mapping operation, the repeater node 505 may perform channel estimation and equalization associated with the incoming signal (e.g., to determine and/or remove noise and wireless channel variations associated with the incoming signal). For example, the first signal may include a source signal attenuated by a wireless channel characteristic of a wireless channel that carries the first signal. The channel estimation may be performed based at least in part on one or more reference signals transmitted by the control node 510, the wireless node 515, and/or the like. In some aspects, performing the fifth processing option 545 may include stabilizing, based at least in part on the channel estimation, the wireless channel characteristic associated with the extracted set of REs (extracted during performance of the fourth processing option 540) to generate a set of stabilized REs. The repeater node 505 may generate the second signal based at least in part on the stabilized REs.

After performing channel estimation and equalization, the repeater node 505 may perform a demodulation operation to determine a set of codewords associated with the incoming signal. The repeater node 505 may extract the codewords and may store the codewords in a buffer of the repeater node 505. The repeater node 505 may use the codewords to re-generate the incoming signal in the Tx chain of the repeater node 505 (e.g., immediately after extracting the codewords or at a later time). For example, the repeater node 505 may perform a modulation operation, a layer mapping operation, a pre-coding operation, an RE-mapping operation, and/or a digital beamforming procedure associated with the codewords.

In some aspects, to facilitate performance of the fifth processing option 545 by the repeater node 505, the configuration may indicate further IEs associated with the reception configuration and/or the transmission configuration. These further IEs may be in addition to IEs described above in connection with the fourth processing option 540, the third processing option 535, the second processing option 530, the first processing option 525, and/or the like.

For example, in some aspects, the reception configuration may indicate a channel estimation configuration. In some aspects, the channel estimation configuration may indicate a resource associated with a reference signal, a configuration associated with the reference signal, and/or the like. In some aspects, the forwarding configuration may indicate a layer mapping configuration, a precoding configuration, and/or the like.

In the sixth processing option 550, in some aspects, the repeater node 505 may perform the sixth digital processing option (which also may include the fifth processing option, the fourth processing option, the third processing option, the second processing option, and the first processing option). In some aspects, in the sixth processing option 550, for example, the repeater node 505 may extract a transport block (or blocks) based at least in part on the set of stabilized REs. In some aspects, the repeater node 505 may perform a de-scrambling operation (e.g., using scrambling identifiers associated with the incoming signal) to generate a set of descrambled REs. The repeater node 505 may decode the set of descrambled REs in accordance with a network coding scheme associated with the incoming signal to determine one or more transport blocks. The repeater node 505 may extract the transport blocks and may store the transport blocks in a buffer of the repeater node 505.

The repeater node 505 may use the transport blocks to re-generate the incoming signal in the Tx chain of the repeater node 505 (e.g., immediately after extracting the transport block or at a later time). For example, the repeater node 505 may encode the transport blocks (e.g., in accordance with the network coding scheme) to generate a set of recoded REs. The repeater node 505 may scramble the recoded REs to create a re-generated version of the first signal. The repeater node 505 may perform a modulation operation, a layer mapping operation, a pre-coding operation, an RE-mapping operation, and/or a digital beamforming procedure associated with the scrambled transport block.

In some aspects, to facilitate performance of the sixth processing option 550 by the repeater node 505, the configuration may indicate further IEs associated with the reception configuration and/or the transmission configuration. These further IEs may be in addition to IEs described above in connection with the fifth processing option 545, the fourth processing option 540, the third processing option 535, the second processing option 530, the first processing option 525, and/or the like.

In some aspects, for example, the reception configuration may indicate a scrambling identifier associated with the first signal, a coding configuration associated with the first signal, and/or the like. In some aspects, the scrambling identifier may include an FH-RNTI. The FH-RNTI may correspond to the repeater node 505. In some aspects, the coding configuration may indicate an MCS, a coding technique, and/or the like. In some aspects, the forwarding configuration may indicate a scrambling identifier (e.g., an RNTI) associated with transmitting the second signal, a coding configuration associated with transmitting the second signal, and/or the like.

As described above, the repeater node 505 may generate a second signal (or signals) based at least in part on a processing operation. In some aspects, for example, the repeater node 505 may process the first signal (or signals) based at least in part on a time domain reconfiguration and/or a frequency domain reconfiguration, and may generate at least one second signal based at least in part on the processed first signal.

As shown by reference number 565, the repeater node 505 may transmit, and the wireless node 515 may receive, the second signal. In some aspects, the repeater node 505 may transmit the second signal to the control node 510, another wireless node (not shown in FIG. 5), and/or the like.

As indicated above, FIG. 5 is provided as an example. Other examples may differ from what is described with respect to FIG. 5.

FIG. 6 is a diagram illustrating an example 600 associated with time and/or frequency domain reconfiguration of a forwarded signal, in accordance with the present disclosure. As shown in FIG. 6, a control node 605, a repeater node 610, and a wireless node 615 may communicate with one another in a wireless network (e.g., wireless network 100).

In some aspects, the control node 605 may be, be similar to, include, or be included in the control node 510 shown in FIG. 5, the control node 410 shown in FIG. 4, and/or the like. In some aspects, the repeater node 610 may be, be similar to, include, or be included in the repeater node 505 shown in FIG. 5, the repeater node 405 shown in FIG. 4, and/or the like. In some aspects, the wireless node 615 may be, be similar to, include, or be included in the wireless node 515 shown in FIG. 5, the wireless node 415 shown in FIG. 4, the wireless node 420 shown in FIG. 4, and/or the like.

As shown by reference number 620, the control node may transmit, and the repeater node 610 may receive, an information request. As described above in connection with FIG. 5, the information request may include a request for a buffer status, a power status, a measurement report, a capability of the repeater node 610, a configuration of the repeater node 610, and/or the like. As shown by reference number 625, the repeater node 610 may transmit, and the control node 605 may receive, capability information that may be used by the control node 605 to determine a configuration for a repeating operation. In some aspects, the repeater node 610 may provide any number of additional types of information to the control node 605, such as, for example, a buffer status, a power status, a measurement report, a configuration of the repeater node 610, and/or the like.

As shown by reference number 630, the repeater node 610 may transmit, and the control node 605 may receive, a configuration request and/or a configuration suggestion (shown as "configuration request/suggestion"). In some aspects, for example, the repeater node 610 may transmit a request for a segmentation configuration associated with a time domain reconfiguration in which a communication associated with a first signal is segmented into communication segments for transmission using a plurality of signals. In some aspects, the repeater node 610 may transmit a suggestion associated with the segmentation configuration. For example, the repeater node 610 may transmit a suggestion that indicates a suggested number of communication segments to be generated during segmentation. In some aspects, the repeater node 610 may transmit a request for an aggregation configuration associated with a time domain reconfiguration in which a first signal is aggregated with one or more additional signals to generate an aggregated signal. In some aspects, the repeater node 610 may transmit a suggestion associated with the aggregation configuration (e.g., a suggested number of incoming signals to aggregate, and/or the like). In some aspects, the repeater node 610 may transmit a request for a retransmission configuration associated with a time domain reconfiguration in which a re-generated signal is retransmitted one or more times. In some aspects, the repeater node 610 may transmit a suggestion associated with the retransmission configuration.

In some aspects, for example, the repeater node 610 may transmit a request for a request for a frequency shift configuration associated with a frequency domain reconfiguration in which a re-generated version of a received signal is transmitted using a frequency resource having a different center frequency, bandwidth, and/or the like, than the received signal. In some aspects, the repeater node 610 may transmit a suggestion associated with the frequency shift configuration. For example, in some aspects, the suggestion may indicate a suggested frequency domain resource, a suggested frequency offset, and/or the like. In some aspects, for example, the repeater node 610 may transmit a request for a segmentation configuration associated with a frequency domain reconfiguration in which an aggregated signal is segmented into communications for transmission using a plurality of signals. In some aspects, the repeater node 610 may transmit a suggestion associated with the segmentation configuration. For example, the repeater node 610 may transmit a suggestion that indicates a suggested quantity of communications to be included in the aggregated signal. In some aspects, the repeater node 610 may transmit a request for an aggregation configuration associated with a frequency domain reconfiguration in which a first signal is aggregated with one or more additional signals to generate an aggregated signal. In some aspects, the repeater node 610 may transmit a suggestion associated with the aggregation configuration (e.g., a suggested quantity of incoming signals to aggregate, and/or the like). In some aspects, the repeater node 610 may transmit a request for a mapping associated with a frequency domain reconfiguration in which REs, symbols, IEs, and/or the like are mapped from a set of time and/or frequency domain resources associated with a first signal to a set of time and/or frequency domain resources associated with a re-generated version of the first signal. In some aspects, the repeater node 610 may transmit a suggestion associated with the mapping.

As shown by reference number 635, the control node 605 may transmit, and the repeater node 610 may receive, a configuration for a repeating operation. As described above, the configuration may indicate a processing operation. The processing operation may include a processing option selected from a plurality of processing options, as explained above in connection with FIG. 5. In some aspects, as shown, the configuration may indicate a time domain reconfiguration, a frequency domain reconfiguration, and/or the like.

For example, the configuration may indicate a time domain reconfiguration in which a communication associated with a first signal is segmented into communication segments for transmission using a plurality of signals. In some aspects, the configuration may include a segmentation configuration that indicates segmentation information associated with the communication. In some aspects, the segmentation information may identify the plurality of communication segments. In some aspects, the segmentation information may be carried by a control message. In some aspects, the segmentation information may be carried by the first signal and may be not included in a re-generated version of the first signal. In some aspects, the first signal may include at least one header that carries the segmentation information. The at least one header may be removed from the first signal and not included in a re-generated version of the first signal. In some aspects, the configuration may indicate a plurality of time domain resources to be used for transmitting a second signal or signals.

In some aspects, the configuration may indicate a mapping from a set of resources associated with the first signal to a set of segment indices corresponding to the plurality of communication segments. In some aspects, the configuration may indicate a first mapping from a first resource of a set of time and/or frequency domain resources to a first segment index of the set of segment indices and a second mapping from a second resource of the set of resources to a second segment index of the set of segment indices. In some aspects, the mapping may be carried by a control message. In some aspects, the mapping may be carried by the first signal and the repeater node 610 may refrain from transmitting the mapping with the at least one second signal. In some aspects, the first signal may include at least one header that carries the mapping, and the repeater node 610 may remove the at least one header so that the at least one header is not transmitted with the at least one second signal.

In some aspects, the configuration may indicate a time domain reconfiguration in which a first signal is aggregated with one or more additional signals to generate an aggregated signal. In some aspects, the configuration may include an aggregation configuration that indicates aggregation information associated with the aggregated signal. The aggregation configuration may indicate one or more resources to be used to transmit the aggregated signal. In some aspects, the aggregation information may be carried by a control message. In some aspects, the aggregation information may be carried by the first signal and the repeater node 610 may refrain from transmitting the aggregation information in the aggregated signal. In some aspects, the first signal may include a header that carries the aggregation information, and the header may be removed from the signal and not included in the aggregated signal.

In some aspects, the configuration may indicate a time domain reconfiguration in which a re-generated signal is retransmitted one or more times. In some aspects, the configuration may include a retransmission configuration that indicates retransmission information associated with the first signal. In some aspects, the retransmission configuration may indicate at least one resource to be used to transmit one or more retransmissions of a second signal that may include a re-generated version of the first signal. In some aspects, the aggregation information may be carried by a control message. In some aspects, the retransmission information may be carried by the first signal, and the repeater node 610 may refrain from transmitting the retransmission information in transmissions and/or retransmissions of the second signal. In some aspects, the first signal may include at least one header that carries the retransmission information, and the repeater node 610 may remove the at least one header so that the retransmission information is not transmitted in transmissions and/or retransmissions of the second signal.

In some aspects, the configuration may indicate a frequency domain reconfiguration in which a re-generated version of a received signal is transmitted using a second frequency resource having a different center frequency, bandwidth, and/or the like, than a first frequency domain resource associated with the received signal. In some aspects, the configuration may include a frequency shift configuration that indicates the second frequency domain resource. In some aspects, the first and/or second frequency domain resource may include an RE, a bandwidth, a BWP, and/or the like. In some aspects, the frequency shift configuration may indicate the second frequency domain resource based at least in part on channel information. The channel information may be obtained by the control node 605, the repeater node 610, the wireless node 615, and/or the like. In some aspects, the frequency shift configuration may indicate a difference (e.g., a number of REs, a frequency offset value, and/or the like) between a first center frequency associated with the first frequency resource and a second center frequency associated with the second frequency resource. In some aspects, the frequency shift configuration may be carried by a control message. In some aspects, the frequency shift configuration may be carried by the first signal, and the repeater node 610 may refrain from transmitting the frequency shift configuration in a second signal that may include a re-generated version of the first signal. In some aspects, the first signal may include at least one header that carries the frequency shift configuration and the repeater node 610 may remove the at least one header so that the frequency shift configuration is not transmitted in the second signal.

In some aspects, the configuration may indicate a frequency domain reconfiguration in which an aggregated signal is segmented into a plurality of communications for transmission using a plurality of signals. In some aspects, the configuration may include a segmentation configuration that indicates segmentation information associated with the aggregated communication. In some aspects, the segmentation information identifies the plurality of communications, a set of frequency resources for use in transmitting the plurality of signals, and/or the like. In some aspects, the segmentation information may be carried by a control message. In some aspects, the segmentation information may be carried by the first signal and may be not included in a re-generated version of the first signal. In some aspects, the first signal may include at least one header that carries the segmentation information. The at least one header may be removed from the first signal and not included in a re-generated version of the first signal.

In some aspects, the configuration may indicate a frequency domain reconfiguration in which a first signal is aggregated with one or more additional signals to generate an aggregated signal. In some aspects, the configuration may include an aggregation configuration that indicates aggregation information associated with the aggregated signal. In some aspects, the aggregation configuration may indicate at least one resource to be used to transmit the aggregated signal. In some aspects, the aggregation information may be carried by a control message. In some aspects, the aggregation information may be carried by the first signal and the repeater node 610 may refrain from transmitting the aggregation information in the aggregated signal. In some aspects, the first signal may include a header that carries the aggregation information, and the header may be removed from the signal and not included in the aggregated signal.

In some aspects, the configuration may indicate a frequency domain reconfiguration in which REs, symbols, IEs, and/or the like are mapped from a set of time and/or frequency domain resources associated with a first signal to a set of time and/or frequency domain resources associated with a re-generated version of the first signal. In some aspects, the configuration may indicate a mapping from a first set of resources associated with the first signal to a second set of resources corresponding to the at least one second signal that may be a re-generated version of the first signal. The first set of resources may include a first set of resource elements and the second set of resources may include a second set of resource elements. In some aspects, the first set of resources may include a first set of symbols, REs, and/or the like. The second set of resources may include a second set of symbols, REs, and/or the like. In some aspects, the mapping may be carried by a control message. In some aspects, the mapping may be carried by the first signal and the repeater node 610 may refrain from transmitting the mapping with the at least one second signal. In some aspects, the first signal may include at least one header that carries the mapping, and the repeater node 610 may remove the at least one header so that the at least one header is not transmitted with the at least one second signal.

As shown by reference number 640, the control node 605 may transmit, and the repeater node 610 may receive, a first signal. In some aspects, the wireless node 615 may transmit the first signal to the repeater node 610. In some aspects, another wireless node (not shown in FIG. 6) may transmit the first signal to the repeater node 610. As shown by reference number 645, the repeater node 610 may process the first signal using a processing operation on the first signal. In some aspects, for example, the processing operation may include a time domain reconfiguration, a frequency domain reconfiguration, and/or the like. As shown by reference number 650, the repeater node 610 may generate at least one second signal based at least in part on the processed first signal.

For example, in some aspects, the first signal may carry a communication and the repeater node 610 may process the first signal based at least in part on a time domain reconfiguration by segmenting the communication into a plurality of communication segments. The repeater node 610 may segment the communication based at least in part on the segmentation information received from the control node 605. In some aspects, the repeater node 610 may generate a plurality of signals. The plurality of signals may carry the plurality of communication segments. In some aspects, the repeater node 610 may transmit the plurality of signals using a plurality of time domain resources.

In some aspects, a first signal of the plurality of signals may carry a first communication segment of the plurality of communication segments, and a second signal of the plurality of signals may carry a second communication segment of the plurality of communication segments. In some aspects, the repeater node 610 may transmit the first signal of the plurality of signals using a first time domain resource and the second signal of the plurality of signals using a second time domain resource that is different than the first time domain resource. In some aspects, the repeater node 610 may transmit the first signal of the plurality of signals using a first beam and the second signal of the plurality of signals using a second beam that is different than the first beam. In some aspects, the repeater node 610 may transmit the first signal of the plurality of signals to a first wireless node and the second signal of the plurality of signals to a second wireless node that is different than the first wireless node.

In some aspects, the repeater node 610 may receive a third signal and may process the third signal based at least in part on the time domain reconfiguration by aggregating the first signal and the third signal to form an aggregated signal. In some aspects, the repeater node 610 may generate the aggregated signal based at least in part on the aggregation information received from the control node 605. In some aspects, the repeater node 610 may receive the first signal from a first wireless node (e.g., the wireless node 615 and may receive the third signal from the first wireless node and/or a second wireless node. In some aspects, the repeater node 610 may receive the first signal using a first beam and receive the third signal using the first beam and/or a second beam.

In some aspects, the first signal may carry a communication and the repeater node 610 may process the first signal based at least in part on the time domain reconfiguration by storing the communication in a memory and retransmitting one or more re-generated versions of the first signal. For example, in some aspects, the repeater node 610 may generate a plurality of signals based at least in part on the processed first signal. The repeater node 610 may transmit a first signal of the plurality of signals at a first time, where the first signal of the plurality of signals may include a first re-generated version of the first signal. The repeater node 610 may transmit a second signal of the plurality of signals at a second time that is different than the first time. The second signal of the plurality of signals may include a second re-generated version of the first signal.

In some aspects, the repeater node 610 may determine that the second signal of the plurality of signals was received by a wireless node 615. The repeater node 610 may remove the stored communication from the memory based at least in part on the determination that the second signal of the plurality of signals was received by the wireless node. In some aspects, the repeater node 610 may determine that the second signal of the plurality of signals was received by the wireless node 615 based at least in part on receiving an acknowledgement feedback message corresponding to the second signal of the plurality of signals. In some aspects, the repeater node 610 may determine that the second signal of the plurality of signals was received by the wireless node 615 based at least in part on determining that a feedback timer has expired. The feedback timer may be associated with a time period for receiving an acknowledgement feedback message corresponding to the second signal of the plurality of signals. In some aspects, the repeater node 610 may retransmit signals using time resources indicated by retransmission information received from the control node 605. In some aspects, the repeater node 610 may transmit a number of retransmissions indicated by the retransmission information.

In some aspects, the repeater node 610 may receive the first signal using a first frequency domain resource having a first center frequency and may generate, based at least in part on a frequency domain reconfiguration, at least one second signal. In some aspects, the repeater node 610 may transmit the at least one second signal using a second frequency domain resource having a second center frequency, where the second center frequency is different than the first center frequency. In some aspects, the first and/or second frequency domain resource may include an RE, a bandwidth, a BWP, and/or the like. In some aspects, the first frequency domain resource may be the BWP and may be associated with a front haul link between the control node 605 and the repeater node 610. In some aspects, the BWP may be associated with an access link between the control node 605 and the repeater node and/or the wireless node 615.

In some aspects, the repeater node 610 may obtain channel information associated with the second frequency domain resource and may transmit, to the control node 605, a control message that indicates the channel information. In some aspects, the frequency shift configuration may indicate the second frequency domain resource based at least in part on the channel information. In some aspects, the frequency shift may be based at least in part on a difference between the first center frequency and the second frequency. In some aspects, the difference may include a number of resource elements, a frequency offset value, and/or the like.

In some aspects, the first signal may carry an aggregated communication. The aggregated communication may include a plurality of communications that are frequency division multiplexed. The repeater node 610 may process the first signal based at least in part on a frequency domain reconfiguration by segmenting the aggregated communication into the plurality of communications. The repeater node 610 may generate a plurality of signals that carry the plurality of communications. In some aspects, the repeater node 610 may segment the aggregated communication based at least in part on segmentation information received from the control node 605.

In some aspects, the repeater node 610 may transmit the plurality of signals using a plurality of time domain resources, frequency domain resources, and/or the like. In some aspects, a first signal of the plurality of signals may carry a first communication of the plurality of communications and a second signal of the plurality of signals may carry a second communication of the plurality of communications. In some aspects, the repeater node 610 may transmit the first signal of the plurality of signals using a first frequency domain resource and the second signal of the plurality of signals using a second frequency domain resource that is different than the first frequency domain resource. In some aspects, the first frequency domain resource may be associated with a front haul link between the control node 605 and the repeater node 610. The second frequency domain resource may be associated with an access link between the control node 605 and the repeater node 610. In some aspects, the repeater node 610 may transmit the first signal of the plurality of signals using a first beam and the second signal of the plurality of signals using a second beam that is different than the first beam. In some aspects, the first beam may correspond to a first wireless node (e.g., wireless node 615) and the second beam may correspond to a second wireless node.

In some aspects, the repeater node 610 may receive a third signal and may process the first and third signals based at least in part on a frequency domain reconfiguration by aggregating, using frequency division multiplexing, the first signal and the third signal to form an aggregated signal. In some aspects, the repeater node 610 may generate the aggregated signal based at least in part on aggregation information received from the control node 605. In some aspects, the repeater node 610 may receive the first signal from a first wireless node (e.g., wireless node 615) and may receive the third signal from the first wireless node and/or a second wireless node. In some aspects, the repeater node 610 may receive the signal using a first beam and the third signal using the first beam and/or a second beam.

In some aspects, the repeater node 610 may process the first signal based at least in part on a frequency domain reconfiguration by mapping a first set of resources associated with the first signal to a second set of resources corresponding to at least one second signal. In some aspects, the repeater node 610 may map the resources based on a mapping received from the control node 605. In some aspects, the first set of resources may include a first set of REs and the second set of resources may include a second set of REs. In some aspects, the first set of resources may include a first set of symbols and the second set of resources may include a second set of symbols.

As shown by reference number 655, the repeater node 610 may transmit, and the wireless node 615 may receive, the second signal (or signals). Alternatively, or additionally, the repeater node 610 may transmit the second signal(s) to the control node 605. In some aspects, the repeater node 610 may transmit the second signal(s) 645 to another wireless node (not shown in FIG. 6).

As indicated above, FIG. 6 is provided as an example. Other examples may differ from what is described with respect to FIG. 6.

Figure 7A:
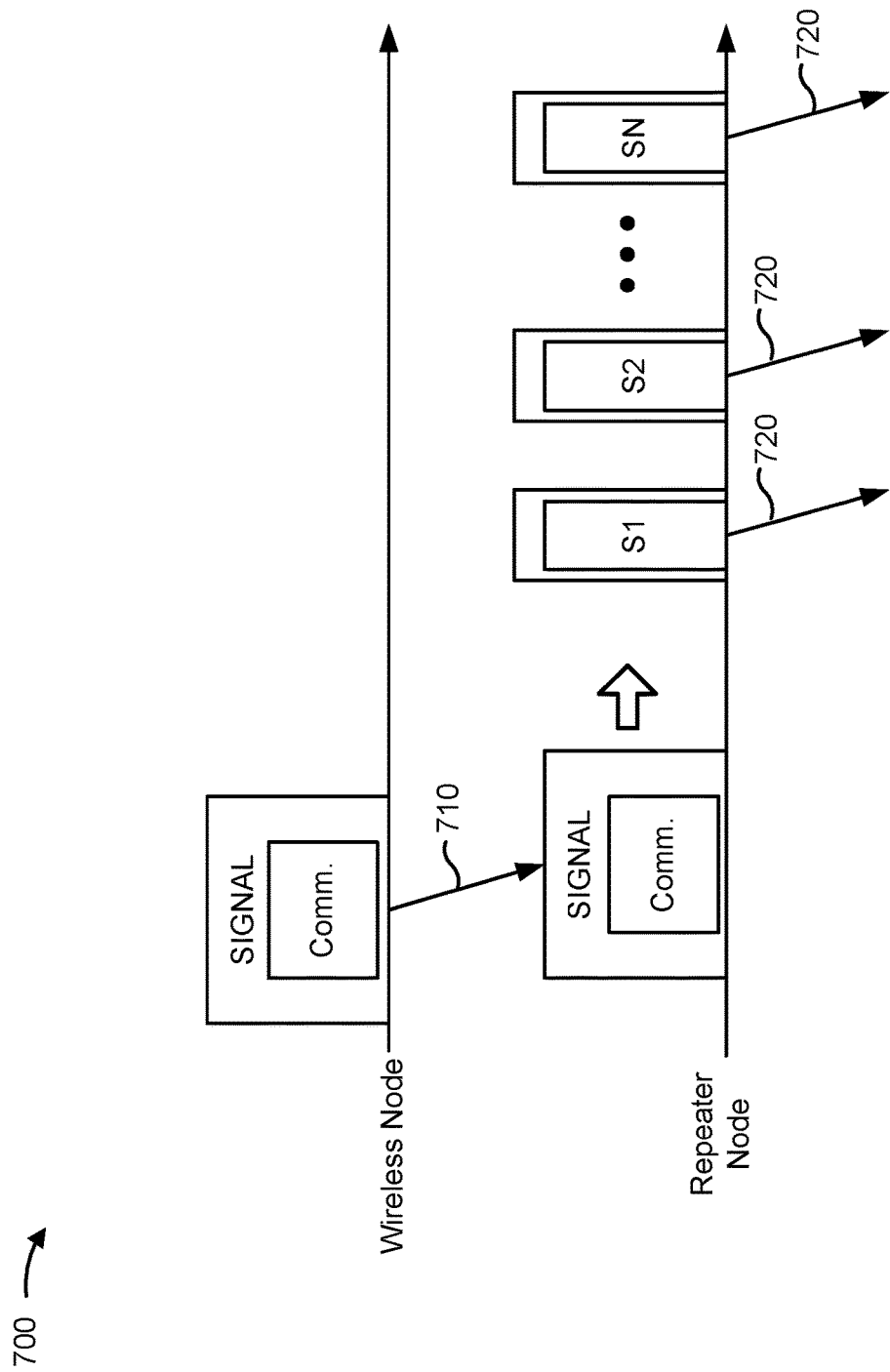
FIGS. 7A, 8A, and 9A are diagrams illustrating examples of time domain reconfiguration of a forwarded signal using a repeater node, in accordance with the present disclosure.

FIG. 7A is a diagram illustrating an example 700 of time domain reconfiguration of a forwarded signal using a repeater node, in accordance with the present disclosure. As shown in FIG. 7A, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 700 is an example of a repeating operation involving a downlink or uplink communication. As shown by reference number 710, the wireless node may transmit a first signal (shown as "signal") to the repeater node. In some aspects, the first signal may carry a communication (shown as "comm.") and the repeater node may process the first signal based at least in part on a time domain reconfiguration by segmenting the communication into a plurality of communication segments (shown as "s1, s2, . . . , sN"). The repeater node may segment the communication based at least in part on segmentation information received from a control node. In some aspects, as shown, the repeater node may generate a plurality of signals that may carry the plurality of communication segments. As shown by reference number 720, the repeater node may transmit the plurality of signals using a plurality of time domain resources. In some aspects, the repeater node may transmit the plurality of signals using different beams, to different wireless nodes, and/or the like. In some aspects, the time domain reconfiguration may be used for beam training, multi-beam communication, and/or the like. In some aspects, the time domain reconfiguration may facilitate providing flexible uplink scheduling for large data transmissions.

As indicated above, FIG. 7A is provided as an example. Other examples may differ from what is described with respect to FIG. 7A.

Figure 7B:
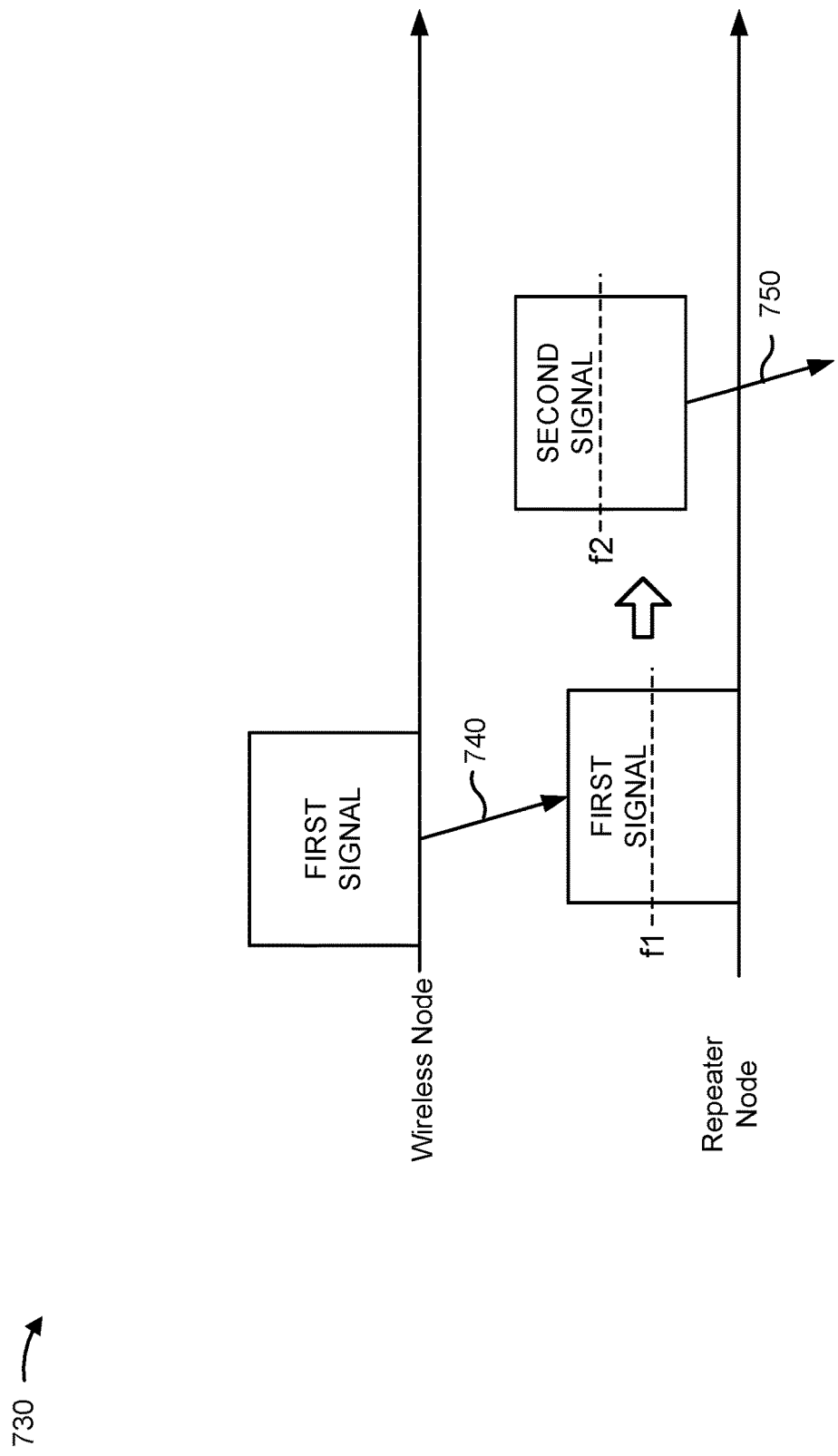
FIGS. 7B, 8B, 9B, and 10 are diagrams illustrating examples of frequency domain reconfiguration of a forwarded signal using a repeater node, in accordance with the present disclosure.

FIG. 7B is a diagram illustrating an example 730 of frequency domain reconfiguration of a forwarded signal using a repeater node, in accordance with the present disclosure. As shown in FIG. 7B, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 730 is an example of a repeating operation involving a downlink or uplink communication. As shown by reference number 740, the repeater node may receive a first signal using a first frequency domain resource having a first center frequency, f1. The repeater node may generate, based at least in part on a frequency domain reconfiguration received from a control node, a second signal. As shown by reference number 750, the repeater node may transmit the second signal using a second frequency domain resource having a second center frequency, f2. The second center frequency may be different than the first center frequency. In some aspects, the first and/or second frequency domain resources may include an RE, a bandwidth, a BWP, and/or the like. In some aspects, the first frequency domain resource may be the BWP and may be associated with a front haul link between a control node and the repeater node. In some aspects, the BWP may be associated with an access link between the control node and the repeater node and/or the wireless node.

In some aspects, the frequency domain reconfiguration may facilitate flexible scheduling in which a control node, repeater node, and/or the like may select frequency resources based at least in part on channel quality measurements, interference measurements, and/or the like. In some aspects, the frequency domain reconfiguration may facilitate aligning signals with an active front haul link and/or access link, and/or with BWPs associated with different front haul links, access links, wireless nodes, and/or the like.

As indicated above, FIG. 7B is provided as an example. Other examples may differ from what is described with respect to FIG. 7B.

Figure 8A:
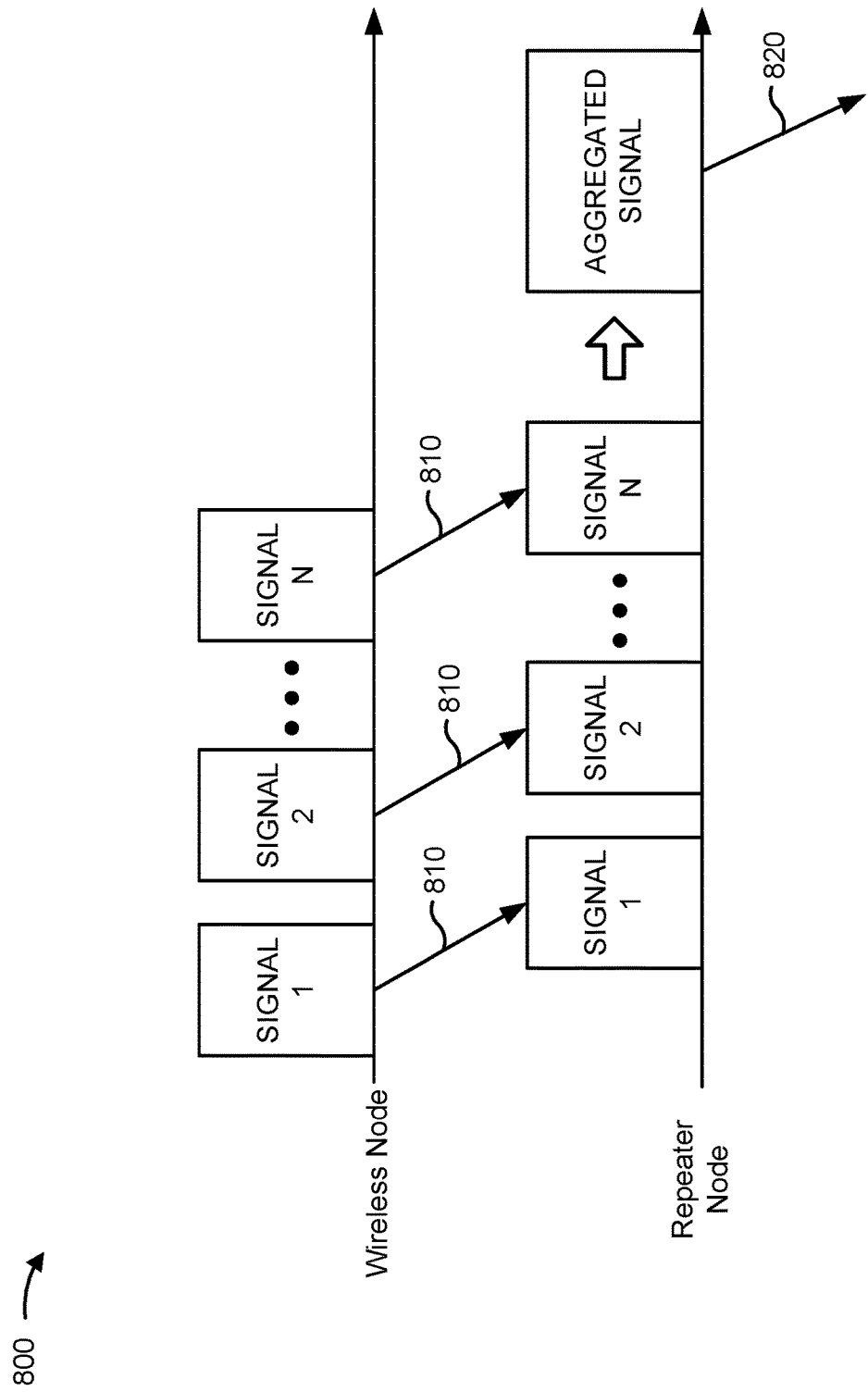

FIG. 8A is a diagram illustrating an example 800 of time domain reconfiguration of a forwarded signal using a repeater node, in accordance with the present disclosure. As shown in FIG. 8A, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 800 is an example of a repeating operation involving a downlink or uplink communication. In some aspects, as shown by reference number 810, the repeater node may receive a plurality of signals (shown as "signal 1, signal 2, . . . , signal N") and may process the signals based at least in part on a time domain reconfiguration by aggregating the signals to form an aggregated signal. In some aspects, the repeater node may generate the aggregated signal based at least in part on aggregation information received from a control node. In some aspects, the repeater node may receive the plurality of signals using different beams, from different wireless nodes, and/or the like. As shown by reference number 820, the repeater node may transmit the aggregated signal. In some aspects, the time domain reconfiguration may facilitate beam training, multi-beam communication, flexible uplink scheduling, and/or the like.

As indicated above, FIG. 8A is provided as an example. Other examples may differ from what is described with respect to FIG. 8A.

Figure 8B:
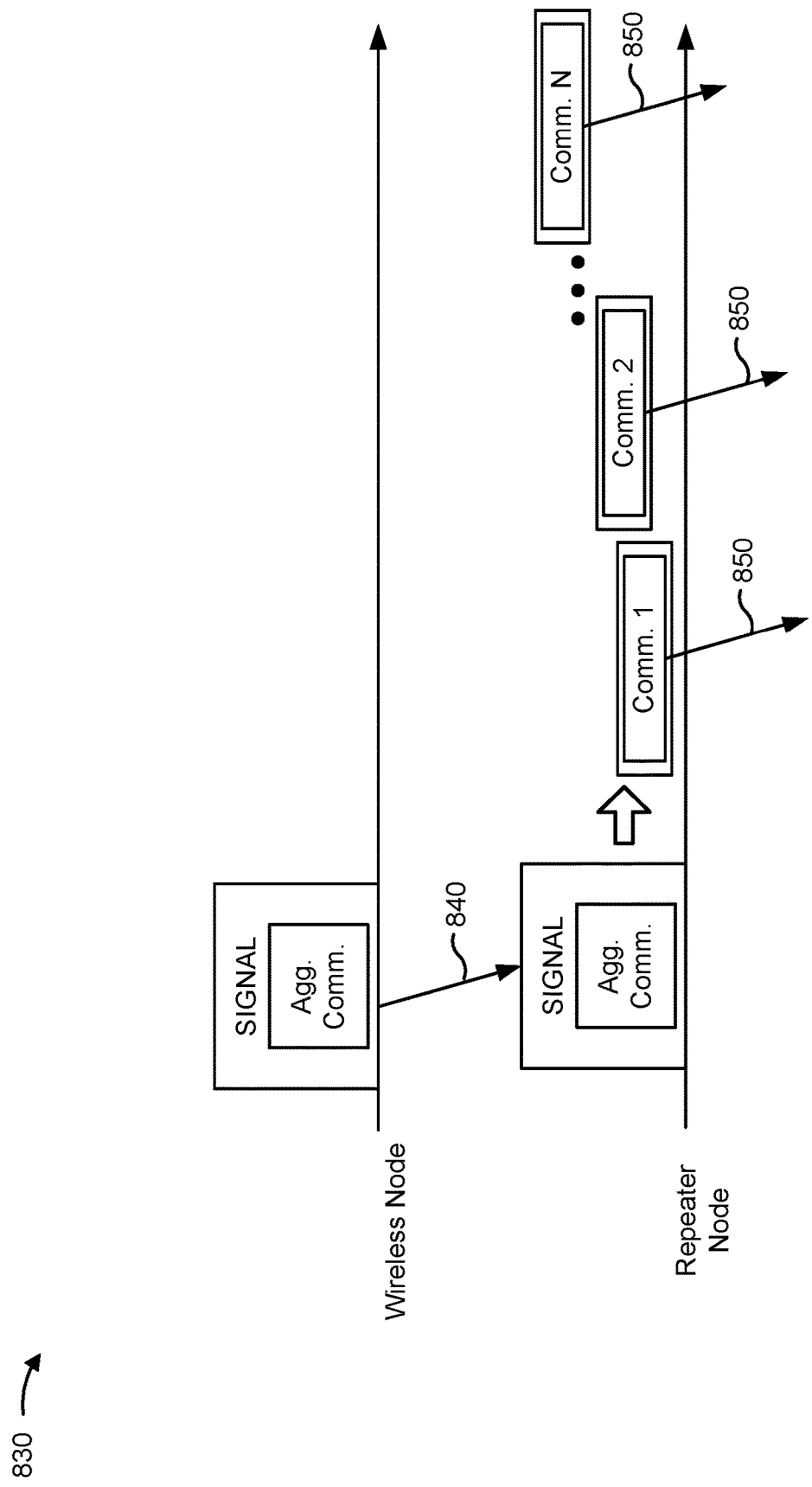

FIG. 8B is a diagram illustrating an example 830 of frequency domain reconfiguration of a forwarded signal using a repeater node, in accordance with the present disclosure. As shown in FIG. 8B, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 830 is an example of a repeating operation involving a downlink or uplink communication. As shown by reference number 840, the repeater node may receive, from the wireless node, a first signal (shown as "signal") that carries an aggregated communication (shown as "agg. comm."). The aggregated communication may include a plurality of communications that are frequency division multiplexed. The repeater node may process the first signal based at least in part on a frequency domain reconfiguration by converting the frequency division multiplexing to time division multiplexing. For example, the repeater node may segment the aggregated communication into a plurality of communications (shown as "comm. 1," "comm. 2," . . . "comm. N"). The repeater node may generate a plurality of signals that carry the plurality of communications. In some aspects, the repeater node may segment the aggregated communication based at least in part on segmentation information received from the control node.

As shown by reference number 850, the repeater node may transmit the plurality of signals using a plurality of time domain resources, frequency domain resources, and/or the like. In some aspects, different signals may carry different communications. In some aspects, the repeater node may transmit the signals using different frequency domain resources. In some aspects, frequency domain resources may be associated with a front haul link between a control node and the repeater node, an access link between the control node and the repeater node, and/or the like. In some aspects, the repeater node may transmit different signals using different beams, to different wireless nodes, and/or the like. In some aspects, the frequency domain reconfiguration may facilitate using wider bands over the front haul and switching to narrower bands for serving data over an access link. In some aspects, the signals may be transmitted on a common frequency resource.

As indicated above, FIG. 8B is provided as an example. Other examples may differ from what is described with respect to FIG. 8B.

Figure 9A:
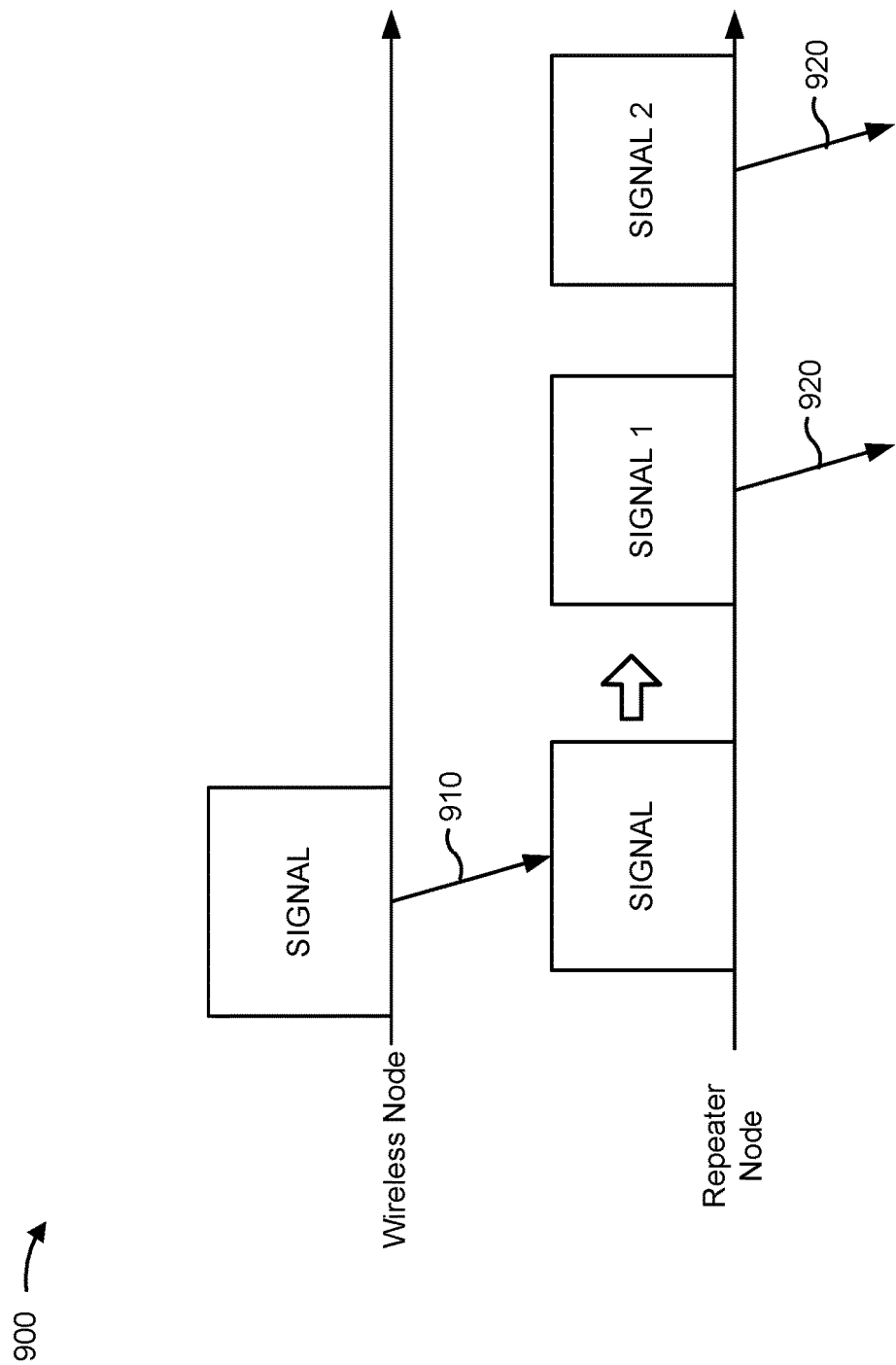

FIG. 9A is a diagram illustrating an example 900 of time domain reconfiguration of a forwarded signal using a repeater node, in accordance with the present disclosure. As shown in FIG. 9A, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 900 is an example of a repeating operation involving a downlink or uplink communication. As shown by reference number 910, the wireless node may transmit a first signal to the repeater node (shown as "signal"). The repeater node may process the first signal based at least in part on a time domain reconfiguration by storing a communication carried by the first signal in a memory and retransmitting one or more re-generated versions of the first signal. For example, the repeater node may generate a plurality of signals (shown as "signal 1" and "signal 2") based at least in part on the processed first signal. As shown by reference number 920, the repeater node may transmit a first signal (signal 1) of the plurality of signals at a first time and a second signal of the plurality of signals at a second time that is different than the first time. The first signal of the plurality of signals may include a first re-generated version of the first signal and the second signal of the plurality of signals may include a second re-generated version of the first signal. In some aspects, the time domain reconfiguration may be used to increase likelihood of receipt of the transmitted communication.

As indicated above, FIG. 9A is provided as an example. Other examples may differ from what is described with respect to FIG. 9A.

Figure 9B:
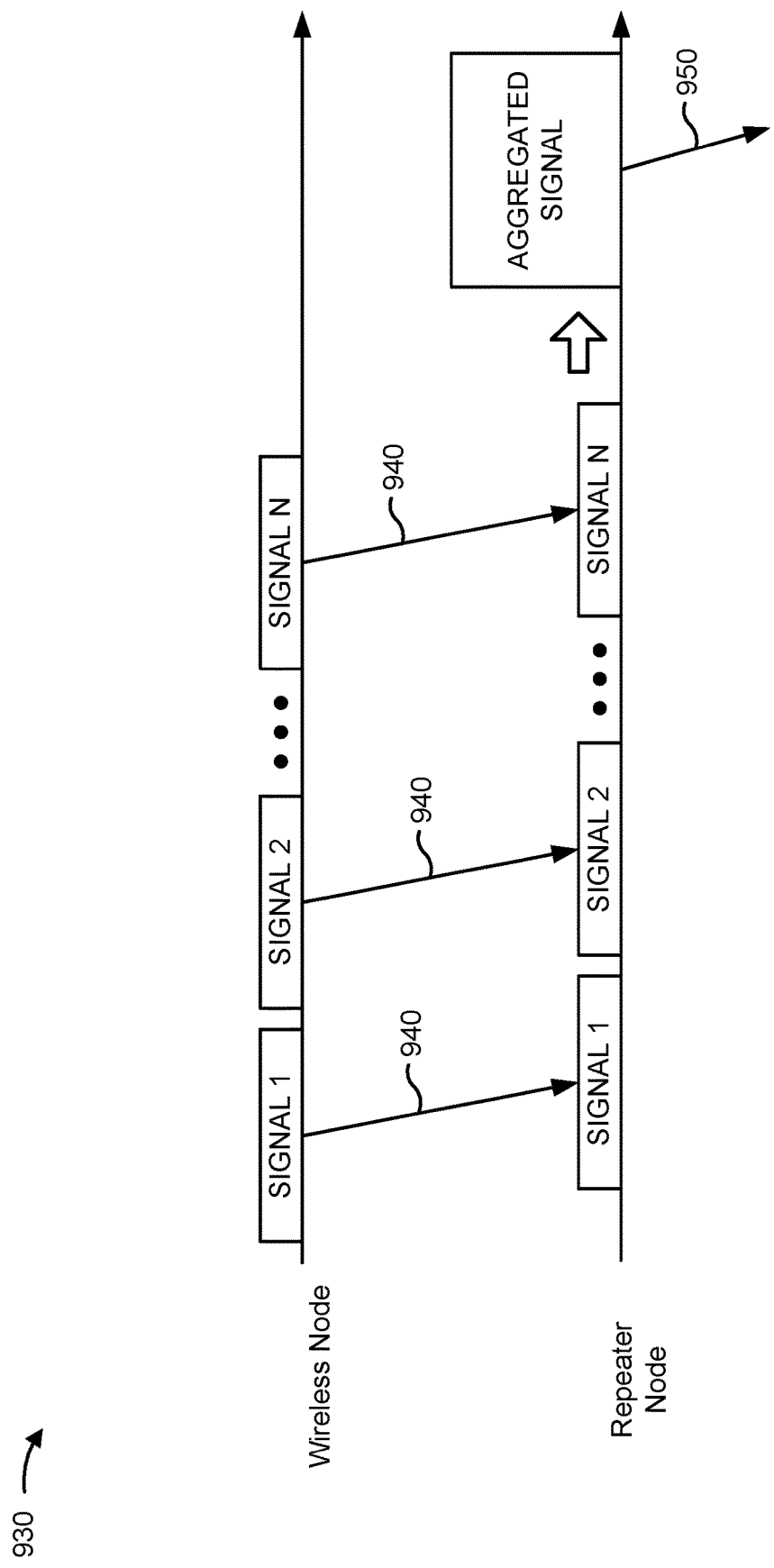

FIG. 9B is a diagram illustrating an example 930 of frequency domain reconfiguration of a forwarded signal using a repeater node, in accordance with the present disclosure. As shown in FIG. 9B, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 930 is an example of a repeating operation involving a downlink or uplink communication. As shown by reference number 940, the repeater node may receive a plurality of signals (shown as "signal 1, signal 2, . . . , signal N"). In some aspects, the repeater node may receive the different signals from different wireless nodes, using different beams, and/or the like. The repeater node may process the received signals based at least in part on a frequency domain reconfiguration by aggregating, using frequency division multiplexing, the signals to form an aggregated signal. As shown by reference number 950, the repeater node may transmit the aggregated signal. In some aspects, the frequency domain reconfiguration may facilitate switching between bandwidths, front haul links, access links, and/or the like.

As indicated above, FIG. 9B is provided as an example. Other examples may differ from what is described with respect to FIG. 9B.

Figure 10:
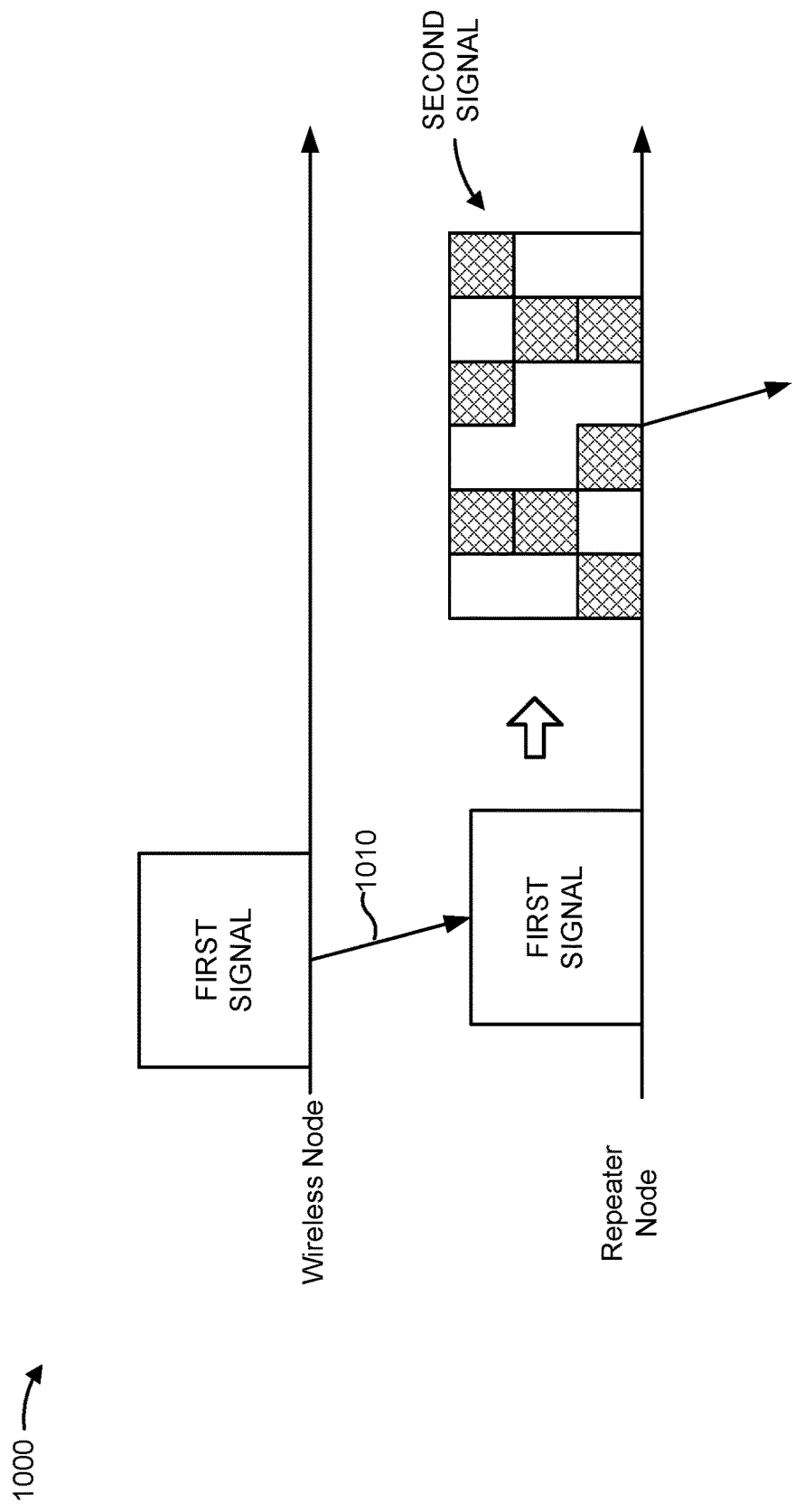

FIG. 10 is a diagram illustrating an example 1000 of frequency domain reconfiguration of a forwarded signal using a repeater node, in accordance with the present disclosure. As shown in FIG. 10, a wireless node and a repeater node may communicate with one another in a wireless network (e.g., wireless network 100).

In some aspects, the wireless node may be, be similar to, include, or be included in the control node 605 shown in FIG. 6, the wireless node 615 shown in FIG. 6, the control node 510 shown in FIG. 5, the wireless node 515 shown in FIG. 5, the control node 410 shown in FIG. 4, the wireless node 415 shown in FIG. 4, the wireless node 420 shown in FIG. 4, and/or the like. In some aspects, the repeater node may be, be similar to, include, or be included in the repeater node 610 shown in FIG. 6, the repeater node 505 shown in FIG. 5, the repeater node 405 shown in FIG. 4, and/or the like.

Example 1000 is an example of a repeating operation involving a downlink or uplink communication. As shown by reference number 1010, the repeater node may receive a first signal from the wireless node. In some aspects, the repeater node may process the first signal based at least in part on a frequency domain reconfiguration by mapping a first set of resources associated with the first signal to a second set of resources corresponding to a second signal. In some aspects, the repeater node may map the resources based on a mapping received from the control node. In some aspects, the first set of resources may include a first set of REs and the second set of resources may include a second set of REs (shown as shaded blocks). In some aspects, the first set of resources may include a first set of symbols and the second set of resources may include a second set of symbols. In some aspects, the frequency domain reconfiguration may facilitate time hopping, frequency hopping, flexible scheduling, and/or the like.

As indicated above, FIG. 10 is provided as an example. Other examples may differ from what is described with respect to FIG. 10.

Figure 11:
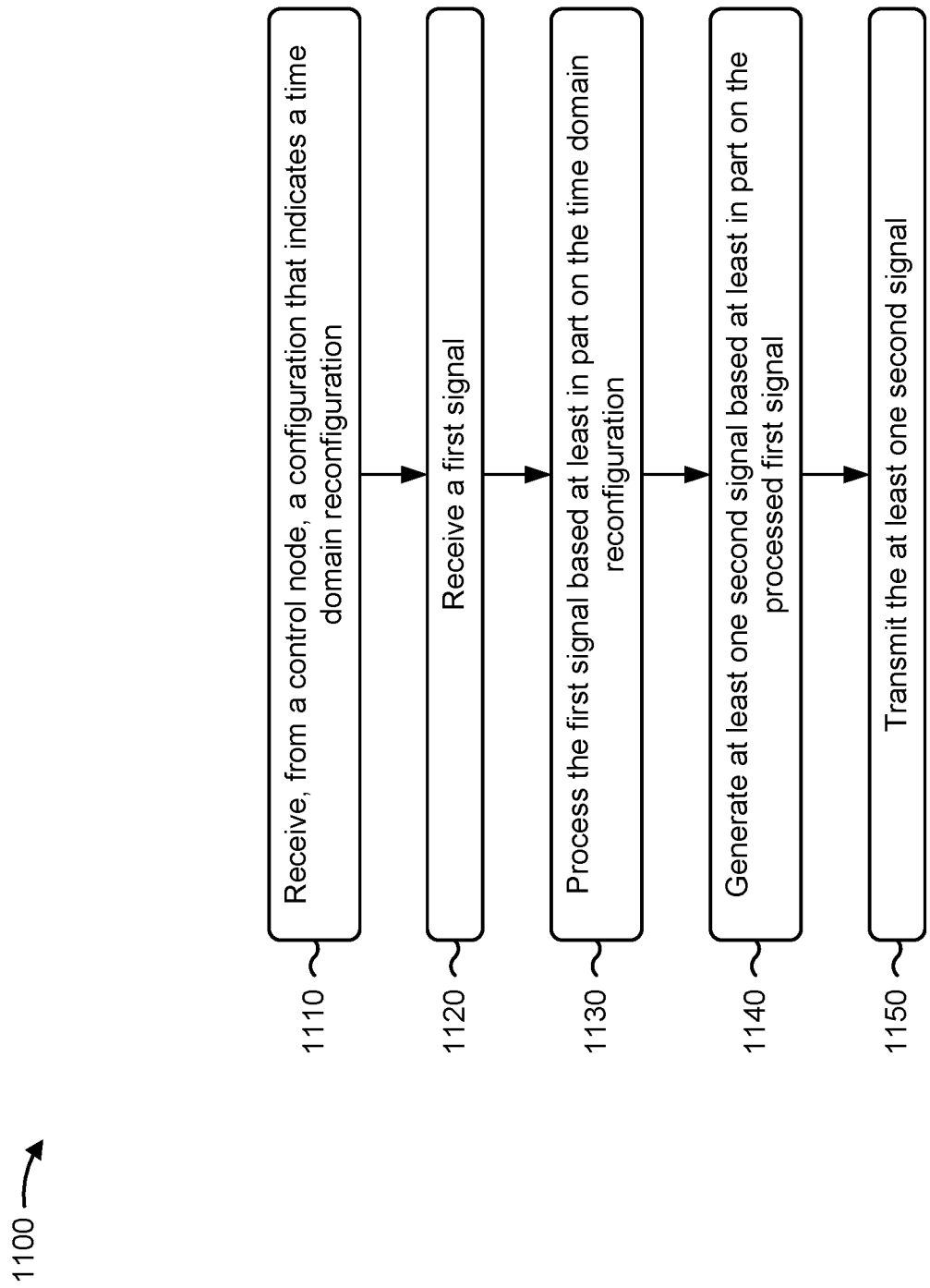
FIGS. 11 and 12 are diagrams illustrating example processes associated with time domain reconfiguration of a forwarded signal using a repeater node, in accordance with the present disclosure.

FIG. 11 is a diagram illustrating an example process 1100 performed, for example, by a repeater node, in accordance with the present disclosure. Example process 1100 is an example where the repeater node (e.g., repeater node 610 shown in FIG. 6, repeater node 505 shown in FIG. 5, repeater node 405 shown in FIG. 4, and/or the like) performs operations associated with techniques for time domain reconfiguration of a forwarded signal using a repeater node.

As shown in FIG. 11, in some aspects, process 1100 may include receiving, from a control node, a configuration that indicates a time domain reconfiguration (block 1110). For example, the repeater node (e.g., using reception component 1502 of FIG. 15) may receive, from a control node, a configuration that indicates a time domain reconfiguration, as described above.

As further shown in FIG. 11, in some aspects, process 1100 may include receiving a first signal (block 1120). For example, the repeater node (e.g., using reception component 1502 of FIG. 15) may receive a first signal, as described above.

As further shown in FIG. 11, in some aspects, process 1100 may include processing the first signal based at least in part on the time domain reconfiguration (block 1130). For example, the repeater node (e.g., using processing component 1508 of FIG. 15) may process the first signal based at least in part on the time domain reconfiguration, as described above.

As further shown in FIG. 11, in some aspects, process 1100 may include generating at least one second signal based at least in part on the processed first signal (block 1140). For example, the repeater node (e.g., using generating component 1510 of FIG. 15) may generate at least one second signal based at least in part on the processed first signal, as described above.

As further shown in FIG. 11, in some aspects, process 1100 may include transmitting the at least one second signal (block 1150). For example, the repeater node (e.g., using transmission component 1504 of FIG. 15) may transmit the at least one second signal, as described above.

Process 1100 may include additional aspects, such as any single aspect or any combination of aspects described below and/or in connection with one or more other processes described elsewhere herein.

In a first aspect, receiving the first signal comprises receiving a millimeter wave wireless signal.

In a second aspect, alone or in combination with the first aspect, the first signal comprises at least one of a PDCCH communication, a PDSCH communication, a PUCCH communication, a PUSCH communication, a PRACH communication, a physical sidelink channel communication, an RS communication, or an ACK/NACK feedback message.

In a third aspect, alone or in combination with one or more of the first and second aspects, the configuration indicates a digital processing operation that includes the time domain reconfiguration, and processing the first signal based at least in part on the time domain reconfiguration comprises performing the digital processing operation.

In a fourth aspect, alone or in combination with one or more of the first through third aspects, the first signal carries a communication, and processing the first signal based at least in part on the time domain reconfiguration comprises segmenting the communication into a plurality of communication segments, where generating the at least one second signal comprises generating a plurality of signals, and the plurality of signals carry the plurality of communication segments.

In a fifth aspect, alone or in combination with one or more of the first through fourth aspects, the configuration comprises a segmentation configuration that indicates segmentation information associated with the communication, and segmenting the communication comprises segmenting the communication based at least in part on the segmentation information.

In a sixth aspect, alone or in combination with one or more of the first through fifth aspects, the segmentation information identifies the plurality of communication segments.

In a seventh aspect, alone or in combination with one or more of the first through sixth aspects, process 1100 includes transmitting, to the control node, a control message that comprises at least one of a request for the segmentation configuration or a suggestion associated with the segmentation configuration.

In an eighth aspect, alone or in combination with one or more of the first through seventh aspects, the suggestion indicates a suggested number of communication segments.

In a ninth aspect, alone or in combination with one or more of the first through eighth aspects, the segmentation information is carried by a control message.

In a tenth aspect, alone or in combination with one or more of the first through ninth aspects, the segmentation information is carried by the first signal.

In an eleventh aspect, alone or in combination with one or more of the first through tenth aspects, transmitting the at least one second signal comprises refraining from transmitting the segmentation information.

In a twelfth aspect, alone or in combination with one or more of the first through eleventh aspects, the first signal comprises at least one header that carries the segmentation information.

In a thirteenth aspect, alone or in combination with one or more of the first through twelfth aspects, transmitting the at least one second signal comprises refraining from transmitting the at least one header.

In a fourteenth aspect, alone or in combination with one or more of the first through thirteenth aspects, transmitting the at least one second signal comprises transmitting the plurality of signals using a plurality of time domain resources.

In a fifteenth aspect, alone or in combination with one or more of the first through fourteenth aspects, the configuration indicates the plurality of time domain resources.

In a sixteenth aspect, alone or in combination with one or more of the first through fifteenth aspects, the configuration indicates a mapping from a set of resources associated with the first signal to a set of segment indices corresponding to the plurality of communication segments.

In a seventeenth aspect, alone or in combination with one or more of the first through sixteenth aspects, the configuration indicates a first mapping from a first resource of the set of resources to a first segment index of the set of segment indices, and a second mapping from a second resource of the set of resources to a second segment index of the set of segment indices.

In an eighteenth aspect, alone or in combination with one or more of the first through seventeenth aspects, the set of resources comprise at least one of a time domain resource or a frequency domain resource.

In a nineteenth aspect, alone or in combination with one or more of the first through eighteenth aspects, a first signal of the plurality of signals carries a first communication segment of the plurality of communication segments, and a second signal of the plurality of signals carries a second communication segment of the plurality of communication segments.

In a twentieth aspect, alone or in combination with one or more of the first through nineteenth aspects, transmitting the at least one second signal comprises transmitting the first signal of the plurality of signals using a first time domain resource, and transmitting the second signal of the plurality of signals using a second time domain resource that is different than the first time domain resource.

In a twenty-first aspect, alone or in combination with one or more of the first through twentieth aspects, transmitting the at least one second signal comprises transmitting the first signal of the plurality of signals using a first beam, and transmitting the second signal of the plurality of signals using a second beam that is different than the first beam.

In a twenty-second aspect, alone or in combination with one or more of the first through twenty-first aspects, transmitting the at least one second signal comprises transmitting the first signal of the plurality of signals to a first wireless node, and transmitting the second signal of the plurality of signals to a second wireless node that is different than the first wireless node.

In a twenty-third aspect, alone or in combination with one or more of the first through twenty-second aspects, process 1100 includes receiving a third signal, and processing the third signal based at least in part on the time domain reconfiguration by aggregating the first signal and the third signal to form an aggregated signal, where the at least one second signal comprises the aggregated signal.

In a twenty-fourth aspect, alone or in combination with one or more of the first through twenty-third aspects, the configuration comprises an aggregation configuration that indicates aggregation information associated with the aggregated signal, and aggregating the first signal and the third signal comprises generating the aggregated signal based at least in part on the aggregation information.

In a twenty-fifth aspect, alone or in combination with one or more of the first through twenty-fourth aspects, the aggregation configuration indicates at least one resource to be used to transmit the aggregated signal.

In a twenty-sixth aspect, alone or in combination with one or more of the first through twenty-fifth aspects, process 1100 includes transmitting, to the control node, a control message that comprises at least one of a request for the aggregation configuration, or a suggestion associated with the aggregation configuration.

In a twenty-seventh aspect, alone or in combination with one or more of the first through twenty-sixth aspects, the aggregation information is carried by a control message.

In a twenty-eighth aspect, alone or in combination with one or more of the first through twenty-seventh aspects, the aggregation information is carried by the first signal.

In a twenty-ninth aspect, alone or in combination with one or more of the first through twenty-eighth aspects, transmitting the at least one second signal comprises refraining from transmitting the aggregation information.

In a thirtieth aspect, alone or in combination with one or more of the first through twenty-ninth aspects, the first signal comprises at least one header that carries the aggregation information.

In a thirty-first aspect, alone or in combination with one or more of the first through thirtieth aspects, transmitting the at least one second signal comprises refraining from transmitting the at least one header.

In a thirty-second aspect, alone or in combination with one or more of the first through thirty-first aspects, receiving the first signal comprises receiving the first signal from a first wireless node, and receiving the third signal comprises receiving the third signal from at least one of the first wireless node or a second wireless node.

In a thirty-third aspect, alone or in combination with one or more of the first through thirty-second aspects, receiving the first signal comprises receiving the first signal using a first beam, and receiving the third signal comprises receiving the third signal using at least one of the first beam or a second beam.

In a thirty-fourth aspect, alone or in combination with one or more of the first through thirty-third aspects, the first signal carries a communication, and processing the first signal based at least in part on the time domain reconfiguration comprises storing the communication in a memory, where the at least one second signal comprises a plurality of signals, and transmitting the at least one second signal comprises transmitting a first signal of the plurality of signals at a first time, where the first signal of the plurality of signals comprises a first re-generated version of the first signal, and transmitting a second signal of the plurality of signals at a second time that is different than the first time, where the second signal of the plurality of signals comprises a second re-generated version of the first signal.

In a thirty-fifth aspect, alone or in combination with one or more of the first through thirty-fourth aspects, process 1100 includes determining that the second signal of the plurality of signals was received by a wireless node, and removing the stored communication from the memory based at least in part on the determination that the second signal of the plurality of signals was received by the wireless node.

In a thirty-sixth aspect, alone or in combination with one or more of the first through thirty-fifth aspects, process 1100 includes receiving an acknowledgement feedback message corresponding to the second signal of the plurality of signals, where the determination that the second signal of the plurality of signals was received by the wireless node is based at least in part on the acknowledgement feedback message.

In a thirty-seventh aspect, alone or in combination with one or more of the first through thirty-sixth aspects, process 1100 includes determining that a feedback timer has expired, where the feedback timer is associated with a time period for receiving an acknowledgement feedback message corresponding to the second signal of the plurality of signals, and the determination that the second signal of the plurality of signals was received by the wireless node is based at least in part on the expiration of the feedback timer.

In a thirty-eighth aspect, alone or in combination with one or more of the first through thirty-seventh aspects, the configuration comprises a retransmission configuration that indicates retransmission information associated with the first signal, and transmitting the second signal of the plurality of signals comprises transmitting the second signal of the plurality of signals based at least in part on the retransmission information.

In a thirty-ninth aspect, alone or in combination with one or more of the first through thirty-eighth aspects, the retransmission configuration indicates at least one resource to be used to transmit the second signal of the plurality of signals.

In a fortieth aspect, alone or in combination with one or more of the first through thirty-ninth aspects, process 1100 includes transmitting, to the control node, a control message that comprises at least one of a request for the retransmission configuration or a suggestion associated with the retransmission configuration.

In a forty-first aspect, alone or in combination with one or more of the first through fortieth aspects, the retransmission information is carried by a control message.

In a forty-second aspect, alone or in combination with one or more of the first through forty-first aspects, the retransmission information is carried by the first signal.

In a forty-third aspect, alone or in combination with one or more of the first through forty-second aspects, transmitting the at least one second signal comprises refraining from transmitting the retransmission information.

In a forty-fourth aspect, alone or in combination with one or more of the first through forty-third aspects, the first signal comprises at least one header that carries the retransmission information.

In a forty-fifth aspect, alone or in combination with one or more of the first through forty-fourth aspects, transmitting the at least one second signal comprises refraining from transmitting the at least one header.

In a forty-sixth aspect, alone or in combination with one or more of the first through forty-fifth aspects, the retransmission information indicates a number of retransmissions associated with the first signal.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
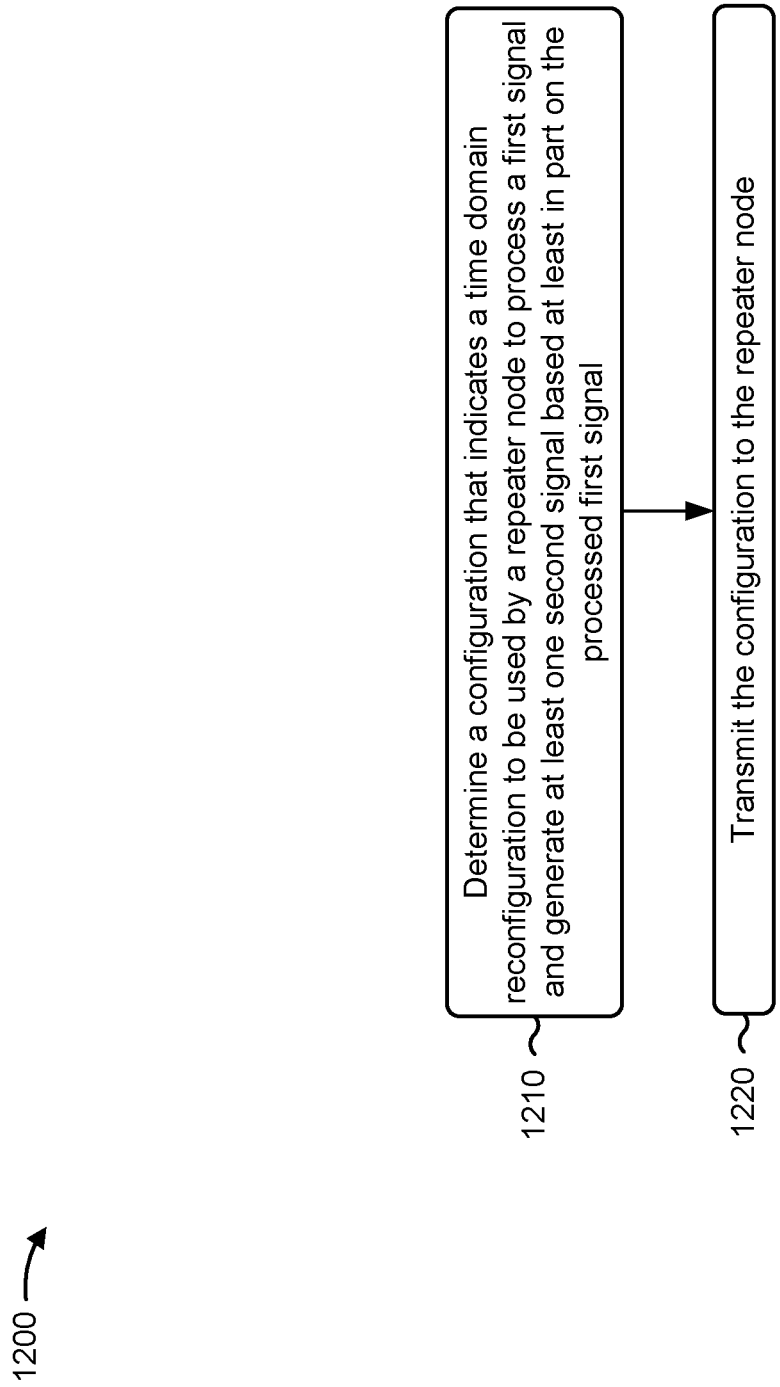

FIG. 12 is a diagram illustrating an example process 1200 performed, for example, by a control node, in accordance with the present disclosure. Example process 1200 is an example where the control node (e.g., the control node 605 shown in FIG. 6, the control node 510 shown in FIG. 5, the control node 410 shown in FIG. 4, and/or the like) performs operations associated with techniques for time domain reconfiguration of a forwarded signal using a repeater node.

As shown in FIG. 12, in some aspects, process 1200 may include determining a configuration that indicates a time domain reconfiguration to be used by a repeater node to process a first signal and generate at least one second signal based at least in part on the processed first signal (block 1210). For example, the control node (e.g., using determination component 1608 of FIG. 16) may determine a configuration that indicates a time domain reconfiguration to be used by a repeater node to process a first signal and generate at least one second signal based at least in part on the processed first signal, as described above.

As further shown in FIG. 12, in some aspects, process 1200 may include transmitting the configuration to the repeater node (block 1220). For example, the control node (e.g., using transmission component 1604 of FIG. 16) may transmit the configuration to the repeater node, as described above.

Process 1200 may include additional aspects, such as any single aspect or any combination of aspects described below and/or in connection with one or more other processes described elsewhere herein.

In a first aspect, process 1200 includes transmitting the first signal to the repeater node.

In a second aspect, alone or in combination with the first aspect, transmitting the first signal comprises transmitting a millimeter wave wireless signal.

In a third aspect, alone or in combination with one or more of the first and second aspects, the first signal comprises at least one of a PDCCH communication, a PDSCH communication, a PUCCH communication, a PUSCH communication, a PRACH communication, a physical sidelink channel communication, an RS communication, or an ACK/NACK feedback message.

In a fourth aspect, alone or in combination with one or more of the first through third aspects, the configuration indicates a digital processing operation that includes the time domain reconfiguration.

In a fifth aspect, alone or in combination with one or more of the first through fourth aspects, the first signal carries a communication, and the time domain reconfiguration comprises an indication to segment the communication into a plurality of communication segments and an indication to generate the at least one second signal by generating a plurality of signals that carry the plurality of communication segments.

In a sixth aspect, alone or in combination with one or more of the first through fifth aspects, the configuration comprises a segmentation configuration that indicates segmentation information associated with the communication, and the configuration comprises an indication to segment the communication based at least in part on the segmentation information.

In a seventh aspect, alone or in combination with one or more of the first through sixth aspects, the segmentation information identifies the plurality of communication segments.

In an eighth aspect, alone or in combination with one or more of the first through seventh aspects, process 1200 includes receiving, from the repeater node, a control message that comprises at least one of a request for the segmentation configuration or a suggestion associated with the segmentation configuration.

In a ninth aspect, alone or in combination with one or more of the first through eighth aspects, the suggestion indicates a suggested number of communication segments.

In a tenth aspect, alone or in combination with one or more of the first through ninth aspects, the segmentation information is carried by a control message.

In an eleventh aspect, alone or in combination with one or more of the first through tenth aspects, the segmentation information is carried by the first signal.

In a twelfth aspect, alone or in combination with one or more of the first through eleventh aspects, the first signal comprises at least one header that carries the segmentation information.

In a thirteenth aspect, alone or in combination with one or more of the first through twelfth aspects, the configuration indicates a plurality of time domain resources to be used by the repeater node for transmitting the at least one second signal.

In a fourteenth aspect, alone or in combination with one or more of the first through thirteenth aspects, the configuration indicates a mapping from a set of resources associated with the first signal to a set of segment indices corresponding to the plurality of communication segments.

In a fifteenth aspect, alone or in combination with one or more of the first through fourteenth aspects, the configuration indicates a first mapping from a first resource of the set of resources to a first segment index of the set of segment indices and a second mapping from a second resource of the set of resources to a second segment index of the set of segment indices.

In a sixteenth aspect, alone or in combination with one or more of the first through fifteenth aspects, the set of resources comprise at least one of a time domain resource or a frequency domain resource.

In a seventeenth aspect, alone or in combination with one or more of the first through sixteenth aspects, the segmentation configuration comprises an indication to transmit a first communication segment of the plurality of communication segments using a first signal of the plurality of signals, and an indication to transmit a second communication segment of the plurality of communication segments using a second signal of the plurality of signals.

In an eighteenth aspect, alone or in combination with one or more of the first through seventeenth aspects, the configuration comprises an indication to transmit the at least one second signal by transmitting the first signal of the plurality of signals using a first time domain resource and transmitting the second signal of the plurality of signals using a second time domain resource that is different than the first time domain resource.

In a nineteenth aspect, alone or in combination with one or more of the first through eighteenth aspects, the configuration comprises an indication to transmit the at least one second signal by transmitting the first signal of the plurality of signals using a first beam and transmitting the second signal of the plurality of signals using a second beam that is different than the first beam.

In a twentieth aspect, alone or in combination with one or more of the first through nineteenth aspects, the configuration comprises an indication to transmit the at least one second signal by transmitting the first signal of the plurality of signals to a first wireless node and transmitting the second signal of the plurality of signals to a second wireless node that is different than the first wireless node.

In a twenty-first aspect, alone or in combination with one or more of the first through twentieth aspects, the configuration comprises an indication to process a third signal received by the repeater node based at least in part on the time domain reconfiguration by aggregating the first signal and the third signal to form an aggregated signal, where the at least one second signal comprises the aggregated signal.

In a twenty-second aspect, alone or in combination with one or more of the first through twenty-first aspects, the configuration comprises an aggregation configuration that indicates aggregation information associated with the aggregated signal, and the aggregation configuration comprises an indication to aggregate the first signal and the third signal by generating the aggregated signal based at least in part on the aggregation information.

In a twenty-third aspect, alone or in combination with one or more of the first through twenty-second aspects, the aggregation configuration indicates at least one resource to be used to transmit the aggregated signal.

In a twenty-fourth aspect, alone or in combination with one or more of the first through twenty-third aspects, process 1200 includes receiving, from the repeater node, a control message that comprises at least one of a request for the aggregation configuration or a suggestion associated with the aggregation configuration.

In a twenty-fifth aspect, alone or in combination with one or more of the first through twenty-fourth aspects, the aggregation information is carried by a control message.

In a twenty-sixth aspect, alone or in combination with one or more of the first through twenty-fifth aspects, the aggregation information is carried by the first signal.

In a twenty-seventh aspect, alone or in combination with one or more of the first through twenty-sixth aspects, the first signal comprises at least one header that carries the aggregation information.

In a twenty-eighth aspect, alone or in combination with one or more of the first through twenty-seventh aspects, the first signal is associated with a first beam and the third signal is associated with at least one of the first beam or a second beam.

In a twenty-ninth aspect, alone or in combination with one or more of the first through twenty-eighth aspects, the first signal carries a communication and the configuration comprises an indication to process the first signal based at least in part on the time domain reconfiguration by storing the communication in a memory, where the at least one second signal comprises a plurality of signals, and where the configuration comprises an indication to transmit the at least one second signal by transmitting a first signal of the plurality of signals at a first time, where the first signal of the plurality of signals comprises a first re-generated version of the first signal, and transmitting a second signal of the plurality of signals at a second time that is different than the first time, wherein the second signal of the plurality of signals comprises a second re-generated version of the first signal.

In a thirtieth aspect, alone or in combination with one or more of the first through twenty-ninth aspects, the configuration comprises an indication to remove the stored communication from the memory based at least in part on a determination that the second signal of the plurality of signals was received by a wireless node.

In a thirty-first aspect, alone or in combination with one or more of the first through thirtieth aspects, the configuration comprises a retransmission configuration that indicates retransmission information associated with the first signal, and the configuration comprises an indication to transmit the second signal of the plurality of signals based at least in part on the retransmission information.

In a thirty-second aspect, alone or in combination with one or more of the first through thirty-first aspects, the retransmission configuration indicates at least one resource to be used to transmit the second signal of the plurality of signals.

In a thirty-third aspect, alone or in combination with one or more of the first through thirty-second aspects, process 1200 includes receiving, from the repeater node, a control message that comprises at least one of a request for the retransmission configuration or a suggestion associated with the retransmission configuration.

In a thirty-fourth aspect, alone or in combination with one or more of the first through thirty-third aspects, the retransmission information is carried by a control message.

In a thirty-fifth aspect, alone or in combination with one or more of the first through thirty-fourth aspects, the retransmission information is carried by the first signal.

In a thirty-sixth aspect, alone or in combination with one or more of the first through thirty-fifth aspects, the first signal comprises at least one header that carries the retransmission information.

In a thirty-seventh aspect, alone or in combination with one or more of the first through thirty-sixth aspects, the retransmission information indicates a number of retransmissions associated with the first signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
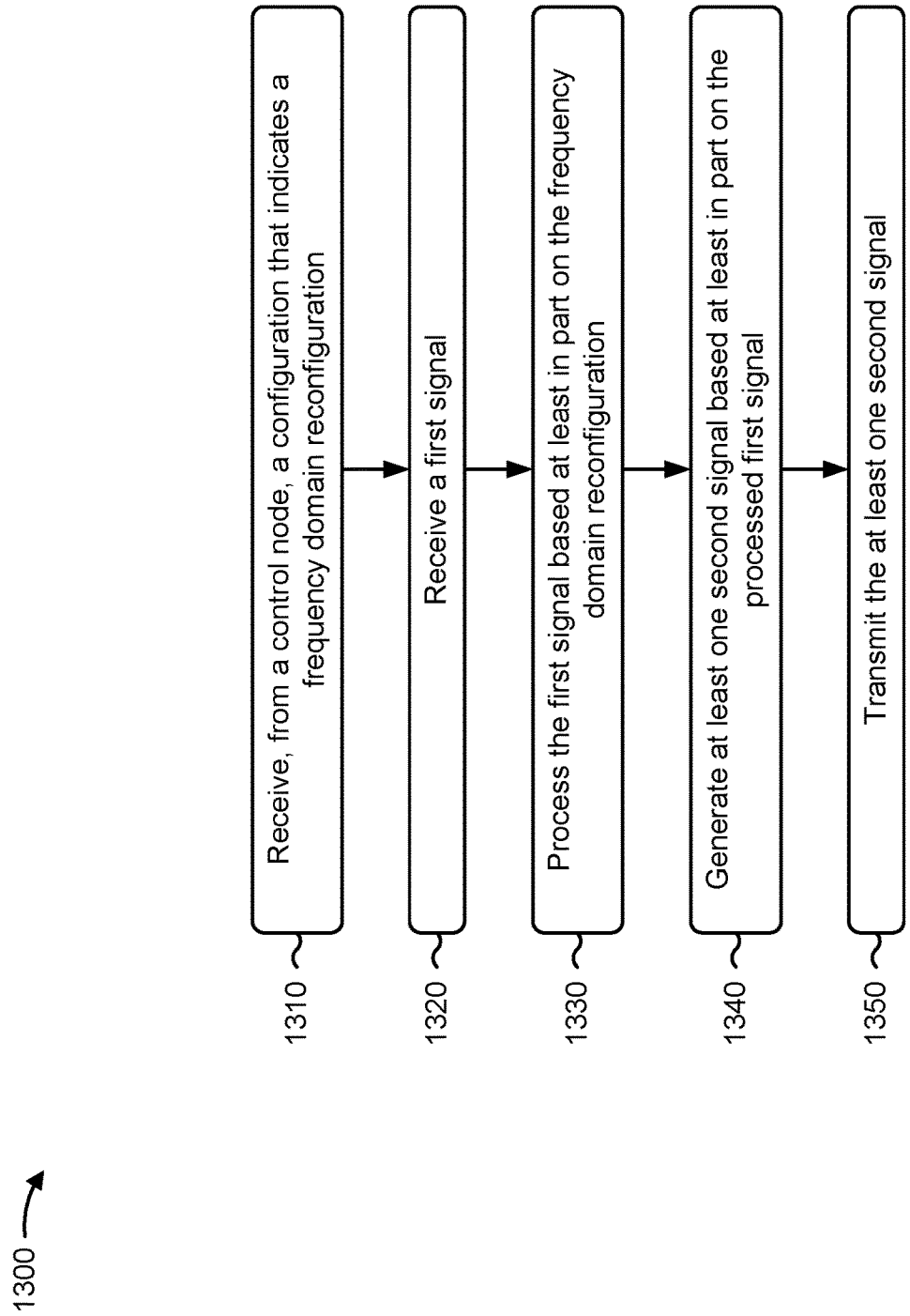
FIGS. 13 and 14 are diagrams illustrating example processes associated with frequency domain reconfiguration of a forwarded signal using a repeater node, in accordance with the present disclosure.

FIG. 13 is a diagram illustrating an example process 1300 performed, for example, by a repeater node, in accordance with the present disclosure. Example process 1300 is an example where the repeater node (e.g., repeater node 610 shown in FIG. 6, repeater node 505 shown in FIG. 5, repeater node 405 shown in FIG. 4, and/or the like) performs operations associated with techniques for frequency domain reconfiguration of a forwarded signal using a repeater node.

As shown in FIG. 13, in some aspects, process 1300 may include receiving, from a control node, a configuration that indicates a frequency domain reconfiguration (block 1310). For example, the repeater node (e.g., using reception component 1502 of FIG. 15) may receive, from a control node, a configuration that indicates a frequency domain reconfiguration, as described above.

As further shown in FIG. 13, in some aspects, process 1300 may include receiving a first signal (block 1320). For example, the repeater node (e.g., using reception component 1502 of FIG. 15) may receive a first signal, as described above.

As further shown in FIG. 13, in some aspects, process 1300 may include processing the first signal based at least in part on the frequency domain reconfiguration (block 1330). For example, the repeater node (e.g., using processing component 1508 of FIG. 15) may process the first signal based at least in part on the frequency domain reconfiguration, as described above.

As further shown in FIG. 13, in some aspects, process 1300 may include generating at least one second signal based at least in part on the processed first signal (block 1340). For example, the repeater node (e.g., using generation component 1510 of FIG. 15) may generate at least one second signal based at least in part on the processed first signal, as described above.

As further shown in FIG. 13, in some aspects, process 1300 may include transmitting the at least one second signal (block 1350). For example, the repeater node (e.g., using transmission component 1504 of FIG. 15) may transmit the at least one second signal, as described above.

Process 1300 may include additional aspects, such as any single aspect or any combination of aspects described below and/or in connection with one or more other processes described elsewhere herein.

In a first aspect, receiving the first signal comprises receiving a millimeter wave wireless signal.

In a second aspect, alone or in combination with the first aspect, the first signal comprises at least one of a PDCCH communication, a PDSCH communication, a PUCCH communication, a PUSCH communication, a PRACH communication, a physical sidelink channel communication, an RS communication, or an ACK/NACK feedback message.

In a third aspect, alone or in combination with one or more of the first and second aspects, the configuration indicates a digital processing operation that includes the frequency domain reconfiguration, and processing the first signal based at least in part on the frequency domain reconfiguration comprises performing the digital processing operation.

In a fourth aspect, alone or in combination with one or more of the first through third aspects, receiving the first signal comprises receiving the first signal using a first frequency domain resource having a first center frequency, and transmitting the at least one second signal comprises transmitting the at least one second signal using a second frequency domain resource having a second center frequency, where the second center frequency is different than the first center frequency.

In a fifth aspect, alone or in combination with one or more of the first through fourth aspects, the first frequency domain resource comprises at least one of a resource element, a bandwidth, or a BWP.

In a sixth aspect, alone or in combination with one or more of the first through fifth aspects, the first frequency domain resource is the bandwidth part and is associated with at least one of a front haul link between the control node and the repeater node, an access link between the control node and the repeater node, or a wireless node.

In a seventh aspect, alone or in combination with one or more of the first through sixth aspects, the configuration comprises a frequency shift configuration that indicates the second frequency domain resource.

In an eighth aspect, alone or in combination with one or more of the first through seventh aspects, process 1300 includes obtaining channel information associated with the second frequency domain resource, and transmitting, to the control node, a control message that indicates the channel information, where the frequency shift configuration indicates the second frequency domain resource based at least in part on the channel information.

In a ninth aspect, alone or in combination with one or more of the first through eighth aspects, the frequency shift configuration indicates a difference between the first center frequency and the second center frequency.

In a tenth aspect, alone or in combination with one or more of the first through ninth aspects, the difference comprises a number of resource elements.

In an eleventh aspect, alone or in combination with one or more of the first through tenth aspects, the difference comprises a frequency offset value.

In a twelfth aspect, alone or in combination with one or more of the first through eleventh aspects, process 1300 includes transmitting, to the control node, a control message that comprises at least one of a request for the frequency shift configuration or a suggestion associated with the frequency shift configuration.

In a thirteenth aspect, alone or in combination with one or more of the first through twelfth aspects, the suggestion indicates at least one of a suggested frequency domain resource or a suggested frequency offset.

In a fourteenth aspect, alone or in combination with one or more of the first through thirteenth aspects, the frequency shift configuration is carried by a control message.

In a fifteenth aspect, alone or in combination with one or more of the first through fourteenth aspects, the frequency shift configuration is carried by the first signal.

In a sixteenth aspect, alone or in combination with one or more of the first through fifteenth aspects, transmitting the at least one second signal comprises refraining from transmitting the frequency shift configuration.

In a seventeenth aspect, alone or in combination with one or more of the first through sixteenth aspects, the first signal comprises at least one header that carries the frequency shift configuration.

In an eighteenth aspect, alone or in combination with one or more of the first through seventeenth aspects, transmitting the at least one second signal comprises refraining from transmitting the at least one header.

In a nineteenth aspect, alone or in combination with one or more of the first through eighteenth aspects, the first signal carries an aggregated communication comprising a plurality of communications, where the plurality of communications are frequency division multiplexed, and processing the first signal based at least in part on the frequency domain reconfiguration comprises segmenting the aggregated communication into the plurality of communications, where generating the at least one second signal comprises generating a plurality of signals, and where the plurality of signals carry the plurality of communications.

In a twentieth aspect, alone or in combination with one or more of the first through nineteenth aspects, the configuration comprises a segmentation configuration that indicates segmentation information associated with the aggregated communication, and segmenting the aggregated communication comprises segmenting the aggregated communication based at least in part on the segmentation information.

In a twenty-first aspect, alone or in combination with one or more of the first through twentieth aspects, the segmentation information identifies the plurality of communications.

In a twenty-second aspect, alone or in combination with one or more of the first through twenty-first aspects, process 1300 includes transmitting, to the control node, a control message that comprises at least one of a request for the segmentation configuration, or a suggestion associated with the segmentation configuration.

In a twenty-third aspect, alone or in combination with one or more of the first through twenty-second aspects, the segmentation information is carried by a control message.

In a twenty-fourth aspect, alone or in combination with one or more of the first through twenty-third aspects, the segmentation information is carried by the first signal.

In a twenty-fifth aspect, alone or in combination with one or more of the first through twenty-fourth aspects, transmitting the at least one second signal comprises refraining from transmitting the segmentation information.

In a twenty-sixth aspect, alone or in combination with one or more of the first through twenty-fifth aspects, the first signal comprises at least one header that carries the segmentation information.

In a twenty-seventh aspect, alone or in combination with one or more of the first through twenty-sixth aspects, transmitting the at least one second signal comprises refraining from transmitting the at least one header.

In a twenty-eighth aspect, alone or in combination with one or more of the first through twenty-seventh aspects, transmitting the at least one second signal comprises transmitting a plurality of signals using a plurality of frequency domain resources.

In a twenty-ninth aspect, alone or in combination with one or more of the first through twenty-eighth aspects, transmitting the plurality of signals further comprises transmitting the plurality of signals using a plurality of time domain resources.

In a thirtieth aspect, alone or in combination with one or more of the first through twenty-ninth aspects, the configuration indicates the plurality of frequency domain resources.

In a thirty-first aspect, alone or in combination with one or more of the first through thirtieth aspects, a first signal of the plurality of signals carries a first communication of the plurality of communications, and a second signal of the plurality of signals carries a second communication of the plurality of communications.

In a thirty-second aspect, alone or in combination with one or more of the first through thirty-first aspects, transmitting the plurality of signals comprises transmitting the first signal of the plurality of signals using a first frequency domain resource, and transmitting the second signal of the plurality of signals using a second frequency domain resource that is different than the first frequency domain resource.

In a thirty-third aspect, alone or in combination with one or more of the first through thirty-second aspects, the first frequency domain resource is associated with a front haul link between the control node and the repeater node, and the second frequency domain resource is associated with an access link between the control node and the repeater node.

In a thirty-fourth aspect, alone or in combination with one or more of the first through thirty-third aspects, transmitting the plurality of signals comprises transmitting the first signal of the plurality of signals using a first beam, and transmitting the second signal of the plurality of signals using a second beam that is different than the first beam.

In a thirty-fifth aspect, alone or in combination with one or more of the first through thirty-fourth aspects, the first beam corresponds to a first wireless node, and the second beam corresponds to a second wireless node.

In a thirty-sixth aspect, alone or in combination with one or more of the first through thirty-fifth aspects, process 1300 includes receiving a third signal, and processing the third signal based at least in part on the frequency domain reconfiguration by aggregating, using frequency division multiplexing, the first signal and the third signal to form an aggregated signal, where the at least one second signal comprises the aggregated signal.

In a thirty-seventh aspect, alone or in combination with one or more of the first through thirty-sixth aspects, the configuration comprises an aggregation configuration that indicates aggregation information associated with the aggregated signal, and aggregating the first signal and the third signal comprises generating the aggregated signal based at least in part on the aggregation information.

In a thirty-eighth aspect, alone or in combination with one or more of the first through thirty-seventh aspects, the aggregation configuration indicates at least one resource to be used to transmit the aggregated signal.

In a thirty-ninth aspect, alone or in combination with one or more of the first through thirty-eighth aspects, process 1300 includes transmitting, to the control node, a control message that comprises at least one of a request for the aggregation configuration or a suggestion associated with the aggregation configuration.

In a fortieth aspect, alone or in combination with one or more of the first through thirty-ninth aspects, the aggregation information is carried by a control message.

In a forty-first aspect, alone or in combination with one or more of the first through fortieth aspects, the aggregation information is carried by the first signal.

In a forty-second aspect, alone or in combination with one or more of the first through forty-first aspects, transmitting the at least one second signal comprises refraining from transmitting the aggregation information.

In a forty-third aspect, alone or in combination with one or more of the first through forty-second aspects, the first signal comprises at least one header that carries the aggregation information.

In a forty-fourth aspect, alone or in combination with one or more of the first through forty-third aspects, transmitting the at least one second signal comprises refraining from transmitting the at least one header.

In a forty-fifth aspect, alone or in combination with one or more of the first through forty-fourth aspects, receiving the first signal comprises receiving the first signal from a first wireless node, and receiving the third signal comprises receiving the third signal from at least one of the first wireless node or a second wireless node.

In a forty-sixth aspect, alone or in combination with one or more of the first through forty-fifth aspects, receiving the first signal comprises receiving the first signal using a first beam, and receiving the third signal comprises receiving the third signal using at least one of the first beam or a second beam.

In a forty-seventh aspect, alone or in combination with one or more of the first through forty-sixth aspects, the configuration indicates a mapping from a first set of resources associated with the first signal to a second set of resources corresponding to the at least one second signal.

In a forty-eighth aspect, alone or in combination with one or more of the first through forty-seventh aspects, the first set of resources comprises a first set of resource elements, and the second set of resources comprises a second set of resource elements.

In a forty-ninth aspect, alone or in combination with one or more of the first through forty-eighth aspects, the first set of resources comprises a first set of symbols, and the second set of resources comprises a second set of symbols.

In a fiftieth aspect, alone or in combination with one or more of the first through forty-ninth aspects, process 1300 includes transmitting, to the control node, a control message that comprises at least one of a request for the mapping, or a suggestion associated with the mapping.

In a fifty-first aspect, alone or in combination with one or more of the first through fiftieth aspects, the mapping is carried by a control message.

In a fifty-second aspect, alone or in combination with one or more of the first through fifty-first aspects, the mapping is carried by the first signal.

In a fifty-third aspect, alone or in combination with one or more of the first through fifty-second aspects, transmitting the at least one second signal comprises refraining from transmitting the mapping.

In a fifty-fourth aspect, alone or in combination with one or more of the first through fifty-third aspects, the first signal comprises at least one header that carries the mapping.

In a fifty-fifth aspect, alone or in combination with one or more of the first through fifty-fourth aspects, transmitting the at least one second signal comprises refraining from transmitting the at least one header.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
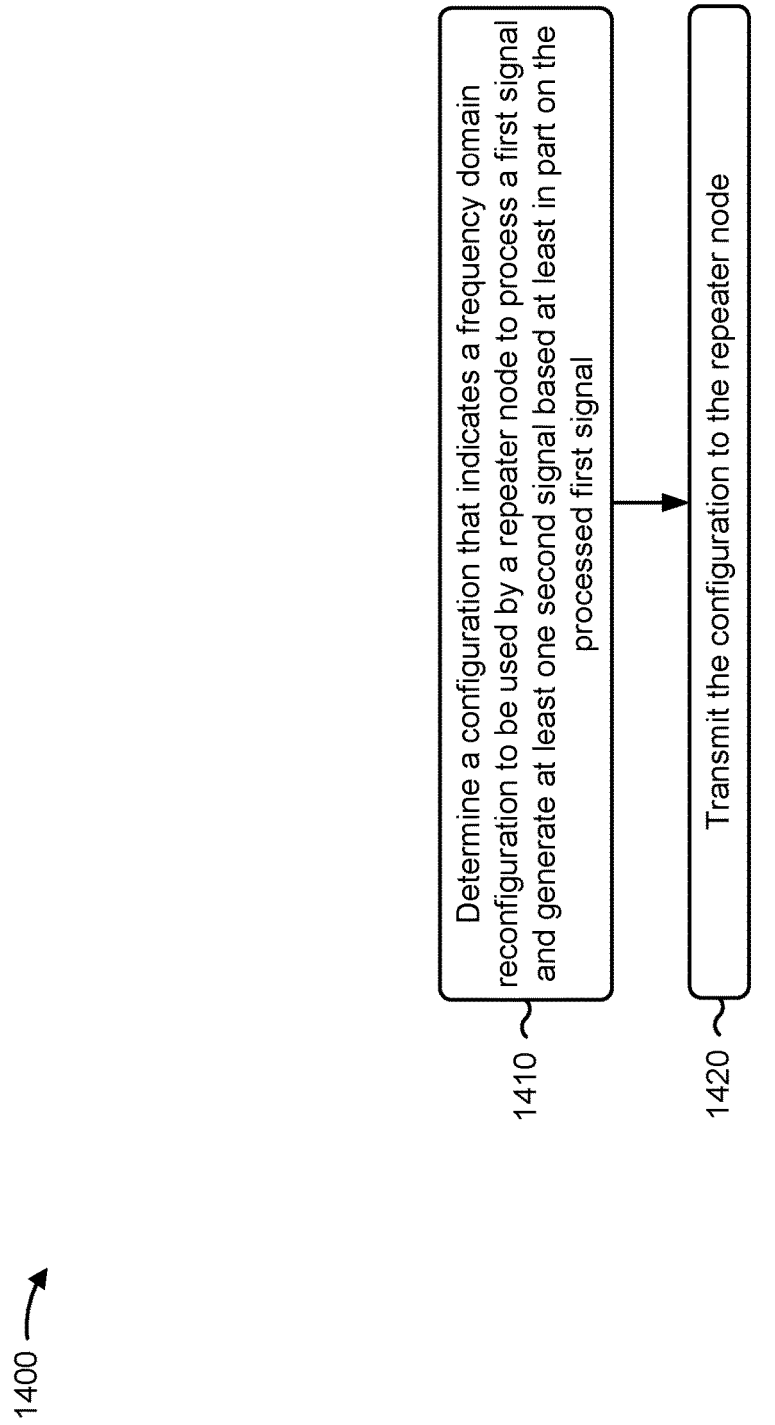

FIG. 14 is a diagram illustrating an example process 1400 performed, for example, by a control node, in accordance with the present disclosure. Example process 1400 is an example where the control node (e.g., the control node 605 shown in FIG. 6, the control node 510 shown in FIG. 5, the control node 410 shown in FIG. 4, and/or the like) performs operations associated with techniques for frequency domain reconfiguration of a forwarded signal using a repeater node.

As shown in FIG. 14, in some aspects, process 1400 may include determining a configuration that indicates a frequency domain reconfiguration to be used by a repeater node to process a first signal and generate at least one second signal based at least in part on the processed first signal (block 1410). For example, the control node (e.g., using determination component 1608 of FIG. 16) may determine a configuration that indicates a frequency domain reconfiguration to be used by a repeater node to process a first signal and generate at least one second signal based at least in part on the processed first signal, as described above.

As further shown in FIG. 14, in some aspects, process 1400 may include transmitting the configuration to the repeater node (block 1420). For example, the control node (e.g., using transmission component 1604 of FIG. 16) may transmit the configuration to the repeater node, as described above.

Process 1400 may include additional aspects, such as any single aspect or any combination of aspects described below and/or in connection with one or more other processes described elsewhere herein.

In a first aspect, process 1400 includes transmitting the first signal to the repeater node.

In a second aspect, alone or in combination with the first aspect, transmitting the first signal comprises transmitting a millimeter wave wireless signal.

In a third aspect, alone or in combination with one or more of the first and second aspects, the first signal comprises at least one of a PDCCH communication, a PDSCH communication, a PUCCH communication, a PUSCH communication, a PRACH communication, a physical sidelink channel communication, an RS communication, or an ACK/NACK feedback message.

In a fourth aspect, alone or in combination with one or more of the first through third aspects, the configuration indicates a digital processing operation that includes the frequency domain reconfiguration, and the configuration comprises an indication to process the first signal based at least in part on the frequency domain reconfiguration by performing the digital processing operation.

In a fifth aspect, alone or in combination with one or more of the first through fourth aspects, the first signal is associated with a first frequency domain resource having a first center frequency, and the configuration comprises an indication to transmit the at least one second signal using a second frequency domain resource having a second center frequency, where the second center frequency is different than the first center frequency.

In a sixth aspect, alone or in combination with one or more of the first through fifth aspects, the first frequency domain resource comprises at least one of a resource element, a bandwidth, or a bandwidth part.

In a seventh aspect, alone or in combination with one or more of the first through sixth aspects, the first frequency domain resource is the bandwidth part and is associated with at least one of a front haul link between the control node and the repeater node, an access link between the control node and the repeater node, or a wireless node.

In an eighth aspect, alone or in combination with one or more of the first through seventh aspects, the configuration comprises a frequency shift configuration that indicates the second frequency domain resource.

In a ninth aspect, alone or in combination with one or more of the first through eighth aspects, the configuration comprises an indication to obtain channel information associated with the second frequency domain resource, and an indication to transmit, to the control node, a control message that indicates the channel information, where the frequency shift configuration indicates the second frequency domain resource based at least in part on the channel information.

In a tenth aspect, alone or in combination with one or more of the first through ninth aspects, the frequency shift configuration indicates a difference between the first center frequency and the second center frequency.

In an eleventh aspect, alone or in combination with one or more of the first through tenth aspects, the difference comprises a number of resource elements.

In a twelfth aspect, alone or in combination with one or more of the first through eleventh aspects, the difference comprises a frequency offset value.

In a thirteenth aspect, alone or in combination with one or more of the first through twelfth aspects, process 1400 includes receiving, from the repeater node, a control message that comprises at least one of a request for the frequency shift configuration or a suggestion associated with the frequency shift configuration.

In a fourteenth aspect, alone or in combination with one or more of the first through thirteenth aspects, the suggestion indicates at least one of a suggested frequency domain resource or a suggested frequency offset.

In a fifteenth aspect, alone or in combination with one or more of the first through fourteenth aspects, the frequency shift configuration is carried by a control message.

In a sixteenth aspect, alone or in combination with one or more of the first through fifteenth aspects, the frequency shift configuration is carried by the first signal.

In a seventeenth aspect, alone or in combination with one or more of the first through sixteenth aspects, the first signal comprises at least one header that carries the frequency shift configuration.

In an eighteenth aspect, alone or in combination with one or more of the first through seventeenth aspects, the first signal carries an aggregated communication comprising a plurality of communications, where the plurality of communications are frequency division multiplexed, and the configuration comprises an indication to process the first signal based at least in part on the frequency domain reconfiguration by segmenting the aggregated communication into the plurality of communications, where generating the at least one second signal comprises generating a plurality of signals, where the plurality of signals carry the plurality of communications.

In a nineteenth aspect, alone or in combination with one or more of the first through eighteenth aspects, the configuration comprises a segmentation configuration that indicates segmentation information associated with the aggregated communication, and the configuration comprises an indication to segment the aggregated communication based at least in part on the segmentation information.

In a twentieth aspect, alone or in combination with one or more of the first through nineteenth aspects, the segmentation information identifies the plurality of communications.

In a twenty-first aspect, alone or in combination with one or more of the first through twentieth aspects, process 1400 includes receiving, from the repeater node, a control message that comprises at least one of a request for the segmentation configuration, or a suggestion associated with the segmentation configuration.

In a twenty-second aspect, alone or in combination with one or more of the first through twenty-first aspects, the segmentation information is carried by a control message.

In a twenty-third aspect, alone or in combination with one or more of the first through twenty-second aspects, the segmentation information is carried by the first signal.

In a twenty-fourth aspect, alone or in combination with one or more of the first through twenty-third aspects, the first signal comprises at least one header that carries the segmentation information.

In a twenty-fifth aspect, alone or in combination with one or more of the first through twenty-fourth aspects, the configuration comprises an indication to transmit the at least one second signal by transmitting a plurality of signals using a plurality of frequency domain resources.

In a twenty-sixth aspect, alone or in combination with one or more of the first through twenty-fifth aspects, the configuration comprises an indication to transmit the plurality of signals by transmitting the plurality of signals using a plurality of time domain resources.

In a twenty-seventh aspect, alone or in combination with one or more of the first through twenty-sixth aspects, the configuration indicates the plurality of frequency domain resources.

In a twenty-eighth aspect, alone or in combination with one or more of the first through twenty-seventh aspects, the configuration comprises an indication to transmit a first communication of the plurality of communications using a first signal of the plurality of signals, and an indication to transmit a second communication of the plurality of communications using a second signal of the plurality of signals.

In a twenty-ninth aspect, alone or in combination with one or more of the first through twenty-eighth aspects, the configuration comprises an indication to transmit the plurality of signals by transmitting the first signal of the plurality of signals using a first frequency domain resource and transmitting the second signal of the plurality of signals using a second frequency domain resource that is different than the first frequency domain resource.

In a thirtieth aspect, alone or in combination with one or more of the first through twenty-ninth aspects, the first frequency domain resource is associated with a front haul link between the control node and the repeater node and the second frequency domain resource is associated with an access link between the control node and the repeater node.

In a thirty-first aspect, alone or in combination with one or more of the first through thirtieth aspects, the configuration comprises an indication to transmit the plurality of signals by transmitting the first signal of the plurality of signals using a first beam and transmitting the second signal of the plurality of signals using a second beam that is different than the first beam.

In a thirty-second aspect, alone or in combination with one or more of the first through thirty-first aspects, the first beam corresponds to a first wireless node and the second beam corresponds to a second wireless node.

In a thirty-third aspect, alone or in combination with one or more of the first through thirty-second aspects, the configuration comprises an indication to process a third signal received by the repeater node based at least in part on the frequency domain reconfiguration by aggregating, using frequency division multiplexing, the first signal and the third signal to form an aggregated signal, where the at least one second signal comprises the aggregated signal.

In a thirty-fourth aspect, alone or in combination with one or more of the first through thirty-third aspects, the configuration comprises an aggregation configuration that indicates aggregation information associated with the aggregated signal, and the configuration comprises an indication to aggregate the first signal and the third signal based at least in part on the aggregation information.

In a thirty-fifth aspect, alone or in combination with one or more of the first through thirty-fourth aspects, the aggregation configuration indicates at least one resource to be used to transmit the aggregated signal.

In a thirty-sixth aspect, alone or in combination with one or more of the first through thirty-fifth aspects, process 1400 includes receiving, from the repeater node, a control message that comprises at least one of a request for the aggregation configuration or a suggestion associated with the aggregation configuration.

In a thirty-seventh aspect, alone or in combination with one or more of the first through thirty-sixth aspects, the aggregation information is carried by a control message.

In a thirty-eighth aspect, alone or in combination with one or more of the first through thirty-seventh aspects, the aggregation information is carried by the first signal.

In a thirty-ninth aspect, alone or in combination with one or more of the first through thirty-eighth aspects, the first signal comprises at least one header that carries the aggregation information.

In a fortieth aspect, alone or in combination with one or more of the first through thirty-ninth aspects, the first signal is associated with a first beam and the third signal is associated with at least one of the first beam or a second beam.

In a forty-first aspect, alone or in combination with one or more of the first through fortieth aspects, the configuration indicates a mapping from a first set of resources associated with the first signal to a second set of resources corresponding to the at least one second signal.

In a forty-second aspect, alone or in combination with one or more of the first through forty-first aspects, the first set of resources comprises a first set of resource elements and the second set of resources comprises a second set of resource elements.

In a forty-third aspect, alone or in combination with one or more of the first through forty-second aspects, the first set of resources comprises a first set of symbols and wherein the second set of resources comprises a second set of symbols.

In a forty-fourth aspect, alone or in combination with one or more of the first through forty-third aspects, process 1400 includes receiving, from the repeater node, a control message that comprises at least one of a request for the mapping, or a suggestion associated with the mapping.

In a forty-fifth aspect, alone or in combination with one or more of the first through forty-fourth aspects, the mapping is carried by a control message.

In a forty-sixth aspect, alone or in combination with one or more of the first through forty-fifth aspects, the mapping is carried by the first signal.

In a forty-seventh aspect, alone or in combination with one or more of the first through forty-sixth aspects, the first signal comprises at least one header that carries the mapping.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
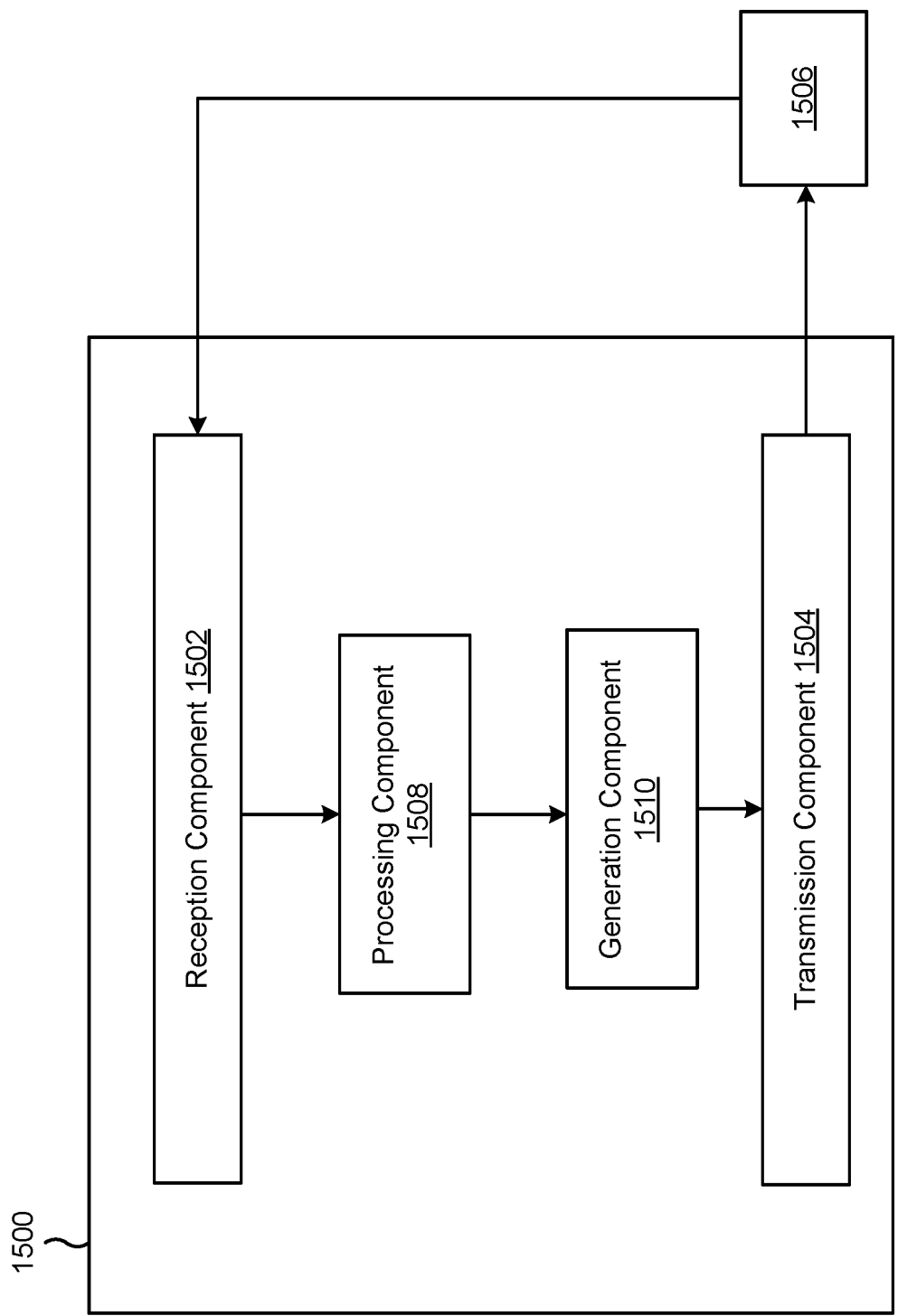
FIGS. 15 and 16 are block diagrams of example apparatuses for wireless communication, in accordance with the present disclosure.

FIG. 15 is a block diagram of an example apparatus 1500 for wireless communication. The apparatus 1500 may be a repeater node, or a repeater node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a processing component 1508, or a generation component 1510, among other examples.

In some aspects, the apparatus 1500 may be configured to perform one or more operations described herein in connection with FIGS. 4-10. Additionally or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the repeater node described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the repeater node described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the repeater node described above in connection with FIG. 2. In some aspects, the transmission component 1504 may be collocated with the reception component 1502 in a transceiver.

The reception component 1502 may receive, from a control node, a configuration that indicates a time and/or frequency domain reconfiguration. The reception component 1502 may receive a first signal. The processing component 1508 may process the first signal based at least in part on the time and/or frequency domain reconfiguration. In some aspects, the processing component 1508 may include a demodulator, a MIMO detector, a receive processor, a modulator, a transmit MIMO processor, a transmit processor, a controller/processor, a memory, or a combination thereof, of the repeater node described above in connection with FIG. 2. The generation component 1510 may generate at least one second signal based at least in part on the processed first signal. In some aspects, the generation component 1510 may include a modulator, a transmit MIMO processor, a transmit processor, a controller/processor, a memory, or a combination thereof, of the repeater node described above in connection with FIG. 2. The transmission component 1504 may transmit the at least one second signal.

The transmission component 1504 may transmit, to the control node, a control message that comprises at least one of a request for the segmentation configuration, or a suggestion associated with the segmentation configuration.

The reception component 1502 may receive a third signal. The processing component 1508 may process the third signal based at least in part on a time domain reconfiguration by aggregating the first signal and the third signal to form an aggregated signal, and wherein the at least one second signal comprises the aggregated signal.

The transmission component 1504 may transmit, to the control node, a control message that comprises at least one of a request for the aggregation configuration, or a suggestion associated with the aggregation configuration.

The reception component 1502 may receive an acknowledgement feedback message corresponding to the second signal of the plurality of signals, wherein the determination that the second signal of the plurality of signals was received by the wireless node is based at least in part on the acknowledgement feedback message.

The transmission component 1504 may transmit, to the control node, a control message that comprises at least one of a request for the retransmission configuration, or a suggestion associated with the retransmission configuration.

The transmission component 1504 and/or reception component 1502 may obtain channel information associated with the second frequency domain resource.

The transmission component 1504 may transmit, to the control node, a control message that indicates the channel information, wherein the frequency shift configuration indicates the second frequency domain resource based at least in part on the channel information.

The transmission component 1504 may transmit, to the control node, a control message that comprises at least one of a request for the frequency shift configuration, or a suggestion associated with the frequency shift configuration.

The transmission component 1504 may transmit, to the control node, a control message that comprises at least one of a request for the segmentation configuration, or a suggestion associated with the segmentation configuration.

The transmission component 1504 may transmit, to the control node, a control message that comprises at least one of a request for the aggregation configuration, or a suggestion associated with the aggregation configuration.

The transmission component 1504 may transmit, to the control node, a control message that comprises at least one of a request for the mapping, or a suggestion associated with the mapping.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
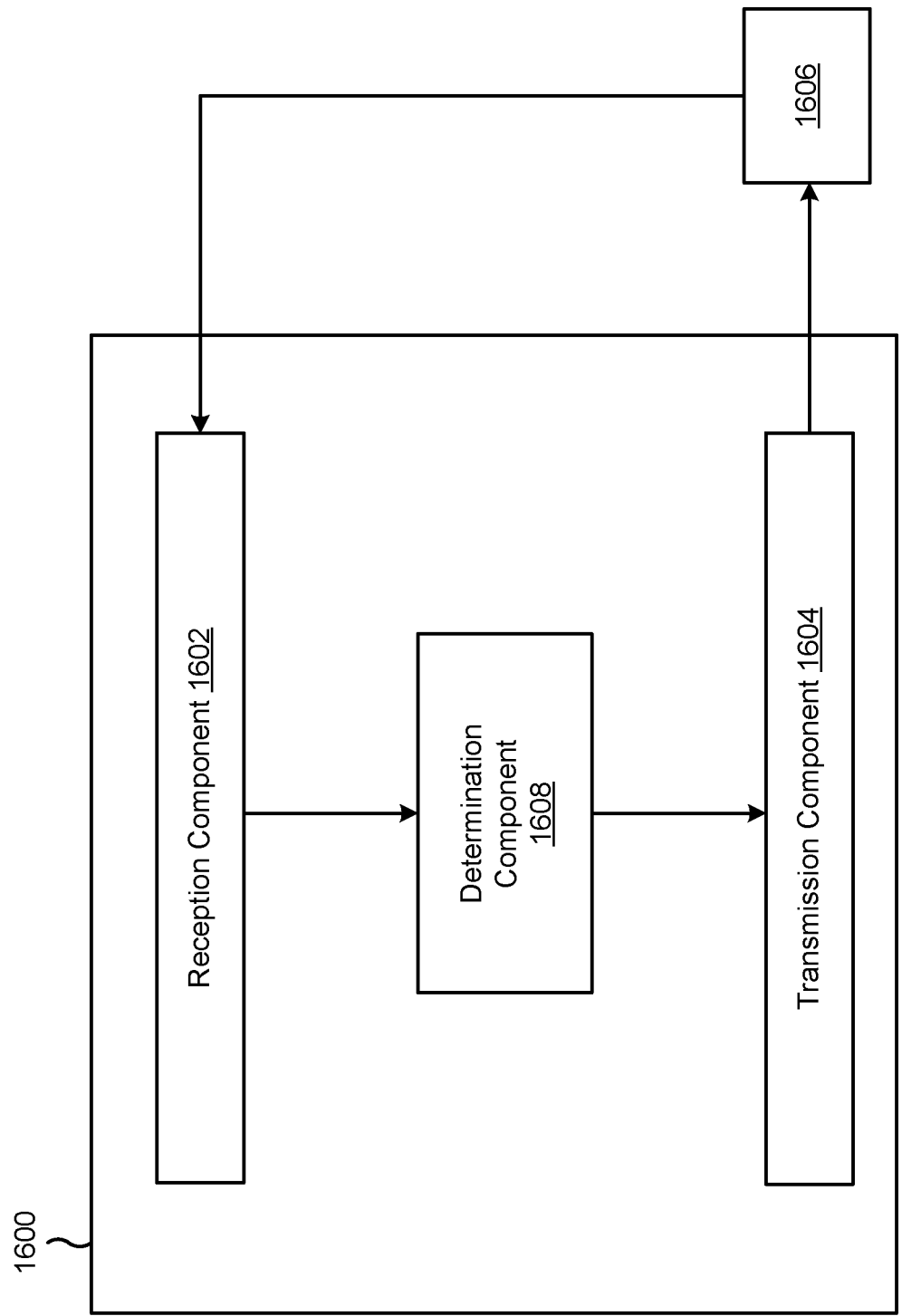

FIG. 16 is a block diagram of an example apparatus 1600 for wireless communication. The apparatus 1600 may be a control node, or a control node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a determination component 1608, among other examples.

In some aspects, the apparatus 1600 may be configured to perform one or more operations described herein in connection with FIGS. 4-10. Additionally or alternatively, the apparatus 1600 may be configured to perform aspects of one or more processes described herein, such as process 1200 of FIG. 12, process 1400 of FIG. 14, or a combination thereof. In some aspects, the apparatus 1600 and/or one or more components shown in FIG. 16 may include one or more components of the control node described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the control node described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the control node described above in connection with FIG. 2. In some aspects, the transmission component 1604 may be collocated with the reception component 1602 in a transceiver.

The reception component 1602 may receive at least one control message from a repeater node, where the at least one control message indicates at least one of a configuration of the repeater node, a capability of the repeater node, or a status of the repeater node. The determination component 1608 may determine a configuration indicating a processing operation (e.g., a time domain reconfiguration, a frequency domain reconfiguration, and/or the like) to be used by the repeater node to process a first signal and generate at least one second signal based at least in part on the processed first signal. In some aspects, the determination component 1608 may determine the configuration based at least in part on at least one of the configuration of the repeater node, the capability of the repeater node, or the status of the repeater node. In some aspects, the determination component 1608 may include a controller/processor, a memory, or a combination thereof, of the control node described above in connection with FIG. 2. The transmission component 1604 may transmit the configuration. The transmission component 1604 may transmit the first signal to the repeater node.

The reception component 1602 may receive a control message from the repeater node that comprises at least one of a request for a segmentation configuration or a suggestion associated with the segmentation configuration. The reception component 1602 may receive a control message from the repeater node that comprises at least one of a request for an aggregation configuration or a suggestion associated with the aggregation configuration. The reception component 1602 may receive a control message from the repeater node that comprises at least one of a request for a retransmission configuration or a suggestion associated with the retransmission configuration.

The reception component 1602 may receive a control message from the repeater node that comprises at least one of a request for a frequency shift configuration or a suggestion associated with the frequency shift configuration. The reception component 1602 may receive a control message from the repeater node that comprises at least one of a request for a segmentation configuration or a suggestion associated with the segmentation configuration. The reception component 1602 may receive a control message from the repeater node that comprises at least one of a request for an aggregation configuration or a suggestion associated with the aggregation configuration. The reception component 1602 may receive a control message from the repeater node that comprises at least one of a request for a mapping or a suggestion associated with the mapping.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a repeater node, comprising: receiving, from a control node, a configuration that indicates at least one of a time domain reconfiguration or a frequency domain reconfiguration; receiving a first signal; processing the first signal based at least in part on the configuration; generating at least one second signal based at least in part on the processed first signal; and transmitting the at least one second signal.

Aspect 2: The method of Aspect 1, wherein receiving the first signal comprises receiving a millimeter wave wireless signal.

Aspect 3: The method of either of Aspects 1 or 2, wherein the first signal comprises at least one of: a physical downlink control channel communication, a physical downlink shared channel communication, a physical uplink control channel communication, a physical uplink shared channel communication, a physical random access channel communication, a physical sidelink channel communication, a reference signal communication, or an acknowledgement or negative acknowledgement feedback message.

Aspect 4: The method of any of Aspects 1-3, wherein the configuration indicates a digital processing operation that includes the time domain reconfiguration, and wherein processing the first signal based at least in part on the time domain reconfiguration comprises performing the digital processing operation.

Aspect 5: The method of any of Aspects 1-4, wherein the first signal carries a communication, and wherein processing the first signal based at least in part on the time domain reconfiguration comprises: segmenting the communication into a plurality of communication segments, wherein generating the at least one second signal comprises generating a plurality of signals, wherein the plurality of signals carry the plurality of communication segments.

Aspect 6: The method of Aspect 5, wherein the configuration comprises a segmentation configuration that indicates segmentation information associated with the communication, and wherein segmenting the communication comprises segmenting the communication based at least in part on the segmentation information.

Aspect 7: The method of Aspect 6, wherein the segmentation information identifies the plurality of communication segments.

Aspect 8: The method of either of Aspects 6 or 7, further comprising transmitting, to the control node, a control message that comprises at least one of: a request for the segmentation configuration, or a suggestion associated with the segmentation configuration.

Aspect 9: The method of Aspect 8, wherein the suggestion indicates a suggested number of communication segments.

Aspect 10: The method of any of Aspects 6-9, wherein the segmentation information is carried by a control message.

Aspect 11: The method of any of Aspects 6-10, wherein the segmentation information is carried by the first signal.

Aspect 12: The method of Aspect 11, wherein transmitting the at least one second signal comprises refraining from transmitting the segmentation information.

Aspect 13: The method of any of Aspects 6-12, wherein the first signal comprises at least one header that carries the segmentation information.

Aspect 14: The method of Aspect 13, wherein transmitting the at least one second signal comprises refraining from transmitting the at least one header.

Aspect 15: The method of any of Aspects 5-14, wherein transmitting the at least one second signal comprises transmitting the plurality of signals using a plurality of time domain resources.

Aspect 16: The method of Aspect 15, wherein the configuration indicates the plurality of time domain resources.

Aspect 17: The method of either of Aspects 15 or 16, wherein the configuration indicates a mapping from a set of resources associated with the first signal to a set of segment indices corresponding to the plurality of communication segments.

Aspect 18: The method of Aspect 17, wherein the configuration indicates: a first mapping from a first resource of the set of resources to a first segment index of the set of segment indices; and a second mapping from a second resource of the set of resources to a second segment index of the set of segment indices.

Aspect 19: The method of either of Aspects 17 or 18, wherein the set of resources comprise at least one of a time domain resource or a frequency domain resource.

Aspect 20: The method of any of Aspects 5-19, wherein a first signal of the plurality of signals carries a first communication segment of the plurality of communication segments, and wherein a second signal of the plurality of signals carries a second communication segment of the plurality of communication segments.

Aspect 21: The method of Aspect 20, wherein transmitting the at least one second signal comprises: transmitting the first signal of the plurality of signals using a first time domain resource; and transmitting the second signal of the plurality of signals using a second time domain resource that is different than the first time domain resource.

Aspect 22: The method of either of Aspects 20 or 21, wherein transmitting the at least one second signal comprises: transmitting the first signal of the plurality of signals using a first beam; and transmitting the second signal of the plurality of signals using a second beam that is different than the first beam.

Aspect 23: The method of any of Aspects 20-22, wherein transmitting the at least one second signal comprises: transmitting the first signal of the plurality of signals to a first wireless node; and transmitting the second signal of the plurality of signals to a second wireless node that is different than the first wireless node.

Aspect 24: The method of any of Aspects 1-23, further comprising: receiving a third signal; and processing the third signal based at least in part on the time domain reconfiguration by aggregating the first signal and the third signal to form an aggregated signal, and wherein the at least one second signal comprises the aggregated signal.

Aspect 25: The method of Aspect 24, wherein the configuration comprises an aggregation configuration that indicates aggregation information associated with the aggregated signal, and wherein aggregating the first signal and the third signal comprises generating the aggregated signal based at least in part on the aggregation information.

Aspect 26: The method of Aspect 25, wherein the aggregation configuration indicates at least one resource to be used to transmit the aggregated signal.

Aspect 27: The method of either of Aspects 25 or 26, further comprising transmitting, to the control node, a control message that comprises at least one of: a request for the aggregation configuration, or a suggestion associated with the aggregation configuration.

Aspect 28: The method of any of Aspects 25-27, wherein the aggregation information is carried by a control message.

Aspect 29: The method of any of Aspects 25-28, wherein the aggregation information is carried by the first signal.

Aspect 30: The method of Aspect 29, wherein transmitting the at least one second signal comprises refraining from transmitting the aggregation information.

Aspect 31: The method of any of Aspects 25-30, wherein the first signal comprises at least one header that carries the aggregation information.

Aspect 32: The method of Aspect 31, wherein transmitting the at least one second signal comprises refraining from transmitting the at least one header.

Aspect 33: The method of any of Aspects 24-32, wherein receiving the first signal comprises receiving the first signal from a first wireless node, and wherein receiving the third signal comprises receiving the third signal from at least one of the first wireless node or a second wireless node.

Aspect 34: The method of any of Aspects 24-33, wherein receiving the first signal comprises receiving the first signal using a first beam, and wherein receiving the third signal comprises receiving the third signal using at least one of the first beam or a second beam.

Aspect 35: The method of any of Aspects 24-34, wherein aggregating the first signal and the third signal comprises aggregating the first signal and the third signal using frequency division multiplexing.

Aspect 36: The method of any of Aspects 1-35, wherein the first signal carries a communication and wherein processing the first signal based at least in part on the time domain reconfiguration comprises storing the communication in a memory, wherein the at least one second signal comprises a plurality of signals, and wherein transmitting the at least one second signal comprises: transmitting a first signal of the plurality of signals at a first time, wherein the first signal of the plurality of signals comprises a first re-generated version of the first signal; and transmitting a second signal of the plurality of signals at a second time that is different than the first time, wherein the second signal of the plurality of signals comprises a second re-generated version of the first signal.

Aspect 37: The method of Aspect 36, further comprising: determining that the second signal of the plurality of signals was received by a wireless node; and removing the stored communication from the memory based at least in part on the determination that the second signal of the plurality of signals was received by the wireless node.

Aspect 38: The method of Aspect 37, further comprising: receiving an acknowledgement feedback message corresponding to the second signal of the plurality of signals, wherein the determination that the second signal of the plurality of signals was received by the wireless node is based at least in part on the acknowledgement feedback message.

Aspect 39: The method of either of Aspects 37 or 38, further comprising: determining that a feedback timer has expired, wherein the feedback timer is associated with a time period for receiving an acknowledgement feedback message corresponding to the second signal of the plurality of signals, wherein the determination that the second signal of the plurality of signals was received by the wireless node is based at least in part on the expiration of the feedback timer.

Aspect 40: The method of any of Aspects 36-39, wherein the configuration comprises a retransmission configuration that indicates retransmission information associated with the first signal, and wherein transmitting the second signal of the plurality of signals comprises transmitting the second signal of the plurality of signals based at least in part on the retransmission information.

Aspect 41: The method of Aspect 40, wherein the retransmission configuration indicates at least one resource to be used to transmit the second signal of the plurality of signals.

Aspect 42: The method of either of Aspects 40 or 41, further comprising transmitting, to the control node, a control message that comprises at least one of: a request for the retransmission configuration, or a suggestion associated with the retransmission configuration.

Aspect 43: The method of any of Aspects 40-42, wherein the retransmission information is carried by a control message.

Aspect 44: The method of any of Aspects 40-43, wherein the retransmission information is carried by the first signal.

Aspect 45: The method of Aspect 44, wherein transmitting the at least one second signal comprises refraining from transmitting the retransmission information.

Aspect 46: The method of any of Aspects 40-45, wherein the first signal comprises at least one header that carries the retransmission information.

Aspect 47: The method of Aspect 46, wherein transmitting the at least one second signal comprises refraining from transmitting the at least one header.

Aspect 48: The method of any of Aspects 40-47, wherein the retransmission information indicates a number of retransmissions associated with the first signal.

Aspect 49: The method of any of Aspects 1-48, wherein the configuration indicates a mapping from a first set of resources associated with the first signal to a second set of resources corresponding to the at least one second signal.

Aspect 50: The method of Aspect 49, wherein the first set of resources comprises a first set of resource elements, and wherein the second set of resources comprises a second set of resource elements.

Aspect 51: The method of either of Aspects 49 or 50, wherein the first set of resources comprises a first set of symbols, and wherein the second set of resources comprises a second set of symbols.

Aspect 52: The method of any of Aspects 49-51, further comprising transmitting, to the control node, a control message that comprises at least one of: a request for the mapping, or a suggestion associated with the mapping.

Aspect 53: The method of any of Aspects 49-52, wherein the mapping is carried by a control message.

Aspect 54: The method of any of Aspects 49-53, wherein the mapping is carried by the first signal.

Aspect 55: The method of Aspect 54, wherein transmitting the at least one second signal comprises refraining from transmitting the mapping.

Aspect 56: The method of any of Aspects 49-55, wherein the first signal comprises at least one header that carries the mapping.

Aspect 57: The method of Aspect 56, wherein transmitting the at least one second signal comprises refraining from transmitting the at least one header.

Aspect 58: The method of any of Aspects 1-57, wherein the configuration indicates a digital processing operation that includes the frequency domain reconfiguration, and wherein processing the first signal based at least in part on the frequency domain reconfiguration comprises performing the digital processing operation.

Aspect 59: The method of any of Aspects 1-58, wherein receiving the first signal comprises receiving the first signal using a first frequency domain resource having a first center frequency, and wherein transmitting the at least one second signal comprises transmitting the at least one second signal using a second frequency domain resource having a second center frequency, wherein the second center frequency is different than the first center frequency.

Aspect 60: The method of Aspect 59, wherein the first frequency domain resource comprises at least one of: a resource element, a bandwidth, or a bandwidth part.

Aspect 61: The method of Aspect 60, wherein the first frequency domain resource is the bandwidth part and is associated with at least one of: a front haul link between the control node and the repeater node, an access link between the control node and the repeater node, or a wireless node.

Aspect 62: The method of any of Aspects 59-61, wherein the configuration comprises a frequency shift configuration that indicates the second frequency domain resource.

Aspect 63: The method of Aspect 62, further comprising: obtaining channel information associated with the second frequency domain resource; and transmitting, to the control node, a control message that indicates the channel information, wherein the frequency shift configuration indicates the second frequency domain resource based at least in part on the channel information.

Aspect 64: The method of either of Aspects 62 or 63, wherein the frequency shift configuration indicates a difference between the first center frequency and the second center frequency.

Aspect 65: The method of Aspect 64, wherein the difference comprises a number of resource elements.

Aspect 66: The method of either of Aspects 64 or 65, wherein the difference comprises a frequency offset value.

Aspect 67: The method of any of Aspects 62-66, further comprising transmitting, to the control node, a control message that comprises at least one of: a request for the frequency shift configuration, or a suggestion associated with the frequency shift configuration.

Aspect 68: The method of Aspect 67, wherein the suggestion indicates at least one of a suggested frequency domain resource or a suggested frequency offset.

Aspect 69: The method of any of Aspects 62-68, wherein the frequency shift configuration is carried by a control message.

Aspect 70: The method of any of Aspects 62-69, wherein the frequency shift configuration is carried by the first signal.

Aspect 71: The method of Aspect 70, wherein transmitting the at least one second signal comprises refraining from transmitting the frequency shift configuration.

Aspect 72: The method of any of Aspects 62-71, wherein the first signal comprises at least one header that carries the frequency shift configuration.

Aspect 73: The method of Aspect 72, wherein transmitting the at least one second signal comprises refraining from transmitting the at least one header.

Aspect 74: The method of any of Aspects 1-73, wherein the first signal carries an aggregated communication comprising a plurality of communications, wherein the plurality of communications are frequency division multiplexed, and wherein processing the first signal based at least in part on the frequency domain reconfiguration comprises: segmenting the aggregated communication into the plurality of communications, wherein generating the at least one second signal comprises generating a plurality of signals, wherein the plurality of signals carry the plurality of communications.

Aspect 75: The method of Aspect 74, wherein the configuration comprises a segmentation configuration that indicates segmentation information associated with the aggregated communication, and wherein segmenting the aggregated communication comprises segmenting the aggregated communication based at least in part on the segmentation information.

Aspect 76: The method of Aspect 75, wherein the segmentation information identifies the plurality of communications.

Aspect 77: The method of either of Aspects 75 or 76, further comprising transmitting, to the control node, a control message that comprises at least one of: a request for the segmentation configuration, or a suggestion associated with the segmentation configuration.

Aspect 78: The method of any of Aspects 75-77, wherein the segmentation information is carried by a control message.

Aspect 79: The method of any of Aspects 75-78, wherein the segmentation information is carried by the first signal.

Aspect 80: The method of Aspect 79, wherein transmitting the at least one second signal comprises refraining from transmitting the segmentation information.

Aspect 81: The method of any of Aspects 75-80, wherein the first signal comprises at least one header that carries the segmentation information.

Aspect 82: The method of Aspect 81, wherein transmitting the at least one second signal comprises refraining from transmitting the at least one header.

Aspect 83: The method of any of Aspects 74-82, wherein transmitting the at least one second signal comprises transmitting a plurality of signals using a plurality of frequency domain resources.

Aspect 84: The method of Aspect 83, wherein transmitting the plurality of signals further comprises transmitting the plurality of signals using a plurality of time domain resources.

Aspect 85: The method of either of Aspects 83 or 84, wherein the configuration indicates the plurality of frequency domain resources.

Aspect 86: The method of any of Aspects 74-85, wherein a first signal of the plurality of signals carries a first communication of the plurality of communications, and wherein a second signal of the plurality of signals carries a second communication of the plurality of communications.

Aspect 87: The method of Aspect 86, wherein transmitting the plurality of signals comprises: transmitting the first signal of the plurality of signals using a first frequency domain resource; and transmitting the second signal of the plurality of signals using a second frequency domain resource that is different than the first frequency domain resource.

Aspect 88: The method of Aspect 87, wherein the first frequency domain resource is associated with a front haul link between the control node and the repeater node, and wherein the second frequency domain resource is associated with an access link between the control node and the repeater node.

Aspect 89: The method of any of Aspects 86-88, wherein transmitting the plurality of signals comprises: transmitting the first signal of the plurality of signals using a first beam; and transmitting the second signal of the plurality of signals using a second beam that is different than the first beam.

Aspect 90: The method of Aspect 89, wherein the first beam corresponds to a first wireless node, and wherein the second beam corresponds to a second wireless node.

Aspect 91: A method of wireless communication performed by a control node, comprising: determining a configuration that indicates at least one of a time domain reconfiguration or a frequency domain reconfiguration to be used by a repeater node to process a first signal and generate at least one second signal based at least in part on the processed first signal; and transmitting the configuration to the repeater node.

Aspect 92: The method of Aspect 91, further comprising transmitting the first signal to the repeater node.

Aspect 93: The method of Aspect 92, wherein transmitting the first signal comprises transmitting a millimeter wave wireless signal.

Aspect 94: The method of any of Aspects 91-93, wherein the first signal comprises at least one of: a physical downlink control channel communication, a physical downlink shared channel communication, a physical uplink control channel communication, a physical uplink shared channel communication, a physical random access channel communication, a physical sidelink channel communication, a reference signal communication, or an acknowledgement or negative acknowledgement feedback message.

Aspect 95: The method of any of Aspects 91-94, wherein the configuration indicates a digital processing operation that includes the at least one of the time domain reconfiguration or the frequency domain reconfiguration.

Aspect 96: The method of any of Aspects 91-95, wherein the first signal carries a communication, and wherein the time domain reconfiguration comprises: an indication to segment the communication into a plurality of communication segments; and an indication to generate the at least one second signal by generating a plurality of signals that carry the plurality of communication segments.

Aspect 97: The method of Aspect 96, wherein the configuration comprises a segmentation configuration that indicates segmentation information associated with the communication, and wherein the configuration comprises an indication to segment the communication based at least in part on the segmentation information.

Aspect 98: The method of Aspect 97, wherein the segmentation information identifies the plurality of communication segments.

Aspect 99: The method of either of Aspects 97 or 98, further comprising receiving, from the repeater node, a control message that comprises at least one of: a request for the segmentation configuration, or a suggestion associated with the segmentation configuration.

Aspect 100: The method of Aspect 99, wherein the suggestion indicates a suggested number of communication segments.

Aspect 101: The method of any of Aspects 97-100, wherein the segmentation information is carried by a control message.

Aspect 102: The method of any of Aspects 97-101, wherein the segmentation information is carried by the first signal.

Aspect 103: The method of any of Aspects 97-102, wherein the first signal comprises at least one header that carries the segmentation information.

Aspect 104: The method of any of Aspects 97-103, wherein the configuration indicates a plurality of time domain resources to be used by the repeater node for transmitting the at least one second signal.

Aspect 105: The method of any of Aspects 97-104, wherein the configuration indicates a mapping from a set of resources associated with the first signal to a set of segment indices corresponding to the plurality of communication segments.

Aspect 106: The method of Aspect 105, wherein the configuration indicates: a first mapping from a first resource of the set of resources to a first segment index of the set of segment indices; and a second mapping from a second resource of the set of resources to a second segment index of the set of segment indices.

Aspect 107: The method of Aspect 106, wherein the set of resources comprise at least one of a time domain resource or a frequency domain resource.

Aspect 108: The method of any of Aspects 97-107, wherein the segmentation configuration comprises: an indication to transmit a first communication segment of the plurality of communication segments using a first signal of the plurality of signals, and an indication to transmit a second communication segment of the plurality of communication segments using a second signal of the plurality of signals.

Aspect 109: The method of Aspect 108, wherein the configuration comprises an indication to transmit the at least one second signal by: transmitting the first signal of the plurality of signals using a first time domain resource; and transmitting the second signal of the plurality of signals using a second time domain resource that is different than the first time domain resource.

Aspect 110: The method of either of Aspects 108 or 109, wherein the configuration comprises an indication to transmit the at least one second signal by: transmitting the first signal of the plurality of signals using a first beam; and transmitting the second signal of the plurality of signals using a second beam that is different than the first beam.

Aspect 111: The method of Aspect 110, wherein the configuration comprises an indication to transmit the at least one second signal by: transmitting the first signal of the plurality of signals to a first wireless node; and transmitting the second signal of the plurality of signals to a second wireless node that is different than the first wireless node.

Aspect 112: The method of any of Aspects 91-111, wherein the configuration comprises: an indication to process a third signal received by the repeater node based at least in part on the configuration by aggregating the first signal and the third signal to form an aggregated signal, wherein the at least one second signal comprises the aggregated signal.

Aspect 113: The method of Aspect 112, wherein the configuration comprises an aggregation configuration that indicates aggregation information associated with the aggregated signal, and wherein the aggregation configuration comprises an indication to aggregate the first signal and the third signal by generating the aggregated signal based at least in part on the aggregation information.

Aspect 114: The method of Aspect 113, wherein the aggregation configuration indicates at least one resource to be used to transmit the aggregated signal.

Aspect 115: The method of either of Aspects 113 or 114, further comprising receiving, from the repeater node, a control message that comprises at least one of: a request for the aggregation configuration, or a suggestion associated with the aggregation configuration.

Aspect 116: The method of any of Aspects 113-115, wherein the aggregation information is carried by a control message.

Aspect 117: The method of any of Aspects 113-116, wherein the aggregation information is carried by the first signal.

Aspect 118: The method of any of Aspects 113-117, wherein the first signal comprises at least one header that carries the aggregation information.

Aspect 119: The method of any of Aspects 112-118, wherein the first signal is associated with a first beam, and wherein the third signal is associated with at least one of the first beam or a second beam.

Aspect 120: The method of any of Aspects 91-119, wherein the first signal carries a communication and wherein the configuration comprises an indication to process the first signal based at least in part on the time domain reconfiguration by storing the communication in a memory, wherein the at least one second signal comprises a plurality of signals, and wherein the configuration comprises an indication to transmit the at least one second signal by: transmitting a first signal of the plurality of signals at a first time, wherein the first signal of the plurality of signals comprises a first re-generated version of the first signal; and transmitting a second signal of the plurality of signals at a second time that is different than the first time, wherein the second signal of the plurality of signals comprises a second re-generated version of the first signal.

Aspect 121: The method of Aspect 120, wherein the configuration comprises an indication to remove the stored communication from the memory based at least in part on a determination that the second signal of the plurality of signals was received by a wireless node.

Aspect 122: The method of either of Aspects 120 or 121, wherein the configuration comprises a retransmission configuration that indicates retransmission information associated with the first signal, and wherein the configuration comprises an indication to transmit the second signal of the plurality of signals based at least in part on the retransmission information.

Aspect 123: The method of Aspect 122, wherein the retransmission configuration indicates at least one resource to be used to transmit the second signal of the plurality of signals.

Aspect 124: The method of either of Aspects 122 or 123, further comprising receiving, from the repeater node, a control message that comprises at least one of: a request for the retransmission configuration, or a suggestion associated with the retransmission configuration.

Aspect 125: The method of any of Aspects 122-124, wherein the retransmission information is carried by a control message.

Aspect 126: The method of any of Aspects 122-125, wherein the retransmission information is carried by the first signal.

Aspect 127: The method of any of Aspects 122-126, wherein the first signal comprises at least one header that carries the retransmission information.

Aspect 128: The method of any of Aspects 122-127, wherein the retransmission information indicates a number of retransmissions associated with the first signal.

Aspect 129: The method of any of Aspects 91-128, wherein the configuration indicates a digital processing operation that includes the frequency domain reconfiguration, and wherein the configuration comprises an indication to process the first signal based at least in part on the frequency domain reconfiguration by performing the digital processing operation.

Aspect 130: The method of any of Aspects 91-129, wherein the first signal is associated with a first frequency domain resource having a first center frequency, and wherein the configuration comprises an indication to transmit the at least one second signal using a second frequency domain resource having a second center frequency, wherein the second center frequency is different than the first center frequency.

Aspect 131: The method of Aspect 130, wherein the first frequency domain resource comprises at least one of: a resource element, a bandwidth, or a bandwidth part.

Aspect 132: The method of Aspect 131, wherein the first frequency domain resource is the bandwidth part and is associated with at least one of: a front haul link between the control node and the repeater node, an access link between the control node and the repeater node, or a wireless node.

Aspect 133: The method of any of Aspects 130-132, wherein the configuration comprises a frequency shift configuration that indicates the second frequency domain resource.

Aspect 134: The method of Aspect 133, wherein the configuration comprises: an indication to obtain channel information associated with the second frequency domain resource; and an indication to transmit, to the control node, a control message that indicates the channel information, wherein the frequency shift configuration indicates the second frequency domain resource based at least in part on the channel information.

Aspect 135: The method of either of Aspects 133 or 134, wherein the frequency shift configuration indicates a difference between the first center frequency and the second center frequency.

Aspect 136: The method of Aspect 135, wherein the difference comprises a number of resource elements.

Aspect 137: The method of either of Aspects 135 or 136, wherein the difference comprises a frequency offset value.

Aspect 138: The method of any of Aspects 133-137, further comprising receiving, from the repeater node, a control message that comprises at least one of: a request for the frequency shift configuration, or a suggestion associated with the frequency shift configuration.

Aspect 139: The method of Aspect 138, wherein the suggestion indicates at least one of a suggested frequency domain resource or a suggested frequency offset.

Aspect 140: The method of any of Aspects 133-139, wherein the frequency shift configuration is carried by a control message.

Aspect 141: The method of any of Aspects 133-140, wherein the frequency shift configuration is carried by the first signal.

Aspect 142: The method of any of Aspects 133-141, wherein the first signal comprises at least one header that carries the frequency shift configuration.

Aspect 143: The method of any of Aspects 91-142, wherein the first signal carries an aggregated communication comprising a plurality of communications, wherein the plurality of communications are frequency division multiplexed, and wherein the configuration comprises an indication to process the first signal based at least in part on the frequency domain reconfiguration by: segmenting the aggregated communication into the plurality of communications, wherein generating the at least one second signal comprises generating a plurality of signals, wherein the plurality of signals carry the plurality of communications.

Aspect 144: The method of Aspect 143, wherein the configuration comprises a segmentation configuration that indicates segmentation information associated with the aggregated communication, and wherein the configuration comprises an indication to segment the aggregated communication based at least in part on the segmentation information.

Aspect 145: The method of Aspect 144, wherein the segmentation information identifies the plurality of communications.

Aspect 146: The method of either of Aspects 144 or 145, further comprising receiving, from the repeater node, a control message that comprises at least one of: a request for the segmentation configuration, or a suggestion associated with the segmentation configuration.

Aspect 147: The method of any of Aspects 144-146, wherein the segmentation information is carried by a control message.

Aspect 148: The method of any of Aspects 144-147, wherein the segmentation information is carried by the first signal.

Aspect 149: The method of any of Aspects 144-148, wherein the first signal comprises at least one header that carries the segmentation information.

Aspect 150: The method of any of Aspects 144-149, wherein the configuration comprises an indication to transmit the at least one second signal by transmitting a plurality of signals using a plurality of frequency domain resources.

Aspect 151: The method of Aspect 150, wherein the configuration comprises an indication to transmit the plurality of signals by transmitting the plurality of signals using a plurality of time domain resources.

Aspect 152: The method of Aspect 151, wherein the configuration indicates the plurality of frequency domain resources.

Aspect 153: The method of any of Aspects 144-152, wherein the configuration comprises: an indication to transmit a first communication of the plurality of communications using a first signal of the plurality of signals; and an indication to transmit a second communication of the plurality of communications using a second signal of the plurality of signals.

Aspect 154: The method of Aspect 153, wherein the configuration comprises an indication to transmit the plurality of signals by: transmitting the first signal of the plurality of signals using a first frequency domain resource; and transmitting the second signal of the plurality of signals using a second frequency domain resource that is different than the first frequency domain resource.

Aspect 155: The method of Aspect 154, wherein the first frequency domain resource is associated with a front haul link between the control node and the repeater node, and wherein the second frequency domain resource is associated with an access link between the control node and the repeater node.

Aspect 156: The method of any of Aspects 153-155, wherein the configuration comprises an indication to transmit the plurality of signals by: transmitting the first signal of the plurality of signals using a first beam; and transmitting the second signal of the plurality of signals using a second beam that is different than the first beam.

Aspect 157: The method of Aspect 156, wherein the first beam corresponds to a first wireless node, and wherein the second beam corresponds to a second wireless node.

Aspect 158: The method of any of Aspects 91-157, wherein the configuration indicates a mapping from a first set of resources associated with the first signal to a second set of resources corresponding to the at least one second signal.

Aspect 159: The method of Aspect 158, wherein the first set of resources comprises a first set of resource elements, and wherein the second set of resources comprises a second set of resource elements.

Aspect 160: The method of either of Aspects 158 or 159, wherein the first set of resources comprises a first set of symbols, and wherein the second set of resources comprises a second set of symbols.

Aspect 161: The method of any of Aspects 158-160, further comprising receiving, from the repeater node, a control message that comprises at least one of: a request for the mapping, or a suggestion associated with the mapping.

Aspect 162: The method of any of Aspects 158-161, wherein the mapping is carried by a control message.

Aspect 163: The method of any of Aspects 158-162, wherein the mapping is carried by the first signal.

Aspect 164: The method of any of Aspects 158-163, wherein the first signal comprises at least one header that carries the mapping.

Aspect 165: An apparatus for wireless communication at a device, comprising a processor; memory coupled with the processor; and instructions stored in the memory and executable by the processor to cause the apparatus to perform the method of one or more of Aspects 1-90.

Aspect 166: A device for wireless communication, comprising a memory and one or more processors coupled to the memory, the one or more processors configured to perform the method of one or more of Aspects 1-90.

Aspect 167: An apparatus for wireless communication, comprising at least one means for performing the method of one or more of Aspects 1-90.

Aspect 168: A non-transitory computer-readable medium storing code for wireless communication, the code comprising instructions executable by a processor to perform the method of one or more of Aspects 1-90.

Aspect 169: A non-transitory computer-readable medium storing a set of instructions for wireless communication, the set of instructions comprising one or more instructions that, when executed by one or more processors of a device, cause the device to perform the method of one or more of Aspects 1-90.

Aspect 170: An apparatus for wireless communication at a device, comprising a processor; memory coupled with the processor; and instructions stored in the memory and executable by the processor to cause the apparatus to perform the method of one or more of Aspects 91-164.

Aspect 171: A device for wireless communication, comprising a memory and one or more processors coupled to the memory, the one or more processors configured to perform the method of one or more of Aspects 91-164.

Aspect 172: An apparatus for wireless communication, comprising at least one means for performing the method of one or more of Aspects 91-164.

Aspect 173: A non-transitory computer-readable medium storing code for wireless communication, the code comprising instructions executable by a processor to perform the method of one or more of Aspects 91-164.

Aspect 174: A non-transitory computer-readable medium storing a set of instructions for wireless communication, the set of instructions comprising one or more instructions that, when executed by one or more processors of a device, cause the device to perform the method of one or more of Aspects 91-164.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater node, comprising:
    transmitting, to a control node, a message that indicates a number of communication segments to be generated during segmentation;
    receiving, from the control node, a configuration that indicates:
        a time domain reconfiguration,
        a processing option of a plurality of processing options, and
        information associated with the segmentation;
    receiving a first signal that carries a communication;
    processing the first signal, based at least in part on the processing option indicated by the configuration, to obtain a processed first signal;
    generating a plurality of second signals based at least in part on the processed first signal and in accordance with the information associated with the segmentation;
    transmitting, using a first beam at a first time and in accordance with the time domain reconfiguration, a first one of the plurality of second signals that carries the communication, wherein the first one of the plurality of second signals comprises a first re-generated version of the first signal; and transmitting, using a second beam at a second time and in accordance with the time domain reconfiguration, a second one of the plurality of second signals that carries the communication, wherein the second one of the plurality of second signals comprises a second re-generated version of the first signal, and wherein the second beam is different than the first beam.

2. The method of claim 1, wherein processing the first signal comprises storing the communication in a memory, and wherein generating the plurality of second signals is based at least in part on storing the communication in the memory.

3. The method of claim 2, further comprising:
determining that the second one of the plurality of second signals was received by a wireless node; and
removing the stored communication from the memory based at least in part on the determination that the second one of the plurality of second signals was received by the wireless node.

4. The method of claim 3, further comprising:
receiving an acknowledgement feedback message corresponding to the second one of the plurality of second signals,
wherein the determination that the second one of the plurality of second signals was received by the wireless node is based at least in part on the acknowledgement feedback message.

5. The method of claim 3, further comprising:
determining that a feedback timer has expired, wherein the feedback timer is associated with a time period for receiving an acknowledgement feedback message corresponding to the second one of the plurality of second signals,
wherein the determination that the second one of the plurality of second signals was received by the wireless node is based at least in part on the expiration of the feedback timer.

6. The method of claim 2, wherein the configuration comprises a retransmission configuration that indicates retransmission information associated with the first signal, the retransmission information indicating a number of retransmissions that each comprise re-generated versions of the first signal, and
wherein transmitting the second one of the plurality of second signals comprises transmitting the second one of the plurality of second signals based at least in part on the retransmission information.

7. The method of claim 6, wherein the retransmission configuration indicates at least one resource to be used to transmit the second one of the plurality of second signals.

8. The method of claim 1, wherein receiving the first signal comprises receiving the first signal using a first frequency domain resource having a first center frequency, and
wherein transmitting the plurality of second signals comprises transmitting the plurality of second signals using a second frequency domain resource having a second center frequency, wherein the second center frequency is different than the first center frequency.

9. The method of claim 8, wherein the configuration further comprises a frequency shift configuration that indicates the second frequency domain resource.

10. The method of claim 9, further comprising:
obtaining channel information associated with the second frequency domain resource; and
transmitting, to the control node, a control message that indicates the channel information,
wherein the frequency shift configuration indicates the second frequency domain resource based at least in part on the channel information.

11. The method of claim 9, further comprising transmitting, to the control node, a control message that comprises at least one of:
a request for the frequency shift configuration, or
a suggestion associated with the frequency shift configuration, wherein the suggestion indicates at least one of a suggested frequency domain resource or a suggested frequency offset.

12. A method of wireless communication performed by a control node, comprising:
receiving, from a repeater node, a message that indicates a number of communication segments to be generated during segmentation;
determining a configuration that indicates a time domain reconfiguration, information associated with the segmentation, and a processing option of a plurality of processing options to be used by the repeater node to process a first signal that carries a communication and generate a plurality of second signals based at least in part on processing the first signal and in accordance with the information associated with the segmentation, wherein each of the plurality of second signals carries the communication and comprises a re-generated version of the first signal, and wherein the configuration further indicates that the plurality of second signals are to be transmitted using different beams; and
transmitting the configuration to the repeater node.

13. The method of claim 12, wherein the configuration comprises a retransmission configuration that indicates retransmission information associated with the first signal, the retransmission information indicating a number of retransmissions that each comprise re-generated versions of the first signal.

14. The method of claim 13, wherein the retransmission configuration indicates at least one resource to be used to transmit one of the plurality of second signals.

15. The method of claim 12, wherein the configuration further comprises a frequency shift configuration that indicates a frequency domain resource, and wherein each of the plurality of second signals are transmitted using the frequency domain resource having a first center frequency that is different than a second center frequency associated with the first signal.

16. A repeater node for wireless communication, comprising:
one or more memories; and
one or more processors, coupled to the one or more memories, configured to:
transmit, to a control node, a message that indicates a number of communication segments to be generated during segmentation;
receive, from the control node, a configuration that indicates:
a time domain reconfiguration,
a processing option of a plurality of processing options, and
information associated with the segmentation;
receive a first signal that carries a communication;

process the first signal, based at least in part on the processing option indicated by the configuration, to obtain a processed first signal;

generate a plurality of second signals based at least in part on the processed first signal and in accordance with the information associated with the segmentation;

transmit, using a first beam at a first time and in accordance with the time domain reconfiguration, a first one of the plurality of second signals that carries the communication, wherein the first one of the plurality of second signals comprises a first re-generated version of the first signal; and transmit, using a second beam at a second time and in accordance with the time domain reconfiguration, a second one of the plurality of second signals that carries the communication, wherein the second one of the plurality of second signals comprises a second re-generated version of the first signal, and wherein the second beam is different than the first beam.

17. The repeater node of claim 16, wherein to process the first signal, the one or more processors are further configured to store the communication in the memory, and wherein generating the plurality of second signals is based at least in part on storing the communication in the memory.

18. The repeater node of claim 17, wherein the one or more processors are further configured to:
determine that the second one of the plurality of second signals was received by a wireless node; and
remove the stored communication from the memory based at least in part on the determination that the second one of the plurality of second signals was received by the wireless node.

19. The repeater node of claim 18, wherein the one or more processors are further configured to:
receive an acknowledgement feedback message corresponding to the second one of the plurality of second signals,
wherein the determination that the second one of the plurality of second signals was received by the wireless node is based at least in part on the acknowledgement feedback message.

20. The repeater node of claim 18, wherein the one or more processors are further configured to:
determine that a feedback timer has expired, wherein the feedback timer is associated with a time period for receiving an acknowledgement feedback message corresponding to the second one of the plurality of second signals,
wherein the determination that the second one of the plurality of second signals was received by the wireless node is based at least in part on the expiration of the feedback timer.

21. The repeater node of claim 17, wherein the configuration comprises a retransmission configuration that indicates retransmission information associated with the first signal, the retransmission information indicating a number of retransmissions that each comprise re-generated versions of the first signal, and
wherein to transmit the second one of the plurality of second signals, the one or more processors are further configured to transmit the second one of the plurality of second signals based at least in part on the retransmission information.

22. The repeater node of claim 21, wherein the retransmission configuration indicates at least one resource to be used to transmit the second one of the plurality of second signals.

23. The repeater node of claim 16, wherein to receive the first signal, the one or more processors are further configured to receive the first signal using a first frequency domain resource having a first center frequency, and
wherein to transmit the second one of the plurality of second signals, the one or more processors are further configured to transmit the plurality of second signals using a second frequency domain resource having a second center frequency, wherein the second center frequency is different than the first center frequency.

24. The repeater node of claim 23, wherein the configuration further comprises a frequency shift configuration that indicates the second frequency domain resource.

25. The repeater node of claim 24, wherein the one or more processors are further configured to:
obtain channel information associated with the second frequency domain resource; and
transmit, to the control node, a control message that indicates the channel information,
wherein the frequency shift configuration indicates the second frequency domain resource based at least in part on the channel information.

26. The repeater node of claim 24, wherein the one or more processors are further configured to:
transmit, to the control node, a control message that comprises at least one of:
a request for the frequency shift configuration, or
a suggestion associated with the frequency shift configuration, wherein the suggestion indicates at least one of a suggested frequency domain resource or a suggested frequency offset.

27. A control node for wireless communication, comprising:
one or more memories; and
one or more processors, coupled to the one or more memories, configured to:
receive, from a repeater node, a message that indicates a number of communication segments to be generated during segmentation;
determine a configuration that indicates a time domain reconfiguration, information associated with the segmentation, and a processing option of a plurality of processing options to be used by the repeater node to process a first signal that carries a communication and generate a plurality of second signals based at least in part on processing the first signal and in accordance with the information associated with the segmentation, wherein each of the plurality of second signals carries the communication and comprises a re-generated version of the first signal, and wherein the configuration further indicates that the plurality of second signals are to be transmitted using different beams; and
transmit the configuration to the repeater node.

28. The control node of claim 27, wherein the configuration comprises a retransmission configuration that indicates retransmission information associated with the first signal, the retransmission information indicating a number of retransmissions that each comprise re-generated versions of the first signal.

29. The control node of claim 28, wherein the retransmission configuration indicates at least one resource to be used to transmit one of the plurality of second signals.

30. The control node of claim 27, wherein the configuration further comprises a frequency shift configuration that indicates a frequency domain resource, and wherein each of the plurality of second signals are transmitted using the frequency domain resource having a first center frequency that is different than a second center frequency associated with the first signal.

\* \* \* \* \*